US012657639B1

(12) United States Patent
Lee

(10) Patent No.: US 12,657,639 B1
(45) Date of Patent: Jun. 16, 2026

(54) FAIL-CLOSED PERMIT-BEFORE-COMPUTE ADMISSION CONTROL FOR ACCELERATORS AND HYPERVISORS USING FRESHNESS-BOUNDED SIGNED HEADS AND POLICY ALLOW MASKS, WITH OPTIONAL METER-ENFORCED BUDGETS

(71) Applicant: Yong Bok Lee, Sheridan, WY (US)

(72) Inventor: Yong Bok Lee, Sheridan, WY (US)

(73) Assignee: STONE & INK ARCHIVE LLC, Sheridan, WY (US)

( * ) Notice: Subject to any disclaimer, the term of this patent is extended or adjusted under 35 U.S.C. 154(b) by 0 days.

(21) Appl. No.: 19/450,403

(22) Filed: Jan. 15, 2026

Related U.S. Application Data

(60) Provisional application No. 63/885,554, filed on Sep. 22, 2025.

(51) Int. Cl.
*G06Q 40/12* (2023.01)
*G06F 9/455* (2018.01)

(52) U.S. Cl.
CPC ......... *G06Q 40/12* (2013.12); *G06F 9/45558* (2013.01)

(58) Field of Classification Search
CPC ............................ G06Q 40/12; G06F 9/45558
USPC ............................................................. 705/30
See application file for complete search history.

(56) References Cited

U.S. PATENT DOCUMENTS 9,021,475 B2 4/2015 Nimmagadda et al.
9,424,199 B2 8/2016 Kegel et al.

9,535,849 B2 1/2017 Kegel et al.
10,109,030 B1 10/2018 Sun et al.
10,275,851 B1 4/2019 Zhao et al.
10,437,616 B2 10/2019 Agarwal et al.
2008/0294808 A1 11/2008 Mahalingam et al.
2008/0294825 A1 11/2008 Mahalingam et al.

(Continued)

OTHER PUBLICATIONS

RFC 9162: Certificate Transparency Version 2.0, Dec. 2021, IETF (RFC Editor).

(Continued)

*Primary Examiner* — Russell S Glass

(57) ABSTRACT

Disclosed is a fail-closed permit-before-compute rail for accelerators and hypervisors. Prior to a compute-admission action enabling accelerator work to become executable, a driver, firmware, or hypervisor gate denies by default unless a short-lived, audience-bound Compute Execution Permit (CEP) validates to a head vector of signed heads from append-only verifiable structures, including a policy head and at least one of license/entitlements, unlearning status, export class, data residency, or energy/carbon budgets. Validation enforces head freshness under a freshness policy and, on head advance, append-only evolution (consistency). The CEP cryptographically commits to head identifiers, an allow mask, a budget slice, expiry, and anti-replay data; trusted meters may enforce energy/carbon budgets at admission. On admission, a Compute Receipt (CRc) may commit to a permit identifier, site/region, energy used, tflops_used, decision code, timestamps, and head identifiers, and a digest may be anchored in an append-only Evidence Registry. Optional embodiments include delegation, leases, and privacy-preserving predicates.

30 Claims, 12 Drawing Sheets

(56) References Cited

U.S. PATENT DOCUMENTS

Figure 2:
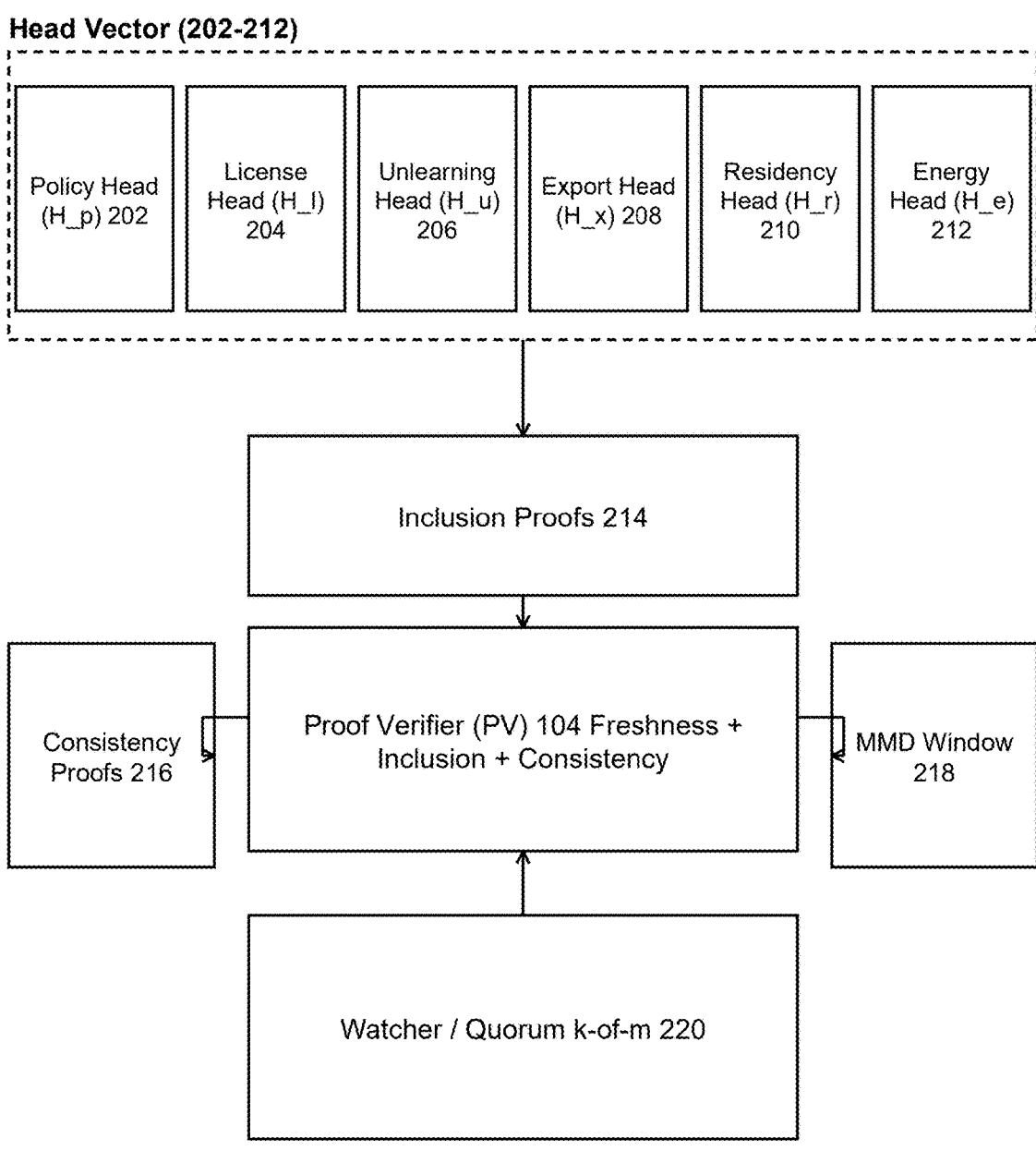

| | | | |
|---|---|---|---|
| 2012/0266165 | A1 | 10/2012 | Cen et al. |
| 2012/0284437 | A1 | 11/2012 | Ayzenfeld et al. |
| 2017/0061568 | A1 | 3/2017 | Metz et al. |
| 2019/0146824 | A1* | 5/2019 | Rewaskar ........... G06F 9/45558 718/1 |
| 2020/0257794 | A1 | 8/2020 | Kim et al. |
| 2020/0264914 | A1* | 8/2020 | Dasgupta .............. H04L 41/342 |
| 2020/0322287 | A1* | 10/2020 | Connor ................. H04L 49/356 |
| 2020/0341766 | A1 | 10/2020 | White et al. |
| 2020/0379930 | A1 | 12/2020 | Brownell et al. |
| 2021/0117246 | A1 | 4/2021 | Lal et al. |
| 2022/0103379 | A1 | 3/2022 | Bursell |
| 2022/0358049 | A1 | 11/2022 | Tsirkin |
| 2023/0108461 | A1 | 4/2023 | He et al. |
| 2023/0297696 | A1 | 9/2023 | Rogers et al. |
| 2023/0409362 | A1* | 12/2023 | Shevade ................... G06F 8/65 |
| 2026/0046317 | A1* | 2/2026 | Crabtree .............. H04L 63/104 |

OTHER PUBLICATIONS

Rekor Transparency Log (Sigstore)—Logging Overview, Accessed Jan. 15, 2026, Sigstore / OpenSSF.
RFC 9334: Remote ATtestation procedureS (RATS) Architecture, Jan. 2023, IETF.
RFC 9711: The Entity Attestation Token (EAT), Apr. 2025, IETF.
Draft-ietf-rats-corim-09: Concise Reference Integrity Manifest (CoRIM), Oct. 20, 2025.
DSP0274 v1.2.2: Security Protocol and Data Model (SPDM) Specification, Oct. 8, 2023, DMTF.
Single Root I/O Virtualization and Sharing Specification Rev. 1.1, Jan. 20, 2010, PCI-SIG.
VFIO Mediated devices (mdev)—Linux Kernel Documentation, Accessed Jan. 15, 2026, The Linux Kernel.
PCI Express I/O Virtualization Howto (SR-IOV), 2009 (Update: Nov. 2012), The Linux Kernel (Documentation).
Intel® Virtualization Technology for Directed I/O (VT-d) Architecture Specification, Mar. 22, 2023 (v5.1 listed), Intel.

* cited by examiner

FIG. 1

Control Plane

Admit Path (Fail-Closed)

FIG. 7

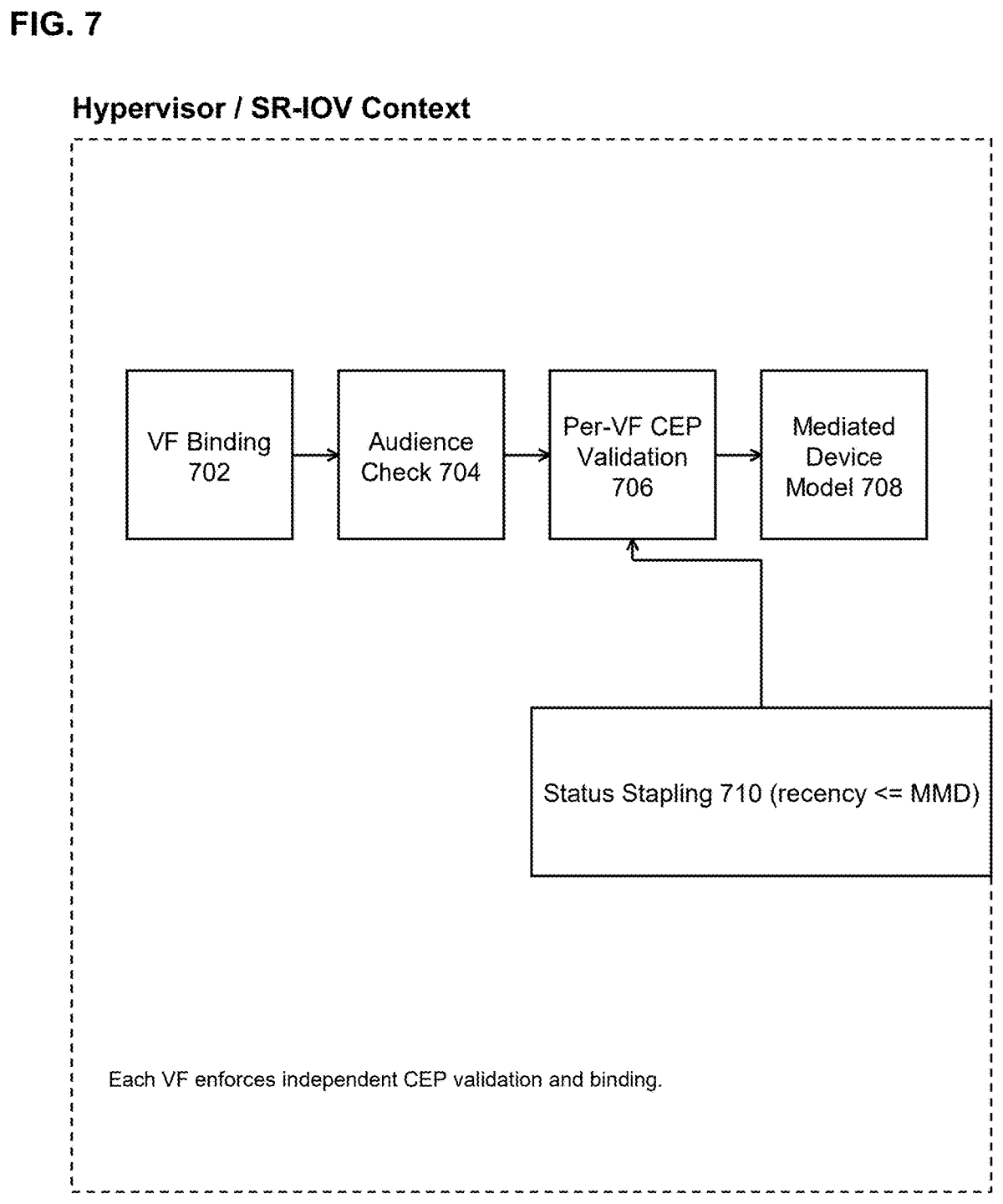

Hypervisor / SR-IOV Context

```
┌─────────────┐   ┌─────────────┐   ┌─────────────┐   ┌─────────────┐
│             │   │             │   │ Per-VF CEP  │   │  Mediated   │
│ VF Binding  │──▶│  Audience   │──▶│ Validation  │──▶│   Device    │
│    702      │   │ Check 704   │   │    706      │   │ Model 708   │
│             │   │             │   │             │   │             │
└─────────────┘   └─────────────┘   └─────────────┘   └─────────────┘
                                          ▲
                                          │
                        ┌─────────────────┘
                        │
        ┌───────────────────────────────────────────────────┐
        │                                                   │
        │                                                   │
        │  Status Stapling 710 (recency <= MMD)             │
        │                                                   │
        └───────────────────────────────────────────────────┘
```

Each VF enforces independent CEP validation and binding.

FAIL-CLOSED PERMIT-BEFORE-COMPUTE ADMISSION CONTROL FOR ACCELERATORS AND HYPERVISORS USING FRESHNESS-BOUNDED SIGNED HEADS AND POLICY ALLOW MASKS, WITH OPTIONAL METER-ENFORCED BUDGETS

CROSS-REFERENCE TO RELATED APPLICATIONS

This application claims the benefit under 35 U.S.C. § 119(e) of U.S. Provisional Application No. 63/885, 554, filed Sep. 22, 2025, titled "Attested Compute & Energy (ACE) Permit Rail: Driver/Firmware-Enforced Compute Execution Permits (CEP) with Multi-Sovereign Freshness, Export-Control, Carbon/Energy Budgets, Data Residency, and License/Unlearning Compliance for AI Accelerators and Hypervisors." The provisional is incorporated by reference only to the extent permitted under 37 C.F.R. § 1.57. All material considered essential to the claimed subject matter is set forth expressly in this application. Essential material is not incorporated by reference.

Non-Trademark Notice. "Attested Compute & Energy," "ACE," "Compute Execution Permit (CEP)," "Capacity Permit (CapP)," and "Compute Receipt (CRc)" are technical labels used for convenience and are not intended to indicate source or trademark significance. Headings are for convenience only. Examples are illustrative and non-limiting. The scope of the invention is defined solely by the claims.

Related applications (illustrative; non-limiting). The Applicant has filed related applications directed to other governance rails (e.g., APTO, AML-Gate, TSIL, Geo-Export Rail, TRC, ISL/PoPC). Only documents expressly identified by application number and/or publication number in this specification may be incorporated by reference, to the extent permitted under 37 C.F.R. § 1.57(d), for nonessential background only. All essential material supporting the claims is set forth expressly in this specification and is not relied upon via incorporation by reference.

Appendices; order of precedence. Appendices A-V (including Appendix R and, if present, Appendix R-1), and the Figures, are submitted as part of this specification. Unless expressly stated otherwise, the appendices are illustrative/audit-only and do not alter fail-closed admission semantics. In the event of any inconsistency, the claims control; otherwise, the Detailed Description controls over the Figures, and the Figures control over the Appendices.

Ethical mission (informative; non-limiting). The Applicant's design intent is to deploy ACE in service of the common good—loving neighbors, protecting the vulnerable, and stewarding compute and energy—by making high-risk workloads provably accountable and fail-closed by default. This statement is informational only and does not limit claim scope or gate semantics; the claims control.

Statement Regarding Federally Sponsored Research or Development Not applicable.

FIELD OF THE INVENTION

Field The disclosure relates to computer security and distributed systems-specifically, to secure accelerator compute-admission control and resource-bounded workload governance. It concerns driver-, firmware-, and/or hypervisor-enforced Compute Execution Permits (CEP) that are validated, at a device-boundary compute-admission chokepoint, against current signed heads under a freshness policy and, in some embodiments, to meter-enforced budget predicates (including energy and/or carbon budgets), before a compute-admission action that would enable accelerator work to become executable is permitted; otherwise the gate denies by default (fail-closed), with portable receipts in some embodiments. Key terminology is defined in Appendix A (Glossary) and the Symbols & Field Names index (Appendix I). Embodiments apply both in conventional grid-connected data centers and in facilities powered partly or wholly by on-site generation assets such as solar or wind farms, industrial cogeneration plants, battery farms, or small modular nuclear plants (including microreactors) feeding a local microgrid.

ACE may be used standalone or together with a multi-sovereign policy orchestrator that computes the head vector and allow mask; functionally equivalent implementations are included.

Unity & Single-Concept (illustrative; non-limiting).

The claims are directed to a single general inventive concept in which:

(i) a permit-before-compute accelerator gate obtains a head vector comprising independently verifiable signed heads for policy and at least one additional compliance domain selected from license or entitlements, unlearning status, export class, data residency, and energy and/or carbon budgets, as published by one or more append-only verifiable structures;

(ii) the system issues, or accepts from an external issuer, a short-lived, audience-bound Compute Execution Permit (CEP) that commits to identifiers of the signed heads used, an allow mask, a budget slice, an expiry, and anti-replay data, and the CEP is validated in a bounded pre-effect decision slice at a compute-admission chokepoint against current signed heads and trusted budget meters and, when configured, attestation artifacts under a freshness policy (e.g., maximum-merge-delay); and (iii) a compute-admission action that would enable accelerator work to become executable (including at least one of enqueue, kernel launch, DMA enablement, memory-mapping enablement, or mediated device or virtual-function enablement) is denied by default unless validation succeeds, with any deficit short-circuiting to non-admission, while emitting structured Compute Receipts and, in some embodiments, anchoring digests in an Evidence Registry, such that accelerator workloads cannot consume constrained accelerator resources in violation of policy and, where applicable, meter-enforced budgets (including energy and/or carbon budgets).

These elements are implemented at the accelerator driver, firmware, or hypervisor gate and are not mere post-hoc logging or mental processes. For examination efficiency, optional features described herein (e.g., delegation, leasing, stapling, quorum/dual-anchor, evidence registries, and metering variants) are presented as compatible embodiments of the same general inventive concept and do not alter fail-closed admission semantics; the claims control.

Unity clarification (informative; non-limiting). For avoidance of doubt, each claimed embodiment enforces the same single general inventive concept at a compute admission chokepoint: (a) obtaining a freshness-bounded head vector comprising signed heads from one or more append-only verifiable structures; (b) issuing or accepting a short-lived, audience-bound Compute Execution Permit (CEP) that commits to identifiers of the signed heads used, an allow mask, a budget slice, an expiry, and anti-replay data; and (c)

denying, by default, a compute-admission action that would enable accelerator work to become executable (including at least one of enqueue, kernel launch, DMA enablement, memory-mapping enablement, or mediated device or virtual-function enablement) unless the CEP validates under current signed heads and trusted budget meters within a bounded pre-effect decision slice, with any failed predicate short-circuiting to denial. Optional embodiments described herein (including delegation, streaming leases, quorum or dual-anchor heads, status stapling, privacy-preserving predicates, evidence registries, revocation, monotonic snapshot identifiers, witness co-signing, continuity-record chaining, time-synchronization sanity checks, curtailment-compliance evidence fields and deterministic-inference configuration digests, and metering variants) are compatible embodiments that reuse and are linked to this same concept and do not constitute separate inventions. Evidence artifacts (e.g., receipts, registries, profiles, codes, and continuity records) are audit/interoperability aids and do not weaken or override gate predicates; the claims control.

Unity note-resource-class extension (illustrative; non-limiting).

Any thermal reuse/export evidence described herein (e.g., WHEP/HRc/HOOR/HORR) is a resource-class extension that reuses the same permit-before-action primitives (fresh signed heads, bounded decision slice, anti-replay, optional registry anchoring) as the compute admission gate, and is presented as a compatible embodiment of the same general inventive concept; it does not define a separate invention. For avoidance of doubt, such resource-class extensions are optional embodiments that reuse the same admission-gate primitives and are not separate inventions. The claims control.

BACKGROUND

AI workloads consume scarce accelerators (GPU/TPU/NPU) under export controls, carbon/energy caps, data residency, licensing, and unlearning obligations. Today's schedulers and quota systems are often policy-soft and typically do not provide cryptographic, freshness-verified permits at the driver/firmware gate. As a result, organizations may be unable to reliably prove that a launched kernel complied with jurisdictional rules, energy budgets, or license/unlearning status.

In emerging deployments, accelerator clusters are increasingly paired with dedicated or behind-the-meter generation assets-such as solar or wind farms, gas turbines, large battery installations, or small modular and microreactor nuclear plants that feed a campus or community microgrid. During grid-stress events, safety incidents at a plant, or regulatory curtailment windows, such generation assets may be required to prioritize critical loads (for example, hospitals, emergency response, or public-safety infrastructure) over discretionary AI workloads. Legacy schedulers typically do not expose a cryptographically verifiable way to map compute admission decisions to these generation constraints or to prove that workloads were throttled or shed in accordance with such obligations.

Deterministic inference accelerators (illustrative; non-limiting). In some deployments, the accelerator is an inference-optimized application-specific integrated circuit (ASIC) or "language processing unit" (LPU) that keeps model parameters primarily in on-die SRAM arrays and uses specialized data-switch fabrics for reshaping tensors. For a fixed model architecture and sequence-length configuration, such devices exhibit a largely deterministic relationship between tokens-per-second, TFLOPs performed, and power draw. Absent a permit-before-compute gate at the driver or firmware boundary, these accelerators can be driven at high utilization with little direct linkage to export class, data residency, license/unlearning status, or energy/carbon budgets, making post-hoc enforcement and audit difficult.

Device-profile efficiency windows and calibration (illustrative; non-limiting). In some embodiments, a deterministic inference accelerator is associated with a device-profile efficiency window that specifies expected ranges for one or more observed efficiency metrics for a model identifier and configuration (e.g., TFLOPs/kWh, tokens-per-second, FLOPs-per-token, and/or a tail-latency quantile). The window MAY be derived from a calibration sequence that executes one or more reference inference workloads (or verifier-initiated probe workloads) under the permit rail, emits Compute Receipts for the reference workloads, and computes baseline ranges from the receipts; functionally equivalent calibration mechanisms are included; the claims control.

Per-tenant anomaly isolation (illustrative; non-limiting). In multi-tenant deployments (including SR-IOV virtual functions or mediated device models), embodiments MAY maintain independent per-tenant device-profile efficiency windows and anomaly counters such that anomaly escalation and protective actions can be enforced per tenant without disabling the deterministic inference accelerator for unrelated tenants; the claims control.

Waste heat as a governed resource (illustrative; non-limiting). In many accelerator-dense deployments, data centers emit substantial low- to medium-grade thermal energy ("waste heat") via liquid cooling loops, heat exchangers, and condenser loops. Emerging regulatory and market structures increasingly treat such thermal output as a governed resource rather than a pure externality, including (i) obligations to evaluate or implement heat recovery where technically and economically feasible, (ii) reporting of heat-reuse performance indicators, and/or (iii) incentives or payments for verified delivery of recovered heat to external heat sinks such as district heating networks or adjacent industrial/process loads. Legacy schedulers and energy accounting systems typically do not provide cryptographically verifiable permits and receipts that bind compute admission and measured thermal export/reuse to the policy heads and freshness windows in effect at the time the compute was admitted; post-hoc reporting may suffer from disputes, replay, double counting, and unverifiable handoff measurements.

Handoff ambiguity and audit friction (illustrative; non-limiting). Thermal governance commonly hinges on where and how recovered heat is measured (e.g., a designated handoff point between the data center and a heat sink, a heat pump plant boundary, or a district heating injection point), and whether the measurement excludes internal reuse for cooling. Without a standardized, signed "handoff identity" and meter attestation bundle bound to a freshness-bounded policy head vector, operators cannot prove that a reported quantity of reused heat corresponds to a specific time window, site, and policy context, nor can auditors reliably detect double counting across multiple facilities, tenants, or settlement counterparties.

Thermal credits and monetization pressure (illustrative; non-limiting). In some jurisdictions and markets, recovered waste heat delivered to an external heat sink may qualify for incentives, rebates, compliance units, or other quantified entitlements ("thermal credits"), including payments or accounting credits tied to verified heat delivery. Such monetization creates a new integrity requirement: a system must prove that delivered thermal energy was measured at a designated handoff point under a fresh policy context and was not double-counted across overlapping windows, facilities, tenants, or counterparties. This paragraph is illustrative; no particular market structure is required; the claims control.

Double-counting, overlap, and replay (illustrative; non-limiting). Absent a cryptographically bound uniqueness predicate, a single physical thermal delivery event may be claimed multiple times—for example, by replaying a receipt, by splitting overlapping time windows, by switching the reported handoff point, or by presenting partial meter samples to different verifiers. Therefore, a practical waste-heat governance rail benefits from (i) anti-replay bindings, (ii) explicit window identifiers, (iii) handoff_point_id binding, and (iv) a deduplication or "anti-double-count" mechanism that is fail-closed on detected conflicts.

Multi-tenant attribution and dispute reduction (illustrative; non-limiting). In multi-tenant or colocation facilities, thermal credits and obligations may require allocation across tenants or workloads. Without standardized linkage between compute receipts and heat receipts (for example, by overlapping windows, site identifiers, and policy head identifiers), counterparties and auditors cannot reliably attribute thermal value or obligations, leading to disputes. Embodiments herein describe evidence-only linkage and allocation mechanisms that do not alter fail-closed admission semantics; the claims control.

Food security and cold-chain resilience (illustrative; non-limiting). In some deployments, priority-load governance is applied to food-system-critical infrastructure that is co-located with, served by, or operationally coupled to accelerator-dense facilities and behind-the-meter generation assets, including without limitation refrigerated warehouses, cold-transport depots, and controlled-environment agriculture (CEA) facilities. During grid-stress events, safety incidents, or regulatory curtailment windows, operators and counterparties may require that food-security-critical loads be prioritized over discretionary AI workloads. Absent a standardized, cryptographically verifiable permit-before-compute gate and portable receipts, organizations cannot prove that discretionary AI workloads and their associated energy and/or thermal flows were subordinated to such food-security-critical loads under the policy heads and budget windows in effect at the time of admission. Accordingly, embodiments of ACE may tag workloads, sites, and/or Capacity Permits with food-security classifications and may record audit-only evidence fields in Compute Receipts (and, where present, optional thermal evidence) including at least one of {public_interest_tag indicating food_security, food_security_tag, food_asset_id, food_region, and food_supply_chain_id}, and may record curtailment indicators such as dr_event_id or curtailed_kWh, enabling independent audit and dispute reduction without altering fail-closed admission semantics; the claims control.

Existing access-control methods (IAM, cluster RBAC, quota) enforce who submits, not what is permitted now under independent policy heads (e.g., export class, carbon window, residency, model license/ULP), nor do they provide portable compute receipts that commit to policy and energy usage.

Device- vs. cluster-level gating (illustrative). Unlike cluster admission controllers that gate API objects (e.g., container images), ACE gates hardware queue admission in the accelerator driver/firmware/hypervisor path prior to a compute-admission action (e.g., prior to doorbell/queue submission), with cryptographic permit-before-compute and portable receipts.

Bypass-resistant gate coverage (illustrative; non-limiting). In some embodiments, the admit path is implemented such that each of a plurality of software and virtualization paths capable of causing accelerator work to become executable (including vendor runtime paths, IOCTL entrypoints, mediated device paths, and per-VF submission paths) converge on a verifier boundary that enforces CEP validation, thereby preventing bypass via alternate submission routes; the claims control.

Admission chokepoint coverage (illustrative; non-limiting).

"Pre-doorbell" is one example admission chokepoint; functionally equivalent chokepoints include DMA/memory-mapping enablement, mediated device/VF enablement, or other pre-effect device I/O enablement boundaries; the claims control.

Admission action equivalence (illustrative; non-limiting). References herein to "enqueue" or "kernel launch" are illustrative examples of compute admission. Functionally equivalent admission actions include enabling DMA, memory-mapping, address-space bindings, mediated device/VF activation, graph/command-buffer submission, or other pre-effect device I/O enablement boundaries that cause accelerator work to become executable; the claims control.

Regulatory context (informative; non-limiting). In some jurisdictions and industry settings, governance, sustainability, and resilience reporting frameworks require documentation regarding model and workload provenance, compute location, energy use, and compliance evidence. ACE's Compute Receipts (CRcs) can provide per-workload proof artifacts (e.g., location/residency, energy use, decision codes, and head identifiers) that support such documentation needs. In some embodiments, CRcs and related EvidenceBundles may additionally carry audit-only classification and stewardship fields (e.g., public_interest_tag, demand-response or curtailment indicators, and other non-limiting labels) to support reporting of priority-load, humanitarian, or food-system resilience contexts, without requiring any particular reporting framework or outcome metric. Any outcome metrics (e.g., avoided loss or other downstream impact measures) are illustrative and evidence-only; ACE does not require computing such metrics for admission, and admission semantics remain defined by CEP validation, freshness, and budget predicates. This paragraph is informative only and does not limit claim scope; the claims control.

Append-only registry semantics (informative). ACE's Evidence Registry MAY publish Signed Tree Heads (STH) with a Maximum-Merge-Delay (MMD) commitment and support inclusion and append-only evolution (consistency) proofs for CEP/CRc digests, analogous to certificate-transparency logs; proofs enable offline auditing without altering gate semantics. The Evidence Registry's STH/MMD inclusion/consistency verification flow is further illustrated in Appendix H (H1-H2) and referenced by the Conformance Manifest (Appendix R). Regardless of whether an Evidence Registry is deployed, admit_compute( ) semantics remain strictly fail-closed on CEP validation against current signed heads and trusted meters; registry artifacts are evidence-only and never weaken or override gate predicates.

Proof/status transport (illustrative). Proofs or status MAY be embedded (stapled), URI-referenced, or verifier-retrieved; transport is functionally equivalent and non-dispositive to validity.

Proof-staple composition (illustrative; non-limiting). In some embodiments, a staple provided with a permit includes one or more of: (i) one or more inclusion proofs, (ii) one or more append-only evolution (consistency) proofs when applicable, and (iii) issuance and expiry timestamps (e.g., issued_at and expires_at, or functionally equivalent). A verifier may enforce a staple recency bound not exceeding the freshness policy and may cache reusable portions of a staple for subsequent admissions while remaining fail-closed on any deficit; the claims control.

Orthogonality to TEEs/power-states (informative). Secure-channel TEEs and GPU power-retention schemes are compatible but not sufficient; ACE gates compute prior to a compute-admission action (e.g., prior to doorbell/queue submission) based on fresh multi-root policy heads and budget slices (kWh/TFLOPs/carbon), with portable CRcs. Implementations MAY leverage such TEEs or power features; ACE's admission semantics are independent.

SUMMARY OF THE INVENTION

Disclosed is ACE, a processor-implemented permit-before-compute rail that issues, or accepts from an external issuer, short-lived, audience-bound Compute Execution Permits (CEP) prior to a compute-admission action that would enable accelerator work to become executable. ACE obtains signed heads from independent append-only verifiable structures for policy and at least one additional domain selected from license/entitlements, unlearning status, export class, data residency, and energy and/or carbon budgets; verifies freshness (e.g., maximum-merge-delay, MMD) and append-only evolution; evaluates policy in a deterministic VM; computes an allow mask and a budget slice; and mints a CEP that commits to identifiers of the signed head(s) used for validation, the allow mask, the budget slice, audience, expiry, and an anti-replay tuple. In some embodiments, such heads may be supplied by governance rails labeled MSPRO, R2UA (also written R²UA), and/or AML-Gate; such labels are illustrative and non-limiting.

Head definition (illustrative; non-limiting). A "head" is an authenticated summary (e.g., root hash/checkpoint) of an append-only verifiable structure with an associated maximum-merge-delay (MMD) freshness budget and consistency proofs that demonstrate append-only evolution from previously observed heads.

Evidence Registry—CT-style (illustrative; non-limiting). The append-only Evidence Registry MAY expose STH/MMD freshness and inclusion and append-only evolution proofs for committed CEP/CRc digests; verifiers MAY audit STH freshness≤MMD and continuity across STHs.

Witness co-signing and threshold acceptance (illustrative; non-limiting). In some embodiments, a signed head is accompanied by, or co-signed with, witness attestations such that acceptance of the signed head requires verifying a threshold number of witness attestations (k-of-n) under a witness policy. Witness membership and rotation may be represented by a separate head or by fields committed by a policy head. Failure to satisfy the threshold may map to decision=HOLD with a structured precondition failure including remediation hints; the claims control.

Implementation neutrality (illustrative; evidence-only). "Signed head" includes a signed tree head, a signed set head, or a functionally equivalent accumulator head supporting inclusion and append-only evolution (consistency) proofs; "freshness policy" includes MMD or an equivalent head-age window. References to OS/TEEs, logs, proof systems, or device surfaces (driver, firmware, hypervisor/SR-IOV) are examples only; functionally equivalent implementations are included.

Permit token equivalence (illustrative; non-limiting). "Compute Execution Permit (CEP)" includes a short-lived workload permit token that is audience-bound (for example, to a driver, firmware, hypervisor device model, or SR-IOV virtual function) and that commits to head identifiers and a validity interval. Functionally equivalent permit tokens—whether issued by the orchestrator, delegated via a capacity envelope, or accepted from an external issuer—are included. In some embodiments, permit and receipt identifiers may use names such as permit_id, receipt_id, cep_id, cr_id, wdp_id, mdc_id, polc_id, or functionally equivalent identifiers; naming is non-dispositive; the claims control.

Algorithm agility & PQ cutover (illustrative; evidence-only). Signatures over CEP/CapP/CRc and head commitments are algorithm-agile (e.g., EdDSA/ECDSA and post-quantum suites). A profile MAY declare alg_suites and a pq_cutover_date; unknown suites MAY map to HOLD with a remediation hint to refresh alg_suites.

Verifiers MAY record acceptance_profile=LEGACY_ONLY, DUAL_ACCEPT, PQ_ONLY in Certification Results and/or in a signed index for audit (evidence-only; gate semantics unchanged).

An accelerator driver/firmware gate validates the CEP against current signed heads and budget meters before enabling a compute-admission action that would enable accelerator work to become executable, and fails closed on absence, expiry, mismatched audience, stale/invalid heads, exhausted applicable budget predicates (including energy/carbon budgets where enforced), export/residency violation, or missing or stale compliance status required by policy (e.g., license/entitlements and/or unlearning status). A Compute Receipt (CRc) commits to {cep_id, energy used (kWh), tflops_used, site/region, timestamps, model/workload IDs, head_ids, attestation_ids, decision, decision_code} for audit and settlement. Capacity Permits (CapP) delegate bounded sub-permits to schedulers.

Embodiments include streaming leases for long jobs, bundle CEPs for multi-stage pipelines, delegation to tenants, watcher corroboration, status stapling, privacy-preserving proofs for sensitive policy, and an append-only Evidence Registry for receipts and revocations. Public-interest safeguards (Appendix O) MAY be enabled without altering gate semantics, providing audit-only evidence of carbon context, demand-response participation, or humanitarian/mission-critical exceptions.

Cross-references (illustrative; non-limiting). Definitions, schemas, code taxonomies, conformance materials, examples, and audit-only appendices are provided in Appendices A-V (including Appendix R and, if present, Appendix R-1). Unless expressly stated otherwise, such materials are illustrative/audit-only and do not alter fail-closed admission semantics; the claims control.

Technical Effects & Advantages (Informative; Non-Limiting)

Implementations of ACE can provide measurable technical effects in computer operation and fleet governance, including:

Energy stewardship and efficiency. Enforcing permit-before-compute with kWh/TFLOP budget slices and trusted meters can reduce idle or misallocated accelerator cycles and align workloads to policy-preferred windows.

Fraud and manipulation resistance. Dual-meter reconciliation, quorum/watcher corroboration, and meter attestation bundles (MAB) can deter tampering or suppression and improve integrity of usage telemetry.

Regulatory-grade evidence. Compute Receipts (CRc) anchored in an append-only Evidence Registry can provide portable, verifiable records (e.g., location/residency, energy use, decision codes, and head identifiers) for audit and reporting.

Safety & compliance at device boundaries. Pre-effect driver/firmware/hypervisor gating with freshness-bounded multi-root heads (MMD/append-only evolution) and fail-closed semantics can reduce configuration drift and prevent stale-policy or over-budget kernels from reaching the accelerator execution surface.

Vendor-agnostic interoperation. A neutral permit/receipt format and code taxonomy can enable interoperable governance across heterogeneous accelerator stacks without requiring a particular vendor, API, or deployment model.

Generation-aware load shedding. When policy sources indicate grid-stress or local generation constraints, ACE can map discretionary workloads to HOLD or DENY while preserving PASS only for CEPs associated with designated priority-load classes, without hard-coding any particular generation technology.

Food-system resilience and cold-chain assurance. By tagging workloads, sites, and/or Capacity Permits with food-security classifications, deployments can reserve capacity for food-security-critical loads and record audit-only evidence in receipts indicating curtailment, priority admission, and related identifiers under fresh head vectors and budget predicates; such labels are evidence-only unless explicitly configured as gate predicates, and do not alter fail-closed semantics.

These effects are illustrative only. ACE does not require any particular efficiency level or carbon outcome; actual results depend on deployment choices, policies, and meter availability.

Non-abstract improvement to accelerator operation (illustrative; non-limiting).

Implementations of ACE are necessarily rooted in computer and accelerator technology. By relocating admission from scheduler- or API-level controllers into a bounded pre-effect decision slice inside the driver, firmware, or hypervisor gate, and by requiring CEP validation to current signed heads and device-level budget meters before enabling any compute-admission action that would enable accelerator work to become executable (including at least one of enqueue, kernel launch, DMA enablement, memory-mapping enablement, or mediated device or virtual-function enablement), ACE changes how accelerator queues and device models operate. The resulting fail-closed permit-before-compute gate cannot be carried out as a mental process or as mere post-hoc logging; it constrains the accelerator hardware itself to emit only PASS, HOLD, DENY, or EMERGENCY_STOP outcomes under freshness-bounded policy and budget predicates.

Deterministic inference technical effects (illustrative; non-limiting). On accelerators whose per-token latency and efficiency envelopes are substantially deterministic—such as LPUs whose on-die SRAM holds model parameters—ACE's budget and anti-cheat logic can treat expected TFLOPs-per-kWh and tokens-per-second ranges as part of the device profile. When Compute Receipts (CRcs) reveal sustained deviation from this profile, ACE can surface ANOMALOUS_EFFICIENCY, METER_TAMPER_SUSPECTED, or related codes at the gate and, if configured, downgrade meter_confidence, throttle admission, or escalate to GOCT-Compute. This cooperation between deterministic hardware and ACE's fail-closed admission semantics yields concrete improvements in anomaly detection and hardware-abuse prevention that cannot be achieved by post-hoc logging alone.

Deterministic inference—efficiency window identifier (illustrative; non-limiting).

In some embodiments, the policy program selects a device-profile efficiency identifier (also referred to as an efficiency_window_identifier) based at least in part on a model identifier and configuration (e.g., maximal sequence length, precision mode, and batch size). The CEP MAY commit to the efficiency_window_identifier, and the verifier MAY refuse admission when the identifier is not recognized, inconsistent with an attested device profile, or stale under configured policy; naming is non-dispositive; the claims control.

Efficiency-profile registry and head binding (illustrative; non-limiting). In some embodiments, canonical device-profile efficiency windows and efficiency_window_identifiers are published by, or referenced from, an append-only verifiable structure that exposes signed heads, and the head vector includes an efficiency_profile_head (or a functionally equivalent head) whose identifier is committed by a CEP together with an efficiency_window_identifier.

The verifier MAY refuse admission when the efficiency_window_identifier is not included under a current efficiency_profile_head satisfying freshness and append-only evolution predicates, thereby deterring rollback or tampering with efficiency profiles; the claims control.

Observed efficiency metrics and anomaly flags (illustrative; non-limiting). In some embodiments, the verifier derives observed efficiency metrics over at least one bounded verification window that precedes doorbell/queue submission and compares the observed metrics to the device-profile efficiency window. The system MAY record, in CRcs, at least the efficiency_window_identifier, the observed metrics, and one or more anomaly indicators (e.g., in_range, marginal, out_of_range) and MAY anchor CRc digests for audit; these fields are evidence-only unless explicitly configured; the claims control.

Protective state and revocation (illustrative; non-limiting). In some embodiments, upon detecting a configured number of out-of-window observations for a given efficiency_window_identifier within a bounded time window, the verifier transitions the deterministic inference accelerator (or a tenant-scoped slice thereof) to a protective state in which new CEPs for discretionary inference workloads are denied or held until a remediation condition is met, and MAY emit a revocation artifact that invalidates outstanding CEPs associated with the affected device/tenant scope; the claims control.

Thermal Reuse/Export Integration (Illustrative; Non-Limiting).

In some embodiments, ACE extends the head vector and receipt rail to include waste-heat reuse/export governance. ACE obtains, in addition to a policy head and one or more additional heads as described herein, one or more signed thermal heads comprising at least (i) a heat_reuse_head encoding thermal reuse predicates, measurement boundary identifiers, reuse KPI parameters, and/or reuse obligations, and (ii) a heat_sink_head encoding availability, capacity, and/or acceptance predicates for one or more external heat sinks (e.g., district heating injection windows, industrial off-take windows, or equivalent). Responsive to a PASS decision for a workload (or a class of workloads), ACE may mint a Waste-Heat Export Permit (WHEP) that commits to at least: (a) the applicable heat head identifiers and freshness bounds, (b) a handoff_point_id and meter attestation bundle digest, (c) a recipient scope (heat sink identity and/or allowed injection endpoints), (d) an effective window and expiry, and (e) an anti-replay tuple. The system may generate one or more Heat Receipts (HRc) based on measured thermal delivery at the handoff point, where the HRc commits to at least: {whep_id, thermal_energy_delivered, handoff_point_id, timestamps, head_ids, meter_ids/attestation_ids, and an anti-replay or uniqueness binding}, and may anchor a digest into an append-only Evidence Registry for inclusion/consistency proofs. These thermal artifacts are compatible with, but do not require, external settlement; admission semantics remain fail-closed on the configured predicates at the compute gate.

Exception and Offer/Response Receipts (Illustrative; Non-Limiting).

In some embodiments, the system generates additional evidence objects to reduce audit friction where a thermal reuse obligation exists but delivery is constrained by external factors, such as seasonal demand constraints or a heat sink's refusal or inability to accept delivered heat. Such evidence objects may include a Heat Offtake Offer Receipt (HOOR) signed by the data center/operator and a Heat Offtake Response Receipt (HORR) signed by the heat sink operator (or an equivalent authority), each committing to offer/response parameters, windows, capacity constraints, and reason codes. These receipts are evidence-only unless explicitly configured as gate predicates; they do not weaken fail-closed admission semantics.

Thermal-credit receipts (TCRc) (illustrative; non-limiting). In some embodiments, ACE extends the thermal evidence rail to support issuance of a Thermal-Credit Receipt (TCRc) derived from one or more Heat Receipts (HRc). A TCRc is an evidence artifact that commits to at least: (i) an HRc identifier or digest, (ii) the handoff_point_id and a measurement window identifier, (iii) a computed credit quantity or entitlement quantity derived from policy parameters indicated by the heat_reuse_head, and (iv) head identifiers and timestamps sufficient for independent audit. A TCRc MAY include pointers to external settlement or credit-bundle systems, but no settlement mechanism is required; the claims control.

Anti-double-count issuance gate (illustrative; non-limiting). In some embodiments, issuance of a TCRc is fail-closed by default unless an anti-double-count predicate is satisfied. The predicate may comprise one or more of: uniqueness of an HRc digest, uniqueness of a tuple {handoff_point_id, measurement window identifier}, a monotonic meter counter binding, and/or an inclusion reference under a current signed head of an append-only evidence registry. If a conflict is detected, the system maps issuance to HOLD or DENY with a structured precondition failure and remediation hints (e.g., provide a non-overlapping window, refresh head, or obtain a response receipt); the claims control.

Deduplication structure for anti-double-count (illustrative; non-limiting). In some embodiments, satisfaction of an anti-double-count predicate includes consulting a deduplication structure (e.g., an append-only set, key-value store, accumulator, or functionally equivalent) keyed by at least one of: (i) an HRc digest, (ii) a tuple {handoff_point_id, window_id}, or (iii) a monotonic meter counter binding, and issuance of a Thermal-Credit Receipt (TCRc) is denied or held by default when uniqueness cannot be verified; the claims control.

Thermal-credit HOLD triggers (illustrative; non-limiting). In some embodiments, issuance of a Thermal-Credit Receipt (TCRc) is fail-closed by default and is mapped to HOLD (or DENY per policy) when a configured prerequisite deficit exists, including without limitation: (i) a heat_sink_head indicates unavailability or no acceptance capacity for a requested window or recipient scope, and/or (ii) a Heat Offtake Response Receipt (HORR) is required by policy and a current HORR is absent, stale, or inconsistent. In such cases, the issuer outputs a Structured Precondition Failure with machine-actionable remediation_hints (e.g., obtain a current HORR, refresh heat_sink_head, or retry in a non-overlapping window) and MAY deny issuance if a policy-defined remediation condition is not met; the claims control.

Optional attribution and allocation (illustrative; non-limiting). In some embodiments, the system allocates thermal credit among tenants or workloads using evidence-only linkage between compute receipts (CRc) and heat receipts (HRc), such as by overlapping windows, shared site identifiers, and/or policy head identifiers. Allocation may be proportional to at least one of energy_used, tflops_used, tokens processed, or other functionally equivalent usage measures. Allocation does not alter permit-before-compute admission semantics; the claims control.

Optional mapping to credit bundles and rate-impact classes (illustrative; non-limiting). In some embodiments, the system maps a TCRc to a credit_bundle_id and/or a rate_impact_class_id for accounting, reporting, procurement, or utility programs. Such mappings are evidence-only unless explicitly configured elsewhere and do not modify fail-closed admission semantics.

Revocation and clawback propagation (illustrative; non-limiting). In some embodiments, if an HRc or a policy head used for issuance is revoked, superseded, or determined inconsistent under append-only evolution verification, the system issues a clawback or adjustment record that references the affected TCRc and propagates the invalidation to dependent bundles or settlement pointers. This is illustrative; any revocation propagation mechanism is within scope; the claims control.

Equivalents (Illustrative; Non-Limiting)

"Accelerator" includes a GPU, TPU, NPU, FPGA, deterministic inference accelerator (for example, a language-processing unit (LPU) or other inference-optimized ASIC with queue/doorbell semantics), or compute fabric with queue/doorbell semantics. "Driver gate" includes kernel-mode driver paths, device firmware microcode, and hypervisor device models enforced prior to a compute-admission action (e.g., doorbell/queue submission), including per-VF SR-IOV functions; each is configured to fail closed absent a valid CEP.

"Energy/carbon budget" includes power/energy windows, datacenter caps, renewable guarantees, or functionally equivalent limits (kWh, kgCO2e). "Export class" includes ECCN or functionally equivalent controls. "Residency" includes region/site constraints. "Stapled status" may carry attestation artifacts such as EAT/JWT tokens and SPDM/CoRIM transcripts; CoRIM identifiers MAY reference endorsed measurement values.

VI. System Architecture Overview (Illustrative; Non-Limiting)

Control vs. admit path. ACE separates a control plane (Head Fetchers HF 102, Proof Verifiers PV 104, Policy VM PVM 106, Budget Meter BM 108, CEP Issuer CEPI 110, Evidence Bus EB 112, Status Responder SR 114) from the admit path (admit compute( ) at the driver/firmware/hypervisor gate). The admit path executes prior to a compute-admission action (e.g., prior to doorbell/queue submission) and is fail-closed absent a valid CEP and fresh heads/meters (see FIG. 1, FIG. 4). See also Appendix D (quorum/stapling) and Appendix C (codes: STALE_HEAD, INCONSISTENCY_DETECTED).

Head verification & freshness. HF retrieves a head vector comprising a signed policy head and one or more additional signed heads selected from license, unlearning, export, residency, and energy/carbon budgets; PV verifies MMD freshness, inclusion in current signed head(s), and append-only evolution (consistency), optionally with k-of-m quorum and watcher corroboration. Disagreement across dual anchors maps to HOLD with a continuity record until a linking proof appears (see FIG. 2).

Diversity constraints (illustrative; non-limiting). In some embodiments, a quorum policy includes one or more diversity constraints across organization, geography, and/or implementation, and acceptance of a head vector requires corroborations satisfying the diversity constraints; the claims control.

Continuity record (illustrative; non-limiting). In some embodiments, when dual-anchor disagreement occurs or append-only evolution (consistency) verification fails, the verifier emits a signed continuity record that commits to at least identifiers for the disagreeing heads and an observed_at timestamp, and may include a continuity_reason_code. A digest of the continuity record may be anchored into an append-only Evidence Registry for inclusion and append-only evolution proofs; the claims control.

Split-view and rollback suspicion triggers (illustrative; non-limiting). In some embodiments, split-view or rollback suspicion is triggered by one or more of: (i) dual-anchor disagreement for a same logical head name, (ii) failure of a presented consistency proof, (iii) non-monotonic snapshot indicators, (iv) watcher reports indicating inconsistent head observations across vantage points, or (v) replay of previously observed head states beyond an allowed window. On such trigger, the verifier may emit a continuity record and map admission to decision=HOLD or decision=DENY per policy; the claims control.

Head and proof caching (illustrative; non-limiting). In some embodiments, verifiers maintain a cache of previously observed signed heads and may cache one or more inclusion or consistency proofs (append-only evolution proofs) for reuse across multiple admissions, reducing verification latency while preserving freshness and append-only evolution requirements.

Policy evaluation & budget binding. PVM computes an allow_mask from policy/program inputs; BM binds a budget slice (kWh/TFLOP/time window) to device-truth meters (NVML/CUPTI on NVIDIA, AMD SMI, Level-Zero Sysman on Intel). Negative remaining budget at gate time yields ENERGY_BUDGET_EXCEEDED, regardless of scheduler state (see FIG. 6). See Appendix G (NVML/CUPTI/SMI/ZES, formulas) and Appendix B (CRc fields).

In some deployments, the energy head and budget meter inputs may incorporate grid-stress or generation-asset signals. For example, a microgrid controller for a campus that is partially powered by a small modular or microreactor nuclear plant MAY publish a curtailment or safety status that is ingested into the policy head or energy head. When such a signal indicates that only critical loads should be served, the Policy VM and Budget Meter can jointly cause the allow_mask and remaining budget to map discretionary accelerator workloads to HOLD or DENY, while preserving PASS only for CEPs tagged as critical infrastructure, emergency response, or other public-interest classes. The same semantics apply whether the generation asset is nuclear, renewable, or fossil; generation sources are treated as policy inputs and do not alter ACE's fail-closed admission predicates.

Priority-load reservation expression (illustrative; non-limiting). In some embodiments, a policy program and/or a capacity permit mechanism expresses a reserved bounded portion for one or more priority-load classes as at least one of: (i) a reserve_fraction of capacity, (ii) a reserved_slots quota for a time window, and/or (iii) a reserved_budget_slice for a window.

During an active curtailment window or critical-loads-only condition, attempts by non-priority workloads to consume the reserved bounded portion are fail-closed and map to HOLD or DENY, optionally returning a Structured Precondition Failure including retry_after_ms and remediation_hints (e.g., request_priority_CapP, wait_for_window, or resubmit with a qualifying classification tag), without altering ACE's fail-closed admission predicates; the claims control.

Curtailment/critical-loads condition head (illustrative; non-limiting). A "curtailment or critical-loads condition head" is a signed head that encodes one or more indicators such as an active curtailment window, a demand-response event identifier, a grid-stress state, or a critical-loads-only condition. The curtailment or critical-loads condition head may be provided as a distinct head in the head vector or as a designated field within an energy head or policy head; functionally equivalent encodings are included.

Curtailment signal sources and indicator set (illustrative; non-limiting). In some embodiments, a curtailment or critical-loads condition head is derived from one or more signal sources including a grid-operator or utility signal feed (e.g., demand-response event identifiers, curtailment notices, congestion indicators, or price-class signals), a microgrid controller, and/or a behind-the-meter generation-asset status publisher. Non-limiting indicators encoded by the head include at least one of: {curtailment_window_id, dr_event_id, grid_stress_level, congestion_level, price_class, generation_asset_status, and a critical_loads_only flag}, and functionally equivalent encodings are included; the claims control.

Site/region selection under energy constraints (illustrative; non-limiting). In some embodiments, the policy program computes an allow mask that encodes a selected site or region based at least in part on energy/carbon constraints or curtailment conditions, and the verifier enforces the selected site or region at admission.

Thermal Heads in the Head Vector (Illustrative; Non-Limiting).

In some embodiments, the head vector further includes a heat_reuse_head ($H_h$) and a heat_sink_head ($H_s$). The heat_reuse_head may encode one or more thermal reuse predicates, measurement boundary identifiers, handoff definitions, KPI parameters, or reuse obligations; the heat_sink_head may encode one or more heat sink availability, acceptance, capacity, or window constraints. The heat heads may be provided as distinct heads or as designated fields within the policy head or energy head; functionally equivalent encodings are included.

Thermal Capacity and Deficit Tracking (Illustrative; Non-Limiting).

In some embodiments, ACE maintains a thermal_recovery_budget or thermal_deficit ledger per site, tenant, or policy class. The ledger may be computed from one or more of: (i) HRcs (measured delivered thermal energy), (ii) compute receipts (energy used and/or derived thermal output estimates), and (iii) policy parameters in the heat_reuse_head. The Policy VM may compute an allow_mask that includes a thermal predicate (e.g., thermal_ok, sink_ok, reuse required) and the verifier may map admission to HOLD or DENY when a configured thermal obligation is not met or when the heat_sink_head indicates no available acceptance capacity for a window. Such thermal gating is optional and profile-selectable; when enabled, it is enforced with the same fail-closed semantics as other predicates.

Waste-Heat Export Permit Issuance (Illustrative; Non-Limiting).

In some embodiments, responsive to a PASS decision (or as a prerequisite for PASS under certain policies), the system issues a Waste-Heat Export Permit (WHEP) that is audience-bound to a designated thermal boundary verifier (for example, a facility controller, pump/valve controller, heat pump supervisory controller, or an equivalent boundary) and that commits to heat head identifiers, handoff_point_id, recipient scope, a validity interval, and anti-replay. The WHEP is validated at a thermal export boundary in a fail-closed manner analogous to admit compute( ), such that thermal export claims used for audit/settlement must present a valid WHEP and a corresponding HRc that validates to current signed heads and meter attestations, as configured; the claims control.

Permit issuance. CEPI mints a short-lived, audience-bound CEP that commits to head_commitments/allow_mask/budget/expiry/anti-replay/attestations (EAT/JWT, SPDM/CoRIM, ZK digest). Leases, bundles, and delegation (CapP→sub-CEPs) are supported (see FIG. 3, FIG. 9). See Appendix B (CEP/CapP schemas) and Appendix I (field names).

Admission & enforcement. Prior to a compute-admission action (e.g., doorbell/queue submission), the gate executes a bounded decision slice that short-circuits on a first deficit and fails closed by default. In some embodiments, verifiers cache previously observed heads and reusable proofs, and may pipeline, parallelize, or split checks across driver/firmware/hypervisor components while remaining fail closed on any deficit; ordering is non-dispositive; the claims control.

Order and placement (illustrative; non-dispositive). The order, grouping, and placement of checks within the decision slice are illustrative and non-dispositive. Functionally equivalent implementations MAY perform checks in any order, in parallel, and/or across split verifier components (including split across driver, firmware, and hypervisor surfaces), while remaining fail closed on any deficit. For avoidance of doubt, the decision slice is enforced pre-effect and constrains the compute-admission action surface itself, acceptance requires a PASS outcome, and any non-PASS outcome prevents the compute-admission action regardless of higher-layer scheduler state.

Signature/expiry/audience. Verify CEP signature and expiry; confirm binds_to.audience (per-VF where applicable). Deficits map to a non-admission outcome with decision code including at least one of: POLICY_DENIED, PERMIT_EXPIRED, or AUDIENCE_MISMATCH.

Time-synchronization sanity check. Verify clock skew is within a configured threshold for freshness and expiry evaluation; violations may map to decision=HOLD with decision_code=TIME_SYNC_ERROR and remediation hints.

Attestation & stapled-status recency (<=MMD). When configured or required by policy, validate EAT/JWT and/or SPDM/CoRIM evidence. When a stapled status is present for a head referenced by the CEP, enforce that the stapled status satisfies recency<=the freshness policy (e.g., <=MMD). Deficits map to decision_code including at least one of: ATTESTATION_FAILED, STATUS_STALE, or EVIDENCE_EXPIRED.

Head validation to current signed heads. Fetch current signed heads and, for each head committed by the CEP, verify inclusion/commitment under the current signed head and, upon head advance, verify append-only evolution (consistency) relative to a previously observed head.

In dual-anchor mode, disagreement may map to decision=HOLD with decision_code=DUAL_ANCHOR_CONFLICT and emission of a continuity record until a linking consistency proof appears; if quorum is enabled, inability to satisfy k-of-m corroboration may map to decision=HOLD with decision_code=QUORUM_UNAVAILABLE and remediation hints.

Budget enforcement (device-truth preferred). Reconcile budget against trusted meters (e.g., NVML/CUPTI, AMD SMI, Intel ZES; fallback BMC/Redfish/PDU with meter_confidence=LOW). When remaining kWh and/or TFLOP budget is negative, map to decision_code=ENERGY_BUDGET_EXCEEDED and/or CARBON_BUDGET_EXCEEDED (as configured). Anti-cheat anomalies may map to decision_code including: METER_TAMPER_SUSPECTED, METER_SUPPRESSION_DETECTED, or ANOMALOUS_EFFICIENCY.

Policy predicates (allow mask). Enforce export-class, data-residency, license/entitlements, and unlearning predicates computed by the Policy VM. Deficits map to decision_code including at least one of: EXPORT_CLASS_DENIED, RESIDENCY_DENIED, LICENSE_MISSING, ULP_STALE, or POLICY_DENIED.

Decision & evidence.

(i) PASS: write a Compute Receipt (CRc) and, in some embodiments, anchor a digest in an append-only Evidence Registry (evidence-only).

(ii) HOLD or DENY: return a Structured Precondition Failure/Decision Envelope with machine-actionable fields {decision, decision_code, retry_after_ms (optional), remediation_hints (optional), context (optional) }, and optionally {decision_id, deny_signature}; code_id MAY be used as a compatibility alias for decision_code. In some embodiments, a digest of the Decision Envelope MAY be anchored in an append-only Evidence Registry for audit (evidence-only), without weakening fail-closed admission semantics.

(iii) Optional (evidence-only): bind the admission outcome to a queue_token_id valid only prior to the compute-admission action (e.g., prior to doorbell/queue submission); presence in a CRc (PASS) or in a Decision Envelope (non-PASS) improves traceability and does not alter gate predicates.

Audit-only signaling (informative; non-limiting). A deployment MAY include audit-only labels or contact references in EvidenceBundles or a Conformance Manifest for discovery; such items are informational only, imply no commercial terms, and do not alter gate semantics; the claims control.

Non-admission evidence (illustrative; non-limiting). In some embodiments, the system emits an audit record for a non-admission outcome (HOLD or DENY), such as a Decision Envelope (Appendix C) or a decision receipt (if implemented), and may anchor a digest of such record into an append-only Evidence Registry. Such evidence does not weaken fail-closed admission semantics.

Cross-references. See FIG. 4 for the state machine and example check order; Appendix E for pseudocode; Appendix C for the deny/hold taxonomy.

Time synchronization and skew handling (illustrative; non-limiting). In some embodiments, the verifier performs a time-synchronization sanity check for freshness and expiry evaluation, including verifying that local clock skew is within a configured threshold (e.g., max_skew_ms). A violation may map to decision=HOLD with decision_code=TIME_SYNC_ERROR and remediation hints (e.g., refresh time source, retry after backoff); the claims control.

Curtailment-compliance evidence fields and curtailed_kWh computation (illustrative; non-limiting). In some embodiments, during an active curtailment window or critical-loads-only condition, the verifier emits non-admission evidence for discretionary workloads, including a Decision Envelope (Appendix C) and/or a Structured Precondition Failure that records one or more curtailment-compliance evidence fields such as dr_event_id, curtailment_window_id, and curtailed_kWh. Curtailed_kWh may be computed as an estimate of curtailed energy for a request, including at least one of: (i) requested_kWh_window minus admitted_kWh_window, (ii) estimated_energy_required_kWh for the requested workload minus an admitted energy budget, and (iii) a functionally equivalent difference or estimate. Such curtailment-compliance evidence fields are audit-only unless expressly configured; the claims control.

Evidence & audit. On PASS (or termination, where applicable), EB emits a Compute Receipt (CRc) that, in some embodiments, includes fields such as: {cep_id, workload_id, model_id, site/region, energy_used (kWh), tflops_used, head identifiers, attestation identifiers, timestamps, decision outcome, decision_code}. An Evidence Registry may optionally anchor a digest of the CRc (evidence-only) and provide inclusion and append-only evolution (consistency) proofs for audit and dispute reduction. Optional fields (e.g., kgCO2e, energy_source_mix, meter_confidence, anchors, continuity_record_id) are audit-only and do not alter admission semantics unless expressly claimed.

Cross-rail pointers (illustrative; evidence-only). In some embodiments, CRcs or EvidenceBundles include pointers to other rails or external evidence objects (e.g., ulp_id, export_receipt_id, settlement_receipt_id, or functionally equivalent identifiers) to aid auditors in reconstructing end-to-end provenance. Such pointers are evidentiary linkages only and do not alter admit_compute( ) semantics.

Thermal receipts and registry anchoring (optional extension; illustrative; non-limiting). In some embodiments, EB emits Heat Receipts (HRc) for measured thermal delivery at a designated handoff point and may anchor HRc digests into an append-only Evidence Registry.

HRcs may include audit-only fields (e.g., temperature_at_handoff, flow_rate, deltaT, thermal_loop_id, heat_pump_cop, and/or a named emissions factor source for derived displacement estimates). Thermal evidence is optional and does not alter fail-closed compute admission unless expressly configured or expressly claimed.

Cross-rail settlement pointer (illustrative; non-limiting). In some embodiments, HRcs and/or HOOR/HORR evidence objects include pointers to an external settlement or receipt rail (e.g., via identifiers such as popc_id, escrow_id, settlement_receipt_id). Such pointers are evidence-only and do not alter ACE compute admission semantics.

Virtualization & per-VF binding. In SR-IOV and mediated-device contexts, each virtual function (VF) may enforce independent CEP validation and device/VF binding. Audience or binding mismatch may map to decision=DENY with decision_code=AUDIENCE_MISMATCH (or an equivalent code). Stale staples may map to decision=HOLD with decision_code=STATUS_STALE or decision=DENY with decision_code=EVIDENCE_EXPIRED (per policy). See FIG. 7; see also Appendix D (profiles) and Appendix C (example codes).

Privacy & extensibility. Privacy-sensitive predicates (e.g., export/residency/unlearning) may be evaluated using privacy-preserving mechanisms (e.g., ZK verdicts) with proof digests committed for auditors. Equivalent compute surfaces (e.g., DPUs/SmartNICs, FPGAs, cloud ML ASICs) may follow the same permit-before-compute semantics at a pre-effect chokepoint. See FIG. 8 and Appendix F (attestation/proof patterns).

Reference builds (illustrative; non-limiting). An OEM integration kit may include: (i) a driver/firmware reference gate enforcing CEPs at a pre-effect admission chokepoint (e.g., pre-doorbell), (ii) a verifier/index with optional signed-index export, and (iii) an Evidence Registry shim (append-only heads, freshness, inclusion/consistency proofs). Such artifacts are implementation aids and do not alter claim scope.

VII. BRIEF DESCRIPTION OF THE DRAWINGS

Figure 1:
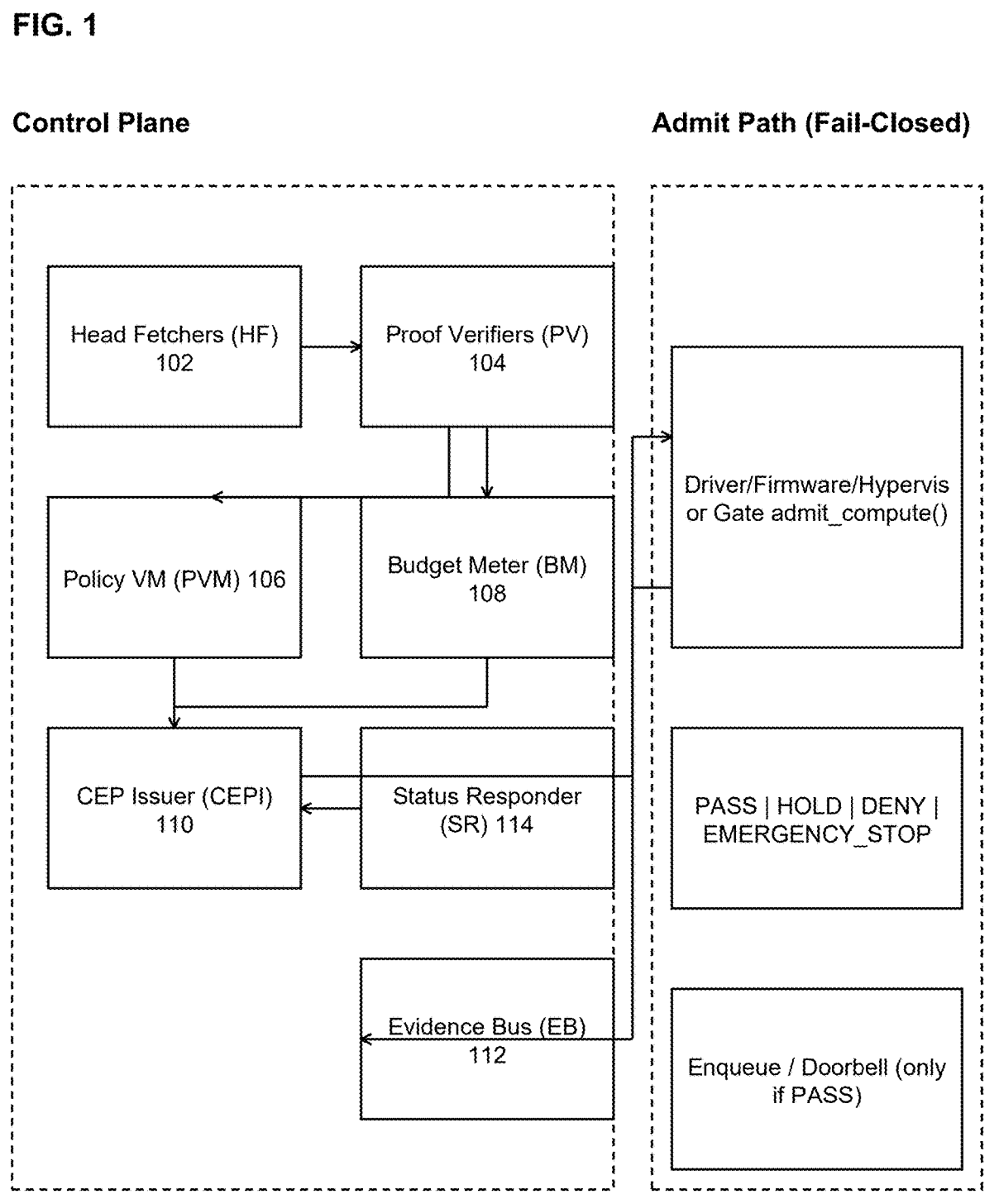

FIG. 1—ACE orchestrator (illustrative; non-limiting). Head Fetchers (HF 102), Proof Verifiers (PV 104), Policy VM (PVM 106), Budget Meter (BM 108), CEP Issuer (CEPI 110), Evidence Bus (EB 112), Status Responder (SR 114). Shows control plane vs. admit path and where fail-closed admission occurs.

FIG. 2—Multi-root freshness & consistency (example heads; illustrative; non-limiting). Policy head ($H_p$ 202) and one or more additional heads such as license ($H_l$ 204), unlearning ($H_u$ 206), export ($H_x$ 208), residency ($H_r$ 210), and/or energy/carbon ($H_e$ 212); inclusion proofs (214), append-only evolution (consistency) proofs (216), freshness window (218), watcher/quorum (k-of-m 220).

Figure 3:
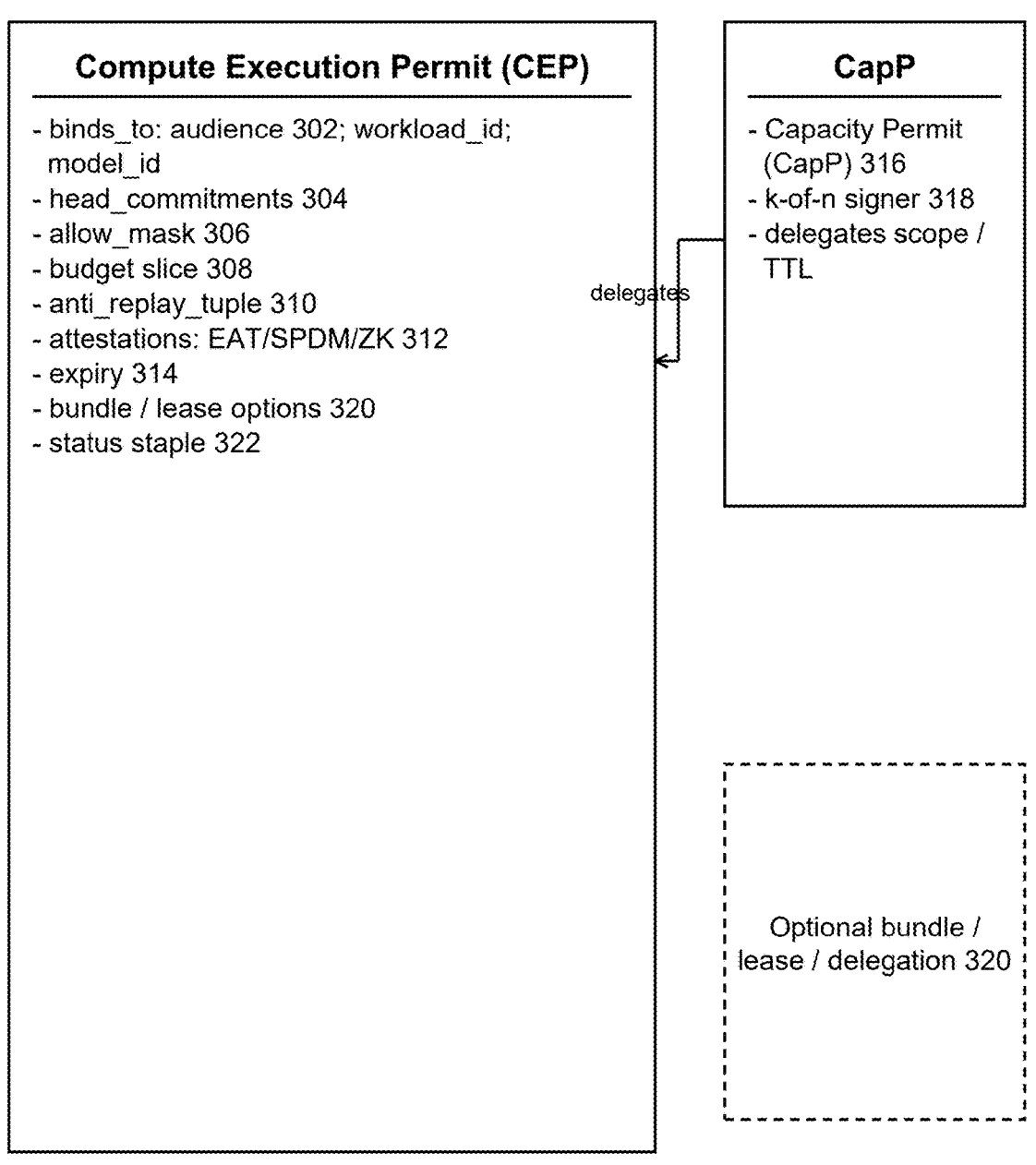

FIG. 3—CEP/CapP structures (illustrative; non-limiting). CEP fields include binds to (audience 302/workload_id/model_id), head_commitments (304), allow_mask (306), budget slice (308), anti_replay (310), optional attestations (312), and expiry (314). Capacity Permit (CapP 316) with optional k-of-n signer (318); bundle/lease options (320); optional status staple (322).

Figure 4:
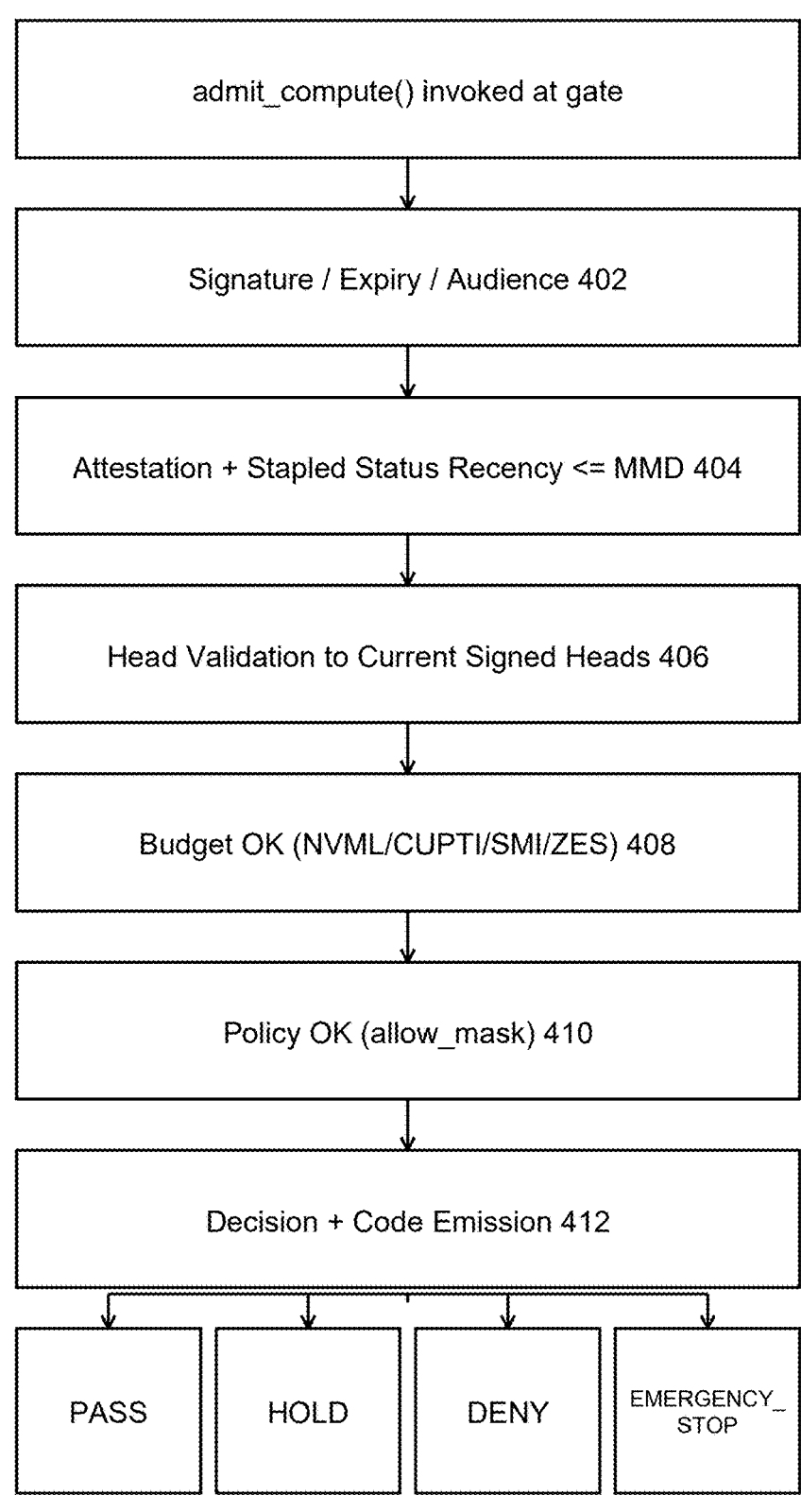

FIG. 4—admit compute( ) verifier & state machine (illustrative; non-limiting). Example outcomes PASS/HOLD/DENY with optional EMERGENCY_STOP for designated tiers; checks include signature/expiry/audience (402), attestation/staple recency (404), head validation to current signed heads (406), budget evaluation with meters (408), policy allow_mask predicates (410), and decision_code outputs (412).

Figure 5:
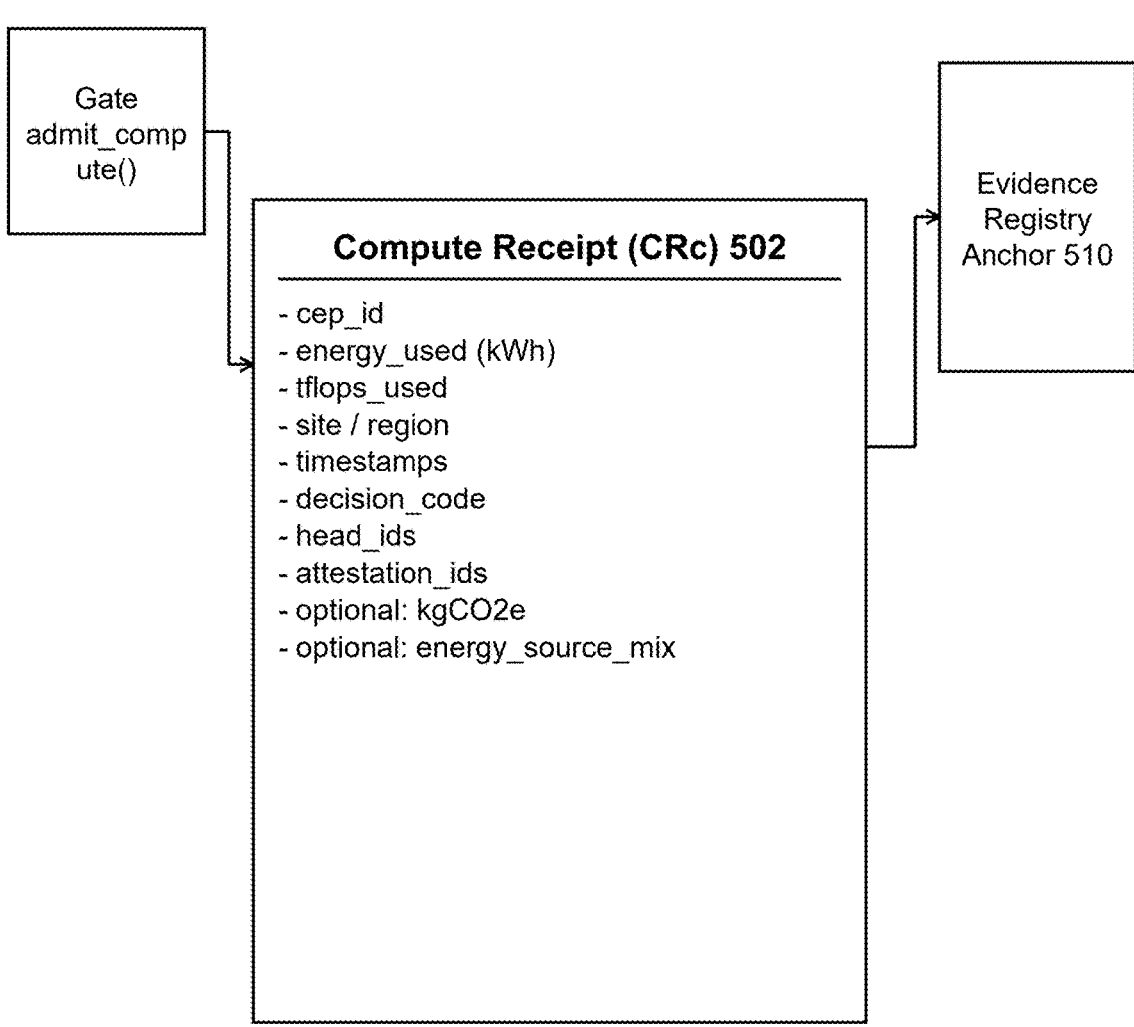

FIG. 5—Compute Receipt (CRc) & Evidence Registry (illustrative; non-limiting). Example CRc fields (502): cep_id, energy used (kWh), tflops_used, site/region, optional kgCO2e, optional energy_source_mix, decision outcome, decision_code, head identifiers, attestation identifiers; optional registry anchor (510).

Figure 6:
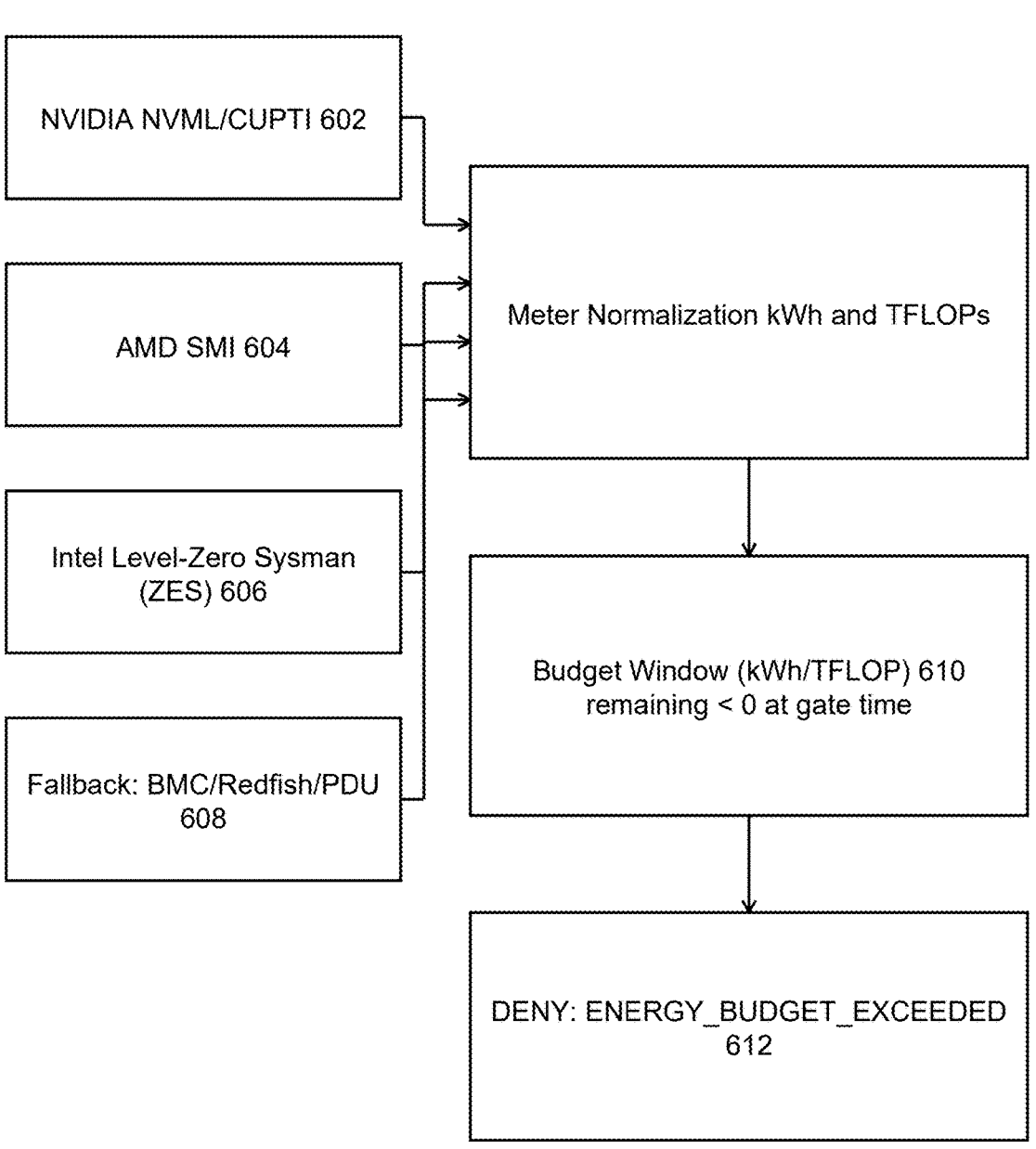

FIG. 6—Metering sources & normalization (illustrative; non-limiting). Device-truth meters (e.g., NVML/CUPTI (602), AMD SMI (604), Intel ZES (606)); fallback BMC/Redfish/PDU (608); budget windows (610); negative remaining budget may map to ENERGY_BUDGET_EXCEEDED (612) per policy.

FIG. 7—Hypervisor/SR-IOV per-VF enforcement (illustrative; non-limiting). VF binding (702), audience check (704), per-VF CEP validation (706), mediated device model (708), status stapling evaluation (710).

Figure 8:
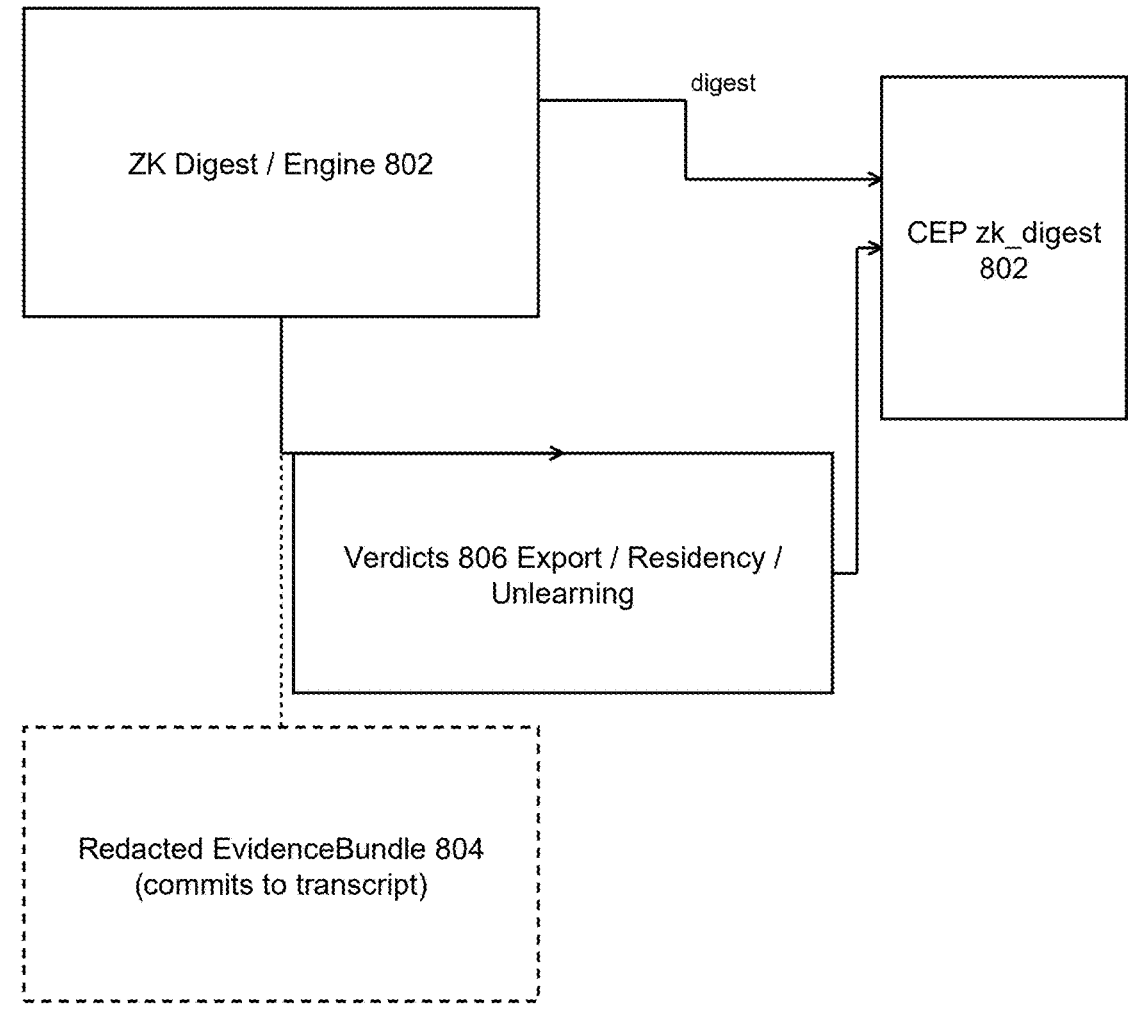

FIG. 8—Privacy-preserving predicates (illustrative; non-limiting). ZK digest (802), redacted EvidenceBundle (804), export/residency/unlearning verdicts (806).

Figure 9:
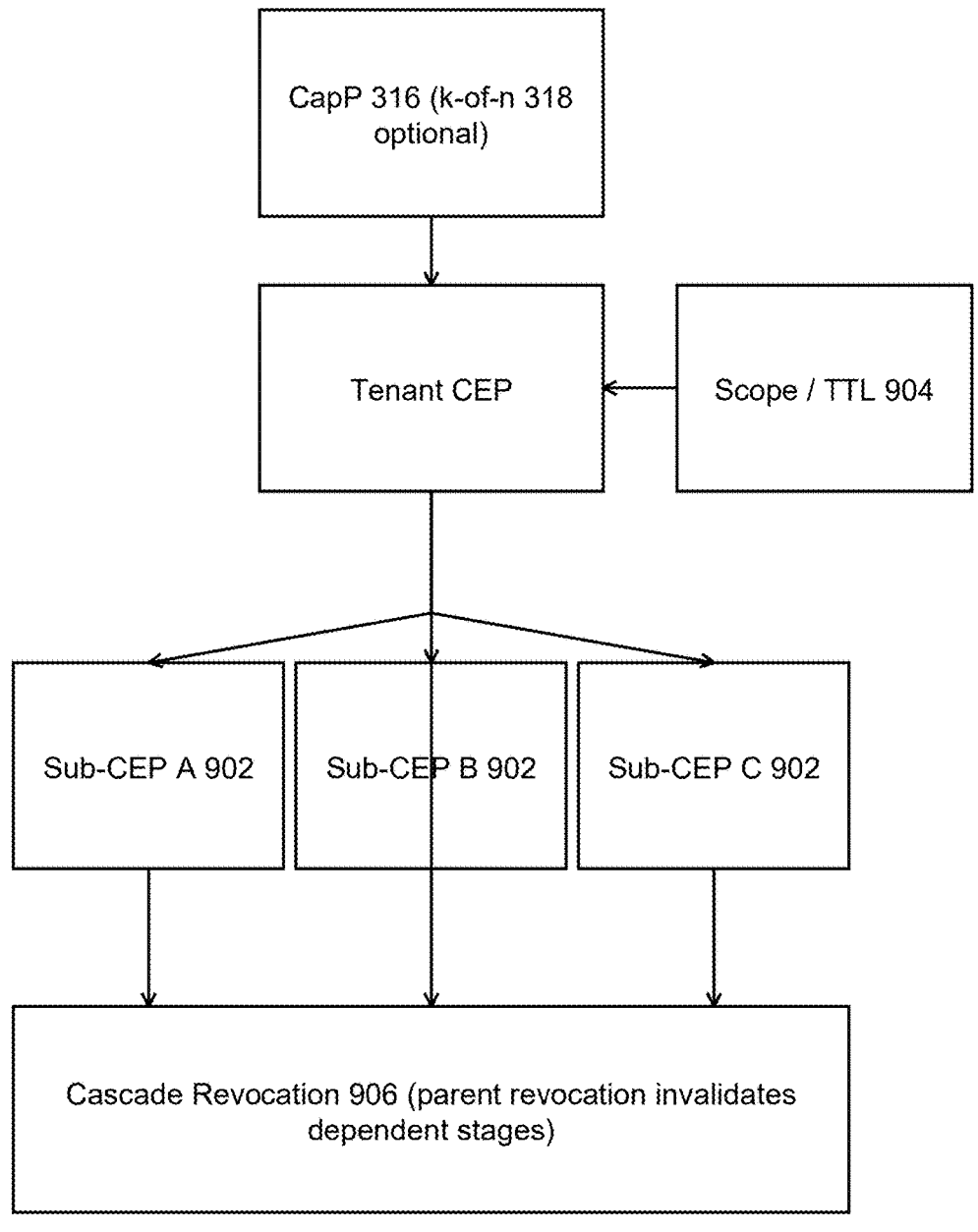

FIG. 9—Delegation & bundles (illustrative; non-limiting). CapP→tenant CEP→sub-CEP tree (902), scope/TTL (904), cascade revocation (906).

Figure 10:
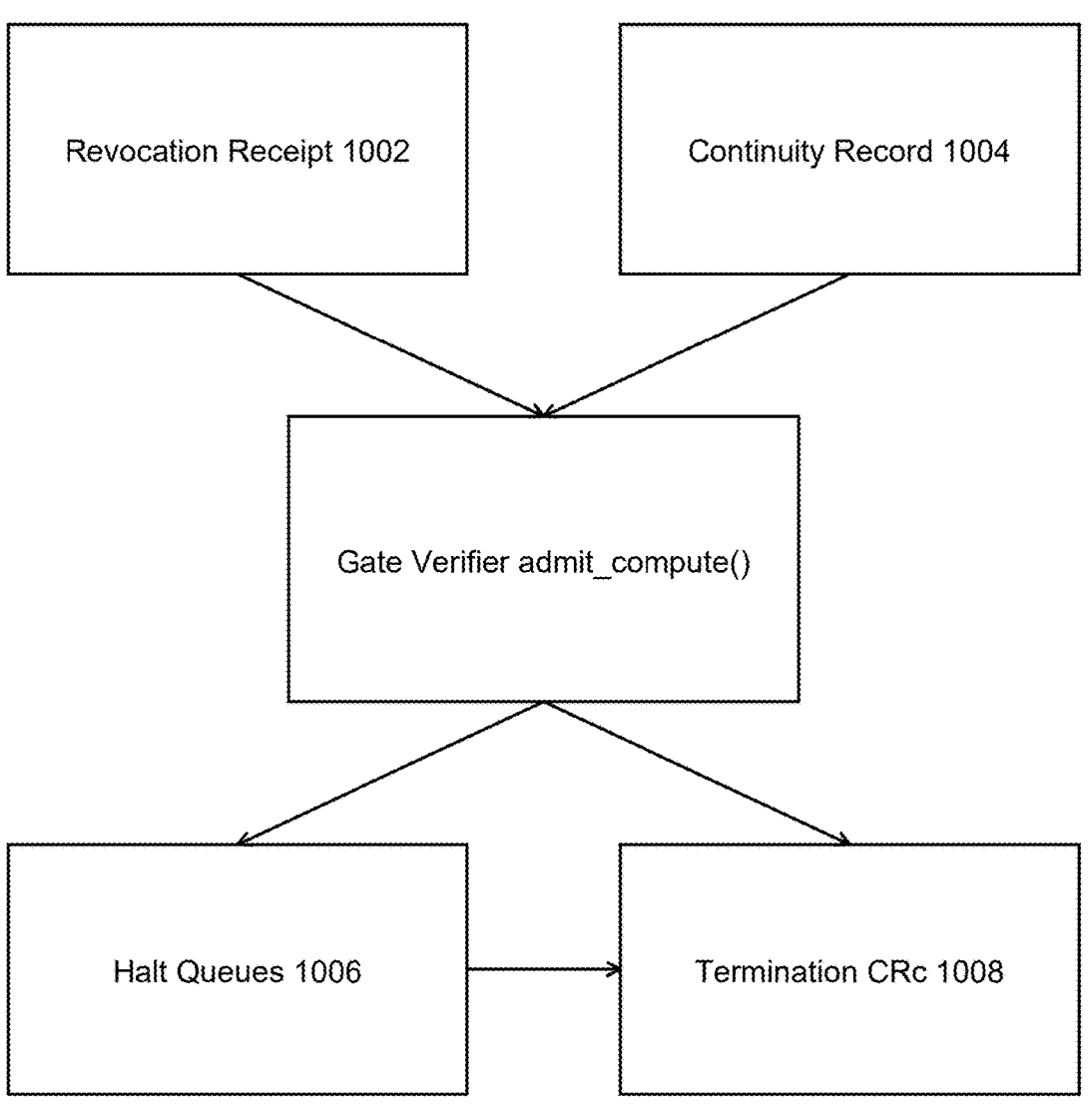

FIG. 10—Revocation & kill-switch (illustrative; non-limiting). Revocation Receipt (1002), continuity record (1004), halt queues (1006), termination CRc (1008).

Figure 11:
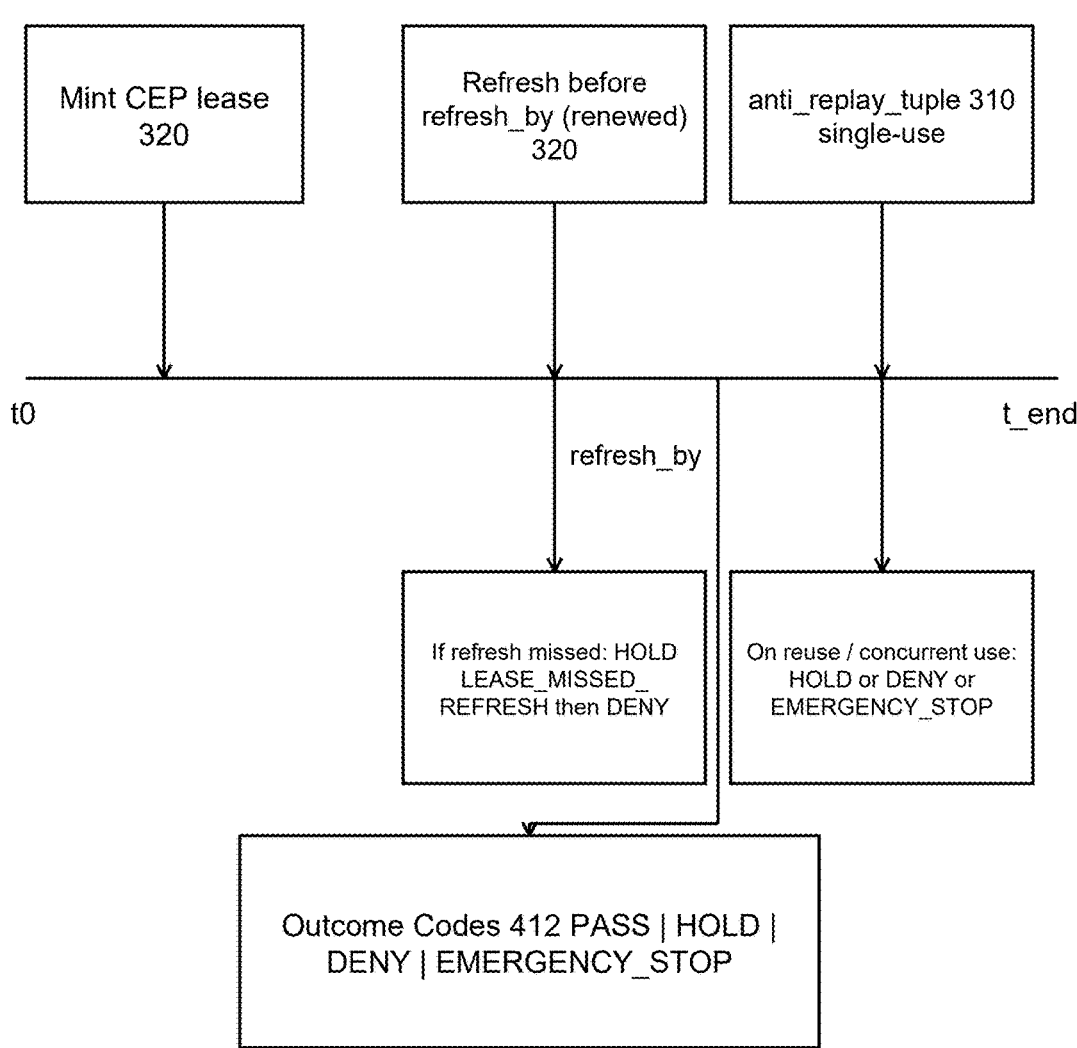

FIG. 11—Streaming lease & single-use timeline (illustrative; non-limiting). CEP carries lease (320) and anti replay (310). Timeline shows: mint at t0→refresh before refresh by (lease renewed)→or HOLD(LEASE_MISSED_REFRESH) then DENY if not renewed; concurrent reuse may escalate per policy; example outcomes emitted at (412).

Figure 12:
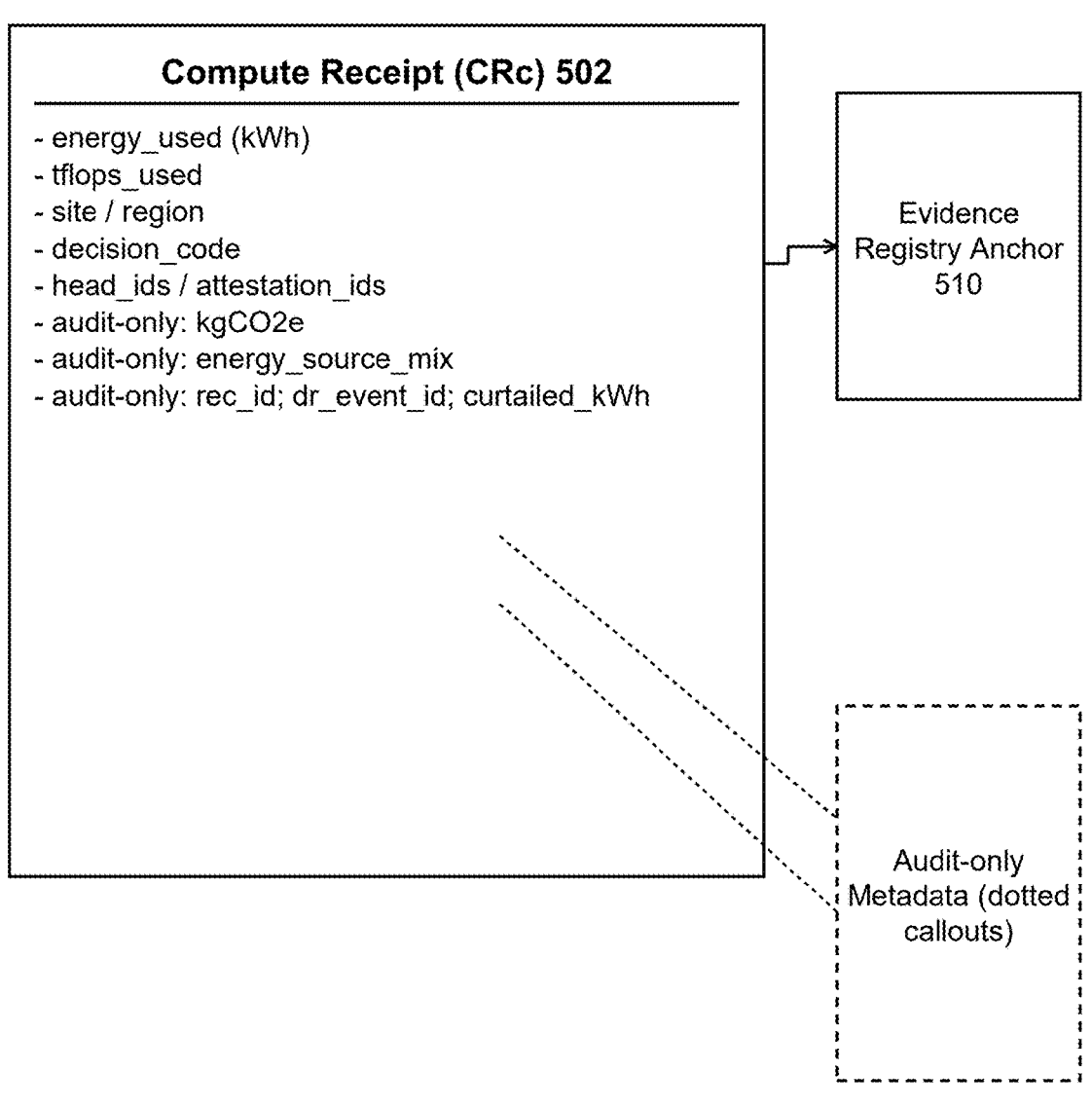

FIG. 12—Energy stewardship & public-interest evidence (illustrative; non-limiting). CRc (502) may record audit-only fields (e.g., kgCO2e, energy_source_mix, rec_id, dr_event_id, curtailed_kWh) and optionally anchors a digest into the Evidence Registry (510). Such fields are evidence-only and non-dispositive.

Reference Numerals (illustrative; non-limiting). 100 orchestrator; 102 HF; 104 PV; 106 PVM; 108 BM; 110 CEPI; 112 EB; 114 SR; 202-212 heads; 214 inclusion proof, 216 consistency proof, 218 freshness window; 220 quorum; 302-322 CEP/CapP fields; 402-412 verifier checks; 502-510 CRc/anchor; 602-612 metering; 702-710 hypervisor/SR-IOV; 802-806 privacy; 902-906 delegation; 1002-1008 revocation/kill. Names map to equivalent components and do not alter claim scope.

VIII. DETAILED DESCRIPTION OF THE INVENTION

Conventions (illustrative; non-limiting). The terms "MUST," "SHOULD," and "MAY," when used herein, are used (where present) as specification posture for illustrative examples and are not intended to limit claim scope; the claims control. Numerics are illustrative and non-limiting. No element invokes 35 U.S.C. § 112(f) absent express "means for" or "step for." "Append-only evolution (consistency) proof" denotes that a current signed head descends from a prior head under an append-only invariant. ASCII identifiers are often convenient for machine-readable artifacts; functionally equivalent encodings are included.

Notation (illustrative). "CEP (ComputeExecutionPermit)"/"CapP (CapacityPermit)"/"CRc (ComputeReceipt)" are canonical ASCII labels used in example schemas and identifiers. "Head" denotes an authenticated summary of an append-only verifiable structure, evaluated under a freshness policy and, where applicable, consistency proofs.

Referring to FIG. 1 (orchestrator; 102-114). HF (102) retrieves head vectors; PV (104) verifies freshness and append-only evolution (consistency) relative to previously observed heads; PVM (106) computes an allow_mask; BM (108) binds budget slices to one or more trusted budget meters; CEPI (110) mints a short-lived, audience-bound CEP committing to head_commitments/allow_mask/budget/anti replay/optional attestations/expiry; EB (112) writes CRcs and optionally anchors digests; SR (114) may provide status/attestation staples to reduce verifier load. These components are illustrative; functionally equivalent implementations are included.

Referring to FIG. 2 (multi-root freshness & consistency; 202-220). In one example, a head vector comprises a policy head ($H_p$ 202) and one or more additional heads such as license ($H_l$ 204), unlearning ($H_u$ 206), export ($H_x$ 208), residency ($H_r$ 210), and/or energy/carbon ($H_e$ 212). The verifier evaluates freshness under a configured bound (e.g., MMD-style) and verifies inclusion proofs (214) and, on head advance, append-only evolution (consistency) proofs (216). Status staples, when used, may be evaluated under the configured recency bound. Checkpointing and light-client catch-up mechanisms are illustrative and non-dispositive.

Alternative freshness mechanism (illustrative; non-limiting). In some embodiments, a transparency service publishes a monotonic snapshot identifier (snapshot_id) bound to a signed head or checkpoint. A verifier may store a previously observed snapshot_id and treat non-monotonicity or excessive age relative to a configured bound as a freshness deficit, mapping admission to decision=HOLD with a structured precondition failure (e.g., decision_code indicating stale or monotonicity failure) until refreshed; the claims control.

Referring to FIG. 3 (CEP/CapP structures; 302-322). A CEP may commit to binds_to (audience 302/workload_id/model_id), head_commitments (304), allow mask (306), and a budget slice (308), and carry anti replay (310), optional attestations (312), and expiry (314). A CapP (316) may delegate bounded authority (scope/TTL) and may use a k-of-n signer policy (318). Bundle/lease options (320) support ordered pipelines and sliding-window refresh. A status staple (322) may accompany the CEP and is evaluated under configured recency. Single-use and per-VF/device binding are policy-selectable; reuse or binding mismatch maps to non-admission outcomes per policy.

Referring to FIG. 4 (admit compute verifier & state machine; 402-412). At a device/hypervisor gate prior to a compute-admission action (e.g., doorbell/queue submission), a verifier executes checks within a bounded pre-effect decision interval. Ordering, grouping, and placement of checks are illustrative and non-dispositive; implementations may reorder or split checks across driver/firmware/hypervisor components while remaining fail-closed on any deficit. Appendix E provides pseudocode; Appendix C provides example decision_code taxonomy.

Doorbell/queue-token binding (illustrative; evidence-only). In some embodiments, the verifier binds the CEP validation outcome to a TOCTOU latch token (e.g., queue token id) that commits to a subset such as {binds_to.audience, workload_id, model_id, head_commitments, allow_mask, budget slice, expiry, ts}. The token is valid only prior to doorbell/queue submission; mismatches map to non-admission. Tokens are evidence-only unless expressly configured.

Token scope note (illustrative; evidence-only). A queue_token_id may include a digest over {binds_to.audience, head_commitments, allow_mask, budget slice, expiry} to make the binder self-describing. Presence in CRc is audit-only.

GOCT-Compute (informative; policy). A deployment may define a global override that halts new CEP issuance and tears down active permits for designated tiers; such events may be recorded in evidence artifacts. Two-person approval may be required for re-enablement in some deployments.

Anti-cheat reconciliation & meter integrity (illustrative; audit-only unless expressly configured). The verifier may perform cross-meter reconciliation to detect misreporting or suppression. Examples include: dual-metering (device-truth plus out-of-band) with watcher corroboration; efficiency-envelope comparisons between tflops_used and energy used; meter provenance via attestations (e.g., MAB); and time-sync sanity checks. Such checks are evidence-only unless explicitly configured to gate; remediation hints are illustrative.

Escalation policy (illustrative). Deployments may configure certain anomaly conditions to escalate from HOLD to DENY or to an emergency tier outcome (e.g., EMERGENCY_STOP), per policy.

Efficiency window comparison (illustrative; non-limiting). In some embodiments, the verifier derives observed efficiency metrics over a bounded verification window and compares them to a device-profile efficiency window referenced by an efficiency_window_identifier, producing an anomaly_flag. Out-of-window results may map to ANOMALOUS_EFFICIENCY; missing/discordant meter sources may map to meter-integrity codes. These mappings are illustrative; the claims control.

Inference configuration fingerprint and transformation-plan digest (illustrative; non-limiting). In some embodiments, a workload context for an inference workload includes a committed configuration fingerprint and/or a transformation-plan digest that represents at least one of: a tensor reshape plan, a transpose or permutation plan, a batch or sequence-length plan, a precision-mode plan, or other deterministic execution-shaping parameters for accelerator-resident inference. The CEP and/or a TOCTOU latch token (e.g., queue token id) MAY cryptographically commit to the configuration fingerprint and/or transformation-plan digest, and the verifier MAY record the digest in a CRc as audit-only evidence. If observed behavior, counters, or derived efficiency metrics during a bounded verification window are inconsistent with the committed digest beyond a tolerance, the verifier MAY map the outcome to ANOMALOUS_EFFICIENCY or POLICY_DENIED (or a functionally equivalent code) and prevent admission; the claims control.

Queue-token binding to efficiency identifier (illustrative; evidence-only). In some embodiments, a queue_token_id commits to {audience, efficiency_window_identifier, budget slice} and is valid only prior to enqueue/doorbell submission. Presence in CRc is evidence-only.

Per-tenant counters and protective state (illustrative; non-limiting). In some embodiments, anomaly counters are maintained per tenant (e.g., per VF). Upon threshold conditions, the affected scope may enter a protective state in which new CEPs for certain classes are held or denied until remediation. Revocation artifacts may be emitted for outstanding CEPs; such behavior is policy-selectable.

Decision interval & short-circuit (illustrative; non-limiting). The verifier operates within a bounded pre-effect decision interval and short-circuits on the first failed predicate. Only on PASS does the gate permit the compute-admission action; non-PASS outcomes prevent the compute-admission action.

Referring to FIG. 5 (CRc & Evidence Registry; 502-510). In some embodiments, a CRc is emitted on PASS and binds to a CEP identifier and optionally to workload_id/model_id. A CRc may record energy used and tflops_used derived from meters, site/region, head identifiers and/or head_commitments, attestation identifiers, timestamps, decision outcome, and decision_code. A digest of the CRc may be anchored into an append-only Evidence Registry to provide inclusion and append-only evolution (consistency) proofs. Optional audit fields include kgCO2e and energy_source_mix; these are audit-only and non-dispositive.

Heat Receipt (HRc) generation at handoff (optional extension; illustrative). In some embodiments, a designated handoff_point_id is used for measuring recovered heat. A thermal boundary verifier validates a presented WHEP under configured checks (e.g., signature/expiry/audience, head freshness, inclusion/consistency, anti-replay). Upon validation, the boundary verifier derives thermal_energy_delivered over a measurement window and issues an HRc committing to {whep_id, handoff_point_id, thermal_energy_delivered, timestamps, head identifiers, meter provenance digest, and uniqueness/anti-replay}. HRc digests may be anchored in the Evidence Registry for audit.

Heat meter attestation bundle reference (illustrative). In some embodiments, meter_attestation_digest references an identifier/digest for a Heat Meter Attestation Bundle (HMAB) attesting to calibration/status and posture of thermal meters. The HRc may commit to the HMAB identifier/digest as meter provenance.

Offer/response evidence for constrained reuse (illustrative; non-limiting). In some embodiments, where reuse delivery depends on external acceptance, the system issues HOOR and HORR evidence objects committing to offer/response parameters, windows, capacity constraints, and reason codes. Unless explicitly configured, these are evidence-only.

Exception status record (illustrative; non-limiting). In some embodiments, an exception status record commits to {handoff_point_id, hoor_id, horr_id, response, reason_code, window_id, timestamps, head identifiers} to reduce audit disputes. Evidence-only unless explicitly configured.

Thermal-Credit Receipt (TCRc) generation (illustrative; non-limiting). In some embodiments, a Thermal Credit Issuer computes a credit quantity using policy parameters indicated by heat_reuse_head and issues a TCRc committing to {hrc_id or hrc_digest, handoff_point_id, window_id, credit quantity, head identifiers, timestamps, anti-replay}. Settlement pointers may be included; no settlement mechanism is required.

Privacy-preserving thermal proofs (illustrative; non-limiting). In some embodiments, HRc and/or TCRc includes or references a zk_digest proving threshold satisfaction and/or freshness/consistency verification without disclosing raw samples.

Anti-double-count enforcement (illustrative; non-limiting). In some embodiments, issuance of a TCRc is prevented by default unless an anti-double-count predicate passes (e.g., uniqueness of hrc_digest and/or uniqueness of {handoff_point_id, window_id}). Conflicts map to HOLD or DENY with remediation hints.

Overlapping window handling (illustrative; non-limiting). In some embodiments, overlap detection is applied across partially intersecting windows at a same handoff_point_id; overlap handling may require non-overlapping windows or a committed partition rule. Any overlap rule is non-limiting.

Clawback and adjustment (illustrative; non-limiting). In some embodiments, if an HRc is later determined invalid, the system issues an adjustment record referencing affected TCRc and optional settlement pointers; anchoring is evidence-only.

CRc efficiency evidence (illustrative; non-limiting). In some embodiments, CRcs for deterministic inference accelerators additionally record {efficiency_window_identifier, observed metrics, anomaly_flag} and optionally meter_confidence. Anchoring remains evidence-only.

STEM/SOAR export (illustrative; evidence-only). In some embodiments, the system exports CRcs (or aggregates) to SIEM/SOAR tools for incident response and audit workflows; export does not alter gate predicates.

Referring to FIG. 6 (meters; 602-612). Device-truth meters include NVML/CUPTI (NVIDIA), AMD SMI, and Intel ZES. When unavailable, out-of-band meters (BMC/Redfish/PDU) may be used with reduced confidence. kgCO2e derivation is optional and audit-only; factor sources may be identified for audit traceability.

Referring to FIG. 7 (SR-IOV; 702-710). In multi-tenant contexts, per-VF CEP validation may be performed within a mediated device model. Status staples, when used, may be evaluated under configured recency. Audience/binding mismatch maps to non-admission (e.g., decision=DENY with decision_code=AUDIENCE_MISMATCH), per policy.

Referring to FIG. 8 (privacy; 802-806). Privacy-sensitive predicates may be evaluated via a ZK engine producing verdicts and proof digests committed in CEP attestations. zk_digest; EvidenceBundles may commit to redacted transcripts. Pointers to other rails are evidence-only.

Referring to FIG. 9 (delegation; 902-906). A CapP authorizes minting of sub-CEPs within scope/TTL bounds. Bundles commit ordered pipeline stages; cascade revocation may invalidate dependent permits. Delegation semantics are strict subsets relative to a parent permit.

Referring to FIG. 10 (revocation; 1002-1008). A Revocation Receipt signed by a sovereignty or watcher quorum may invalidate CEPs committing to affected heads; the gate may emit a continuity record and trigger a kill-switch to halt queues where policy requires. A termination CRc may record revocation/halt and be anchored for audit.

Referring to FIG. 11 (leases; 320/310/412). A CEP may include a lease (ttl_s, refresh by); missed refresh may map to HOLD(LEASE_MISSED_REFRESH) and then DENY after grace/expiry. Anti_replay may enforce single-use; reuse may map to HOLD/DENY (or EMERGENCY_STOP in designated tiers), per policy.

Referring to FIG. 12 (stewardship evidence; 502-510). On PASS (or termination), a CRc may include audit-only evidence fields such as kgCO2e, energy_source_mix, rec_id, dr_event_id, curtailed_kWh, anchors, and continuity_record_id; anchoring enables inclusion/consistency proofs. These fields are evidence-only and non-dispositive.

IX. Energy Stewardship & Public-Interest Profiles (Audit-Only; Illustrative; Non-Dispositive)

Deployments may enable energy-stewardship modes that prefer lower-impact windows and document public-interest usage without altering compute admission unless expressly configured. Example audit-only modes include: Green preference, demand-response evidence, and humanitarian/mission-critical evidence labels.

Evidence hooks (illustrative). EvidenceBundles and CRcs may include audit-only keys such as ci_factor_source, rec_id, dr_event_id, curtailed_kWh, public_interest_tag, and food_security_tag. In some embodiments, unknown keys are ignored safely by verifiers/clients.

Food-security and cold-chain profile (illustrative; audit-only). Deployments may declare food-security sub-profiles describing audit-only fields for protecting food-system-critical loads (e.g., cold-chain). Such fields do not alter gate predicates unless expressly configured.

Non-discrimination (informative). Conformance manifests may include non-discrimination and fair-access statements as audit-only signals; such statements do not alter gate semantics.

Generation-asset-aware operation (informative; non-limiting). Policy inputs may include plant-level status or curtailment signals. During curtailment windows, discretionary workloads may be held or denied per policy while still emitting audit evidence. Source type does not alter admission semantics.

Waste-heat reuse profile (audit-only; illustrative). Deployments may record reuse/export evidence without altering compute admission unless expressly configured. HRcs/HOOR/HORR artifacts are evidence-only unless expressly configured.

Deployment signaling (audit-only). A deployment may publish an audit-only profile indicator/badge for interoperability discovery; informational only.

Stewardship modes are audit-only and non-dispositive unless expressly configured.

X. Developer Annex—Canonical Interfaces (Audit-Only; Non-Dispositive)

Entities & components (illustrative).

Head Fetchers (HF): retrieve signed heads for policy and additional domains (license/entitlements, unlearning, export, residency, energy/carbon); optional watcher mirrors.

Proof Verifiers (PV): verify signatures, freshness, and append-only evolution (consistency) relative to previously observed heads.

Budget Meter (BM): binds budget slices to meter sources (e.g., NVML/CUPTI, AMD SMI, Intel ZES), optionally records reduced confidence for fallback meters.

Policy VM (PVM): deterministic evaluator producing allow_mask and, in some embodiments, budget selection.

CEP Issuer (CEPI): emits short-lived, audience-bound CEP committing to {head_commitments, allow_mask, budget, expiry, anti replay, optional attestations}.

Evidence Bus (EB): writes CRcs/EvidenceBundles; optionally anchors digests in an Evidence Registry.

Status Responder (SR): provides status/attestation staples; evaluated under recency when used.

Heads & proofs (illustrative). PV verifies freshness and append-only evolution (consistency) against prior heads and validates inclusion proofs for referenced digests/commitments when used.

Budget metering (illustrative). BM may compute energy used from counters or power integration over a window, compute tflops_used from counters, and apply budget comparisons at the gate. Negative remaining budgets at gate time may map to decision=DENY with decision_code=ENERGY_BUDGET_EXCEEDED and/or CARBON_BUDGET_EXCEEDED per policy.

Policy VM (illustrative). PVM evaluates policy programs and emits allow_mask predicates (e.g., export/residency/license/unlearning), optionally selecting site/region constraints and budget slices.

CEP Issuer (illustrative). CEPI mints a CEP committing to head_commitments, allow_mask, budget, expiry, anti replay, and optional attestations (EAT/JWT, SPDM/CoRIM digests, zk_digest). Leases, bundles, and delegation are optional.

Evidence Bus (illustrative). EB writes CRcs and EvidenceBundles; optionally registers digests in an Evidence Registry.

Status Responder (illustrative). SR may staple statuses/attestation artifacts to reduce verifier load; verifiers evaluate recency when staples are used.

Data Structures (Example Canonical Fields; Non-Dispositive)

ComputeExecutionPermit (CEP) (Example)

cep_id; binds to {audience, workload_id?, model_id?, device_kid?} head_commitments {policy, license?, unlearning?, export?, residency?, energy?} allow_mask { . . . }; budget {kWh window?, TFLOP_window?, start?, end?} expiry; anti replay {nonce?, monotonic_counter?, window_id?} sig_info?; attestations?; optional {lease?, delegation?, bundle?, profile?, alg_suites?, pq_cutover_date?, pointers?}

CapacityPermit (CapP) (example)—delegable envelope: ceilings for budget/classes; optional k_of_n signer policy; optional pointers.

ComputeReceipt (CRc) (Example)

cr_id; cep_id; site; timestamps; decision; decision_code optional: workload_id, model_id, energy used, tflops_used, head_ids and/or head_commitments, attestation_ids, registry_anchor, anchors, continuity record_id, meter_confidence, audit_only{ . . . }

API (Illustrative; Non-Dispositive)

request_cep(workload, model, budget hint)→{cep| decision envelope}.

admit compute(queue, cep)→decision envelope {decision, decision_code, optional retry_after_ms, remediation_hints, context} enforced in a driver/firmware/hypervisor pre-effect path.

Example decision_code taxonomy & retry (illustrative). Examples include: PROOF_REQUIRED, STALE_HEAD, QUORUM_UNAVAILABLE, POLICY_DENIED, EXPORT_CLASS_DENIED, RESIDENCY_DENIED, ENERGY_BUDGET_EXCEEDED, CARBON_BUDGET_EXCEEDED, LICENSE_MISSING, ULP_STALE, TIME_SYNC_ERROR, REPLAY_DETECTED, AUDIENCE_MISMATCH, PERMIT_EXPIRED, INCONSISTENCY_DETECTED, STATUS_STALE, ATTESTATION_FAILED, EVIDENCE_EXPIRED. In some embodiments, HOLD includes retry hints (retry_after_ms) and remediation_hints.

Offline window (illustrative; evidence-only). Offline/air-gapped sites may present an EvidenceBundle carrying head_commitments and proof references within a bounded freshness window; expiration may map to PROOF_REQUIRED or HOLD until fresh heads are obtained.

Freshness, Consistency, Quorum (Illustrative)

In some embodiments, heads are treated as fresh when head_age≤a configured freshness bound (e.g., MMD). On head advance, PV verifies append-only evolution (consistency) relative to a previously observed head; inconsistencies map to non-admission outcomes. Dual-anchor disagreement may map to HOLD with continuity evidence until a linking proof appears.

Operational defaults (illustrative). Freshness bounds, quorum requirements, and stapling recency are deployment-defined and may be negotiated. Values (e.g., 60 seconds) are illustrative only.

Fail-Closed Semantics & Codes (Illustrative)

Absent/expired CEP, stale heads, audience mismatch, export/residency violation, exhausted budget predicates (when enforced), or missing/stale compliance status required by policy: non-admission outcomes (e.g., HOLD or DENY) with decision_code and optional remediation hints. The claims control.

Export/residency/unlearning predicates may use privacy-preserving verdicts with proof digests committed for audit; transcripts may be anchored or referenced as evidence.

Leases, Bundles, Delegation (Illustrative)

Streaming leases may be used for long jobs; bundle permits may be used for staged pipelines; delegation via CapP and sub-CEPs may constrain scope/TTL; revocation may cascade to dependent permits.

Driver/Firmware Gate & Hypervisor (Illustrative)

A driver or firmware gate enforces admit compute( ) prior to doorbell/queue submission. vGPU/SR-IOV contexts may enforce validation per VF. Hypervisors and mediated device models may implement equivalent per-function verification.

Intercept surfaces (equivalents; illustrative). Kernel-mode driver gates (pre-doorbell), device firmware microcode gates, hypervisor device models, and per-VF submission gates are examples. Functionally equivalent pre-effect admission chokepoints are included.

Kill-Switch & Revocation (Illustrative)

Revocation Receipts may invalidate CEPs on policy change, export/residency breach, or budget exhaustion; kill-switch behavior may halt running queues and emit termination evidence.

Security Properties (Illustrative)

Example properties include: freshness-bounded permit-before-compute; fail-closed gating at device boundaries; portable receipts; replay resistance; cross-sovereign continuity; meter-evaluated budget enforcement.

Implementation Variants (Illustrative)

Algorithm agility (EdDSA/ECDSA/PQ suites), TEE-bound verification, channel binding, and stapling are compatible variants. Transport choices are non-dispositive.

Example Sequence (Illustrative)

A scheduler requests a CEP for workload W and model M. ACE fetches a signed policy head and one or more additional signed heads (e.g., license/entitlements, unlearning, export, residency, and/or energy/carbon budgets), verifies freshness/consistency, computes an allow_mask and budget slice, and issues a short-lived CEP bound to a driver/hypervisor audience. The driver calls admit_compute (queue, cep); verifies heads, allow_mask, and budget; PASS. EB writes a CRc.

A conformance profile or badge may be emitted with a CRc digest, head identifiers, and proof references for discovery; such artifacts are audit-only and non-dispositive. Commercial terms (if any) are governed by separate agreements; functionally equivalent implementations remain within claim scope.

Profile negotiation (audit-only). A deployment may advertise {profile: C0-C4, alg_suites, key_id_set?, pq_cutover_date}; unknown suites may map to decision=HOLD with decision_code indicating suite refresh and remediation hints.

Marketplace evidence export (audit-only). A CSV/JSON export may summarize {cep_id, cr_id, site, energy used, tflops_used, kgCO2e, decision, decision_code, head identifiers} for audit/marketplace workflows; export format is informative only.

XI. Appendices

Appendix Preface & Order of Precedence.

Appendices A-V (including Appendix R and, if present, Appendix R-1) are integral to this specification and provide definitions, schemas, code taxonomies, conformance profiles, examples, and audit mechanisms. Except where explicitly stated otherwise, all appendices are illustrative, audit-only, and non-dispositive. In some embodiments, unknown keys are ignored safely by verifiers. Claims control in the event of any inconsistency, followed by the Detailed Description, then the Figures, then the Appendices.

Appendix A—Glossary of Terms

Conventions. Terms are illustrative and non-limiting, provided for convenience. ASCII identifiers are preferred for machine-readable artifacts. "MUST/SHOULD/MAY" (when present) follow RFC 2119/8174 usage as specification posture for examples only and are not intended to narrow claim scope; the claims control.

[A001] Admission/admit_compute( )—A verifier path that executes prior to a compute-admission action (e.g., prior to doorbell or queue submission) and produces an admission outcome (e.g., PASS, HOLD, or DENY; and, in designated tiers, EMERGENCY_STOP) based on CEP validation, budget evaluation using one or more budget meters, and policy predicates.

[A002] Algorithm suites/alg_suites—A set of signature and/or hash algorithms acceptable for CEP/CapP/CRc and head commitments (e.g., EdDSA/ECDSA and post-quantum suites). In some embodiments, negotiation artifacts advertise alg_suites and a pq_cutover_date.

[A003] Allow mask/allow_mask—A structured capability vector (e.g., region, export level, energy class) computed by a policy evaluator (e.g., a Policy VM) and committed in a CEP.

[A004] Anchor (primary/secondary)/anchors—References to one or more append-only registries or logs where receipt and/or continuity evidence is recorded (e.g., anchors: {primary, secondary}) to enable independent auditing and dispute reduction.

[A005] Anti-replay tuple/anti replay—Fields (e.g., nonce, monotonic counter, window_id) bound into a permit to deter replay or concurrent reuse.

[A006] Audience/binds_to.audience—An intended verifier identity (e.g., a driver function, an SR-IOV virtual function, or a hypervisor device model) to which a permit is bound. Audience mismatch may map to AUDIENCE_MISMATCH (or another decision code).

[A007] Attestations—Evidence carried in a CEP (or stapled) associated with device/driver/accelerator posture. Non-limiting formats include EAT/JWT, SPDM transcripts, and optional CoRIM references to endorsed measurements. In some embodiments, attestations include privacy-preserving proof digests for sensitive predicates.

[A008] BMC/Redfish/PDU meters—Out-of-band telemetry sources for power/energy when device-truth meters are unavailable. In some embodiments, a verifier records meter_confidence=LOW (or an equivalent indicator) when relying on such meters.

[A009] Budget/budget{kWh window, TFLOP_window, start, end}—A resource envelope attached to a CEP. In some embodiments, when a remaining budget evaluated at the gate is negative, the verifier maps the outcome to ENERGY_BUDGET_EXCEEDED (and/or CARBON_BUDGE-T_EXCEEDED), independent of scheduler state. Audit-only carbon metrics may be computed in some embodiments.

[A010] Budget meter/trusted budget meter—Telemetry used by a verifier to evaluate budget predicates, including (non-limiting) NVML (power/energy), CUPTI (FLOP/tensor counters), AMD SMI, and Level-Zero Sysman (ZES). A "trusted budget meter" refers to a meter source treated as authoritative for gate-time budget evaluation under a configured trust policy.

[A011] Bundle permit—A permit (e.g., a CEP) that commits to an ordered set of stages (e.g., prep→train→ eval→serve). In some embodiments, revocation of any stage invalidates the bundle or causes dependent stages to be held or denied.

[A012] Capacity Permit (CapP)—A delegable envelope defining ceilings for budget and classes. In some embodiments, a CapP requires k-of-n signers and authorizes minting of sub-CEPs within a bounded scope and time-to-live (TTL).

[A013] Carbon budget/kgCO2e—An audit-only field representing a carbon estimate derived from energy (kWh) and an emissions factor (e.g., $kgCO2e=kWh \times regional\_emission\_factor$). In some embodiments, the factor source is identified (named) for audit traceability.

[A014] Compute Execution Permit (CEP)—A short-lived, audience-bound token that commits to head_commitments, allow_mask, budget, expiration time (expiry), and anti replay (and optionally attestations). A CEP is presented prior to a compute-admission action that would enable accelerator work to become executable (including at least one of enqueue, kernel launch, DMA enablement, memory-mapping enablement, or mediated device or virtual-function enablement).

[A015] Compute Receipt (CRc)—A portable record of a permitted (or terminated) execution. Non-limiting fields include cep_id, energy used (kWh), tflops_used, site/region, decision outcome, decision_code, head_ids, optional attestation identifiers, and optional audit-only fields (e.g., kgCO2e, energy_source_mix, jurisdictional fingerprint, continuity_record_id, anchors).

[A016] Conformance profile/badge—An audit-only declaration (e.g., C0-C4) that a deployment implements a minimum feature set (e.g., freshness-bounded heads, fail-closed gating, per-VF validation). Profiles are illustrative and non-limiting and do not constrain claim scope.

[A017] Consistency proof/append-only evolution (consistency) proof—A proof that a newer signed head extends a prior head under an append-only invariant (i.e., without deletion or reordering), used on head advance to demonstrate append-only evolution.

[A018] Continuity record—A signed record emitted when heads disagree, revocations occur, or continuity across anchors is asserted, linking receipt/permit history across one or more evidence anchors.

[A019] Device fingerprint/device_kid—A stable device or virtual-function identifier (e.g., a key identifier) used to bind permits. Binding mismatch may map to AUDIENCE_MISMATCH or POLICY_DENIED (or an equivalent code).

[A020] Doorbell/queue submission—A hardware enqueue operation and any functionally equivalent pre-effect admission action that enables accelerator work to become executable (e.g., DMA enablement, memory-mapping enablement, mediated device or VF enablement, or equivalent).

[A020A] Admission chokepoint—Any control point at which execution can be allowed or fail-closed, including (non-limiting) credential issuance/acceptance, enqueue/doorbell submission, kernel launch, DMA or memory-mapping setup, device I/O enablement, mediated device or VF enablement, or other functionally equivalent pre-effect chokepoints.

[A020B] TOCTOU latch A—mechanism that cryptographically binds inputs and intermediate state used for a permit decision (e.g., head identifiers, registry head identifiers, evidence digests, budget slice) to subsequent enqueue/doorbell submission (or equivalent), deterring admission under policy/evidence state different from that evaluated.

[A021] Dual-anchor heads—Use of two (or more) independent logs/anchors. In some embodiments, disagreement maps to HOLD with a continuity record until a linking append-only evolution (consistency) proof is provided.

[A022] EAT/JWT—The IETF Entity Attestation Token format (and/or a signed JWT variant) used to carry device/driver/accelerator posture (e.g., iat/exp, nonce, measurement claims). In some embodiments, stapled attestation evidence is evaluated under a recency bound (e.g., <MMD).

[A023] EvidenceBundle—A signed package committing to head identifiers, proof digests, and receipt/permit identifiers, and optionally redacted transcripts, used for audits, SIEM, or SOAR workflows.

[A024] Evidence Registry—An append-only index where digests of EvidenceBundles and/or CRcs are anchored and later verified via inclusion proofs and append-only evolution (consistency) proofs.

[A025] Evidence expired/EVIDENCE_EXPIRED—A decision code used when stapled attestation or status exceeds a configured recency policy.

[A026] Export class—A policy category reflecting export-control status (e.g., Export Control Classification Number (ECCN) or an equivalent control category). Violations may map to EXPORT_CLASS_DENIED.

[A027] Fail-closed—A gating behavior where absence or invalidity of a CEP (or stale heads/meters when required) results in HOLD or DENY and prevents the compute-admission action from occurring, thereby preventing accelerator work from becoming executable.

[A028] Access posture—(audit-only) An audit-only, non-binding descriptor that may be published to describe interoperability or fairness goals (e.g., fair access, non_discrimination). Informational only; does not imply an offer/commitment or alter admission semantics; claims control.

[A029] Head—An authenticated summary (e.g., root hash/checkpoint) of an append-only verifiable structure with a freshness policy (e.g., Maximum-Merge-Delay (MMD)) and, where applicable, append-only evolution (consistency) proofs.

[A030] Head commitment/head_commitments{ ... }—A set of head identifiers (e.g., policy, license, unlearning, export, residency, energy) bound into a CEP.

[A031] Head age/head_age—Elapsed time since observation of a head, evaluated relative to a freshness bound (e.g., head_age≤MMD) when freshness is enforced.

[A032] HOLD/retry_after_ms—A temporary non-admission state. In some embodiments, a verifier returns a retry hint (e.g., retry_after_ms) with a back-off recommendation.

[A033] Hypervisor device model—A mediated device abstraction that fronts a device in virtualization contexts. In some embodiments, per-VF paths validate CEPs independently.

[A034] Inclusion proof—Proof that a receipt or permit digest is included under a committed signed head of an append-only verifiable structure.

[A035] Jurisdictional fingerprint (audit-only)—An audit-only field encoding an authority set (e.g., policy sources/regions) associated with a CRc; not required to be used for admission.

[A036]k-of-m quorum—A minimum number of independent heads and/or watcher corroborations required to accept a head vector under a quorum policy.

[A037]k-of-n signer—A minimum signer count for CapP issuance and/or delegation chains.

[A038] Lease/streaming lease—A CEP with a sliding refresh window; missed refresh may map to LEASE_MISSED_REFRESH and then to denial upon lapse of a grace interval, per policy.

[A039] Level-Zero Sysman (ZES)—Intel oneAPI Level Zero Sysman API used to read device power/energy metrics.

[A040] License/entitlements—Model or workload license terms enforced via head commitments; missing or invalid status may map to LICENSE_MISSING.

[A041] Maximum-Merge-Delay (MMD)—A freshness window for heads and, in some embodiments, stapled statuses/attestations.

[A042] Meter confidence/meter_confidence—An indicator describing trust posture for meters (e.g., device-truth vs out-of-band). Typically used for audit metadata.

[A043] Model id/model_id—An identifier for a model associated with a CEP/CRc, used for audit and policy matching.

[A044] NVML/CUPTI—NVIDIA APIs for device power/energy (NVML) and FLOP/tensor counters (CUPTI).

[A045] Offline window—A bounded period during which EvidenceBundles may be used without online head refresh. In some embodiments, expiration maps to PROOF_REQUIRED or HOLD until fresh heads are obtained.

[A046] Per-VF validation—Independent CEP validation per SR-IOV virtual function or per mediated device function.

[A047] Policy digest (audit-only)—A commitment to an evaluated policy program/state referenced by a CEP, carried for audit traceability in some embodiments.

[A048] Policy VM— A deterministic evaluator that computes an allow mask from policy inputs and CEP context.

[A049] PQ cutover—A profile point at which deployments migrate to post-quantum suites; unknown suites may map to HOLD with remediation hints, per policy.

[A050] Proof-of-Effect (PoE)—(Cross-rail, illustrative) evidence that an unlearning obligation had a declared effect. "R2UA" is an illustrative ASCII label (also written "R$^2$UA" in some materials). ACE may consume unlearning status/PoE via head_commitments in some embodiments.

[A051] Recency bound—Maximum permissible age for heads or staples (typically <MMD unless negotiated/configured otherwise).

[A052] Residency—Region/site bounds applicable to an execution; violations may map to RESIDENCY_DENIED.

[A053] Revocation Receipt—A signed notice that a prior head/permit is revoked (e.g., policy change, export/residency breach, or budget exhaustion). In some embodiments, a verifier treats affected CEPs as invalid at the gate.

[A054] SIEM/SOAR connectors (audit-only)—Export integrations for EvidenceBundles/CRcs to enterprise tooling; evidence-only.

[A055] SPDM/CoRIM—DMTF Security Protocol and Data Model (SPDM) and Concise Reference Integrity Manifest (CoRIM) used to describe and verify device measurements.

[A056] SR-IOV—Single-Root I/O Virtualization.

[A057] Stapled status—A verifier-consumable status blob bound to a head_commitments vector and evaluated under a recency bound (e.g., ≤MMD) when enforced; stale status may map to STATUS_STALE or EVIDENCE_EXPIRED.

[A058] Sub-CEP—A CEP minted under a CapP within a delegated scope/TTL; attempts to exceed delegated scope may map to POLICY_DENIED.

[A059] TFLOP window/TFLOP_window—The FLOP budget slice committed in a CEP.

[A060] Unlearning Permit (ULP)—(Cross-rail, illustrative) a short-lived permit proving unlearning obligations are current; in some embodiments, ACE enforces an unlearning status predicate via head_commitments.unlearning when required by policy.

[A061] Watcher—An independent monitor that observes logs and can corroborate heads, detect freshness violations, and raise revocations.

[A062] ZK proof digest—A hash/digest referencing a zero-knowledge proof transcript for privacy-preserving predicates; transcripts may be anchored or referenced for independent audit in some embodiments.

[A063] Queue Token ID (queue token id)—An evidence-only identifier bound to an admission-decision interval and valid only prior to the compute-admission action (e.g., prior to doorbell/queue submission). In some embodiments, it commits to {workload_id, model_id, binds_to.audience, head_commitments, allow_mask, budget, expiry, ts}. Present in CRc for audit only.

[A064] Compute Gate Health Receipt (CGHR)—An audit-only posture receipt summarizing gate health over a window (rates, decision latency, deny-code breakdown, head-cache age, quorum settings). May be anchored; does not alter admission semantics.

[A065] Stewardship keys (audit-only)—Audit-only CRc fields for sustainability/public-interest reporting: ci_factor_source, rec_id, dr_event_id, curtailed_kWh, public_interest_tag (e.g., "health", "relief", "education", "research", "food_security"), and where applicable food_security_tag, food_asset_id, and food_region or food_supply_chain_id. In some embodiments, unknown keys are ignored safely by verifiers.

[A065A] Priority-load classification/priority_load_tag (illustrative; non-limiting)—A workload classification tag or equivalent attribute associated with a workload context, a Capacity Permit (CapP), and/or a policy program, indicating membership in a priority-load class (e.g., critical infrastructure, emergency response, or public-interest classes). In some embodiments, during a curtailment window or critical-loads-only condition, the policy program uses the tag as an admission predicate to preserve admission within a reserved bounded portion; otherwise the tag may be recorded as audit-only evidence; the claims control.

[A066] Vendor-License Audit Fields (audit-only)—Audit-only CRc keys for reconciling external license events: vendor_license_mode∈{SOFT, EULA_ONLY, HARD}, vendor_license_event∈{DEGRADED, RESTORED, N/A}, vendor_product (string). Informational only; no admission effect.

[A067] Presentation mode (audit-only)—Advisory label for enqueue context E {local, cast, remote}; may appear in queue_token_id for traceability.

[A068] GOCT-Compute (illustrative)—A policy artifact that may halt compute admission for designated tiers; evidence-only and non-dispositive.

[A069] Two-person rule (2PR) (illustrative)—A policy requiring at least two distinct approvers for critical re-enable; evidence-only.

[A070] Trusted channel (audit-only)—An integrity-protected transport used to obtain heads/meters (e.g., mTLS exporter binding, TEE/GPU attestation via EAT/JWT, SPDM/CoRIM). Proof of channel may be carried or stapled; evidence-only unless explicitly configured.

[A071] Functionally equivalent meters—Telemetry sources that provide substantially similar power/energy or FLOP/tensor measurements as device-truth meters (e.g., NVML, CUPTI, AMD SMI, ZES). Use of such meters does not inherently alter admission semantics.

[A072] Meter Attestation Bundle (MAB) (audit-only)—An audit object committing to meter identities and firmware/driver posture (e.g., SPDM/CoRIM, EAT/JWT). A MAB may be referenced by an identifier or digest (e.g., mab_id or an equivalent identifier) carried in a permit, a receipt, an EvidenceBundle, or another evidentiary object, depending on deployment encoding.

[A073] Expected efficiency window (audit-only)—Audit-only bounds {min_TFLOPs_per_kWh, max_TFLOPs_per_kWh} for a device profile; out-of-window observations may be recorded as ANOMALOUS_EFFICIENCY.

[A074] Independence (logs/anchors)—"Independent" logs/anchors are operated under distinct trust anchors such that no single operator controls all anchors used for acceptance. Diversity may include organization, geography, and implementation diversity.

[A075] TTL (time-to-live)—A bounded validity interval for a CEP or sub-CEP; after expiry, presentation may map to PERMIT_EXPIRED unless renewed.

[A076] Signed head—A current authenticated head of an append-only verifiable structure that satisfies an active freshness policy.

[A077] Structured Precondition Failure (audit-only)—A machine-readable denial envelope with fields such as {decision, decision_code, retry_after_ms, remediation_hints, context}, and optionally {decision_id, deny_signature}; in some embodiments, code_id is used as a compatibility alias for decision_code; evidence-only; does not alter gate predicates.

[A078] DUAL_ANCHOR_CONFLICT—A HOLD condition when independent (dual-anchor) logs disagree; a continuity record is emitted and a linking append-only evolution (consistency) proof resolves the conflict in some embodiments.

[A079] Decision interval/decision slice (bounded; short-circuit)—A bounded verifier interval in the pre-effect path prior to a compute-admission action that short-circuits on a first failed predicate. In some embodiments, admission is permitted when the configured predicates evaluate to PASS, and non-PASS outcomes prevent the compute-admission action.

[A080] Append-only verifiable structure—A transparency-style or accumulator-backed structure that publishes signed heads and supports inclusion proofs and append-only evolution (consistency) proofs. Examples include Merkle-tree transparency logs, append-only ledgers with consistency proofs, and accumulator-based structures; functionally equivalent structures are included.

[A081] QUORUM_UNAVAILABLE—A HOLD condition when a configured k-of-m quorum (or watcher corroboration) cannot be satisfied; may return remediation hints (e.g., raise_quorum, consistency_proof_required).

[A082] Evidence—only A designation for artifacts (e.g., CRc, EvidenceBundle, badges, CGHR) used for audit/compliance that do not change fail-closed admission semantics or claim scope.

[A083] Generation asset/behind-the-meter generator—A local or dedicated energy source (e.g., solar or wind farm, gas turbine, industrial cogeneration plant, battery farm, or small modular/microreactor nuclear plant feeding a microgrid) whose telemetry or status may feed policy or energy heads. Generation assets are treated as policy inputs; their presence or type does not alter ACE's core admission semantics.

[A084] Deterministic inference accelerator/LPU—An accelerator whose workload-level behavior (e.g., tokens-per-second, FLOPs-per-token, kWh-per-token for a fixed model/configuration) is substantially deterministic across invocations. Examples include language-processing units (LPUs) or inference-optimized ASICs that store weights in on-die SRAM arrays and expose enqueue/doorbell semantics. Such devices are included within "accelerator" as used herein; ACE may use efficiency envelopes for anomaly evidence in some embodiments.

[A085] Waste heat/waste_heat—Thermal energy produced by compute and facility systems that is available for recovery/reuse rather than rejected to ambient.

[A086] Thermal energy delivered/thermal_energy_delivered—A measured quantity of recovered heat delivered to a heat sink over a window, expressed in thermal energy units (e.g., kWh_th, MJ), derived from metered flow and temperature differential or functionally equivalent thermal metering.

[A087] Handoff point/handoff_point_id—A designated measurement and accountability boundary at which recovered heat delivery is measured and attributed for reuse/export reporting or settlement.

[A088] Heat sink/heat_sink—A recipient system capable of accepting recovered heat (e.g., district heating network, industrial process load, building heating loop, thermal storage, or equivalent).

[A089] heat_reuse_head ($H_h$)—A signed head encoding thermal reuse predicates, measurement boundary identifiers, KPI parameters, obligations, and/or exception rules.

[A090] heat_sink_head ($H_s$)—A signed head encoding heat sink acceptance/availability/capacity windows, recipient scopes, constraints, and/or response predicates.

[A091] Waste-Heat Export Permit (WHEP)—An audience-bound permit token that commits to at least heat head identifiers, handoff_point_id, recipient scope, a validity interval, and anti-replay, used to authorize and evidence thermal export/reuse claims.

[A092] Heat Receipt (HRc)—A signed receipt committing to measured thermal delivery at a handoff point, binding to a WHEP and including head identifiers and meter attestation identifiers/digests; used for audit and optional settlement.

[A093] Heat Offtake Offer Receipt (HOOR)—A signed evidence object committing to an offer to deliver recovered heat under specified windows/capacity and a recipient scope.

[A094] Heat Offtake Response Receipt (HORR)—A signed evidence object committing to a counterparty's response to a HOOR (accept/decline/conditional) and related constraints/reason codes.

[A095] Recipient scope/recipient scope—Allowed heat sink identity, endpoint(s), injection point(s), and/or network constraints to which recovered heat may be delivered under a WHEP.

[A096] Thermal boundary verifier—A verifier that validates WHEPs and produces HRcs at or for a handoff point (e.g., facility controller, pump/valve controller, heat pump supervisory controller, or equivalent).

[A097] Heat Meter Attestation Bundle (HMAB)—An evidence object binding thermal meter identities, calibration/status, and device/software posture; referenced by hmab_id (or an equivalent identifier).

[A098] Thermal deficit/thermal_deficit—A computed measure indicating unmet reuse obligations over a window or class, derived from HRcs and policy parameters; may be used as an optional gate predicate in some embodiments.

[A099] Thermal recovery budget/thermal_recovery_budget—A policy-defined target or constraint for recovered heat delivery over a window (e.g., minimum recovered heat, maximum allowed deficit), computed from heads and HRcs.

[A100] THERMAL_REUSE_REQUIRED—A decision code indicating a configured policy requires thermal reuse evidence (e.g., WHEP/HRc or exception receipts) before admitting compute or before finalizing reporting/settlement.

[A10l] HEAT_EXPORT_PERMIT_REQUIRED—A decision code indicating WHEP is required but absent/invalid for a configured thermal export/reuse predicate.

[A102] HEAT_SINK_UNAVAILABLE—A decision code indicating no acceptance capacity/window is available under the heat_sink_head for a requested scope/window; may map to HOLD with retry hints.

[A103] Thermal credit/thermal_credit—A non-limiting label for a quantified entitlement, incentive, payment, or compliance unit associated with verified thermal delivery. Settlement is outside core ACE admission unless explicitly configured.

[A104] kWh_th—Thermal energy unit in kilowatt-hours thermal, used as a non-limiting representation for thermal_energy_delivered.

[A105] Thermal-Credit Receipt (TCRc)—A signed evidence artifact representing a quantified entitlement derived from verified thermal delivery evidence (e.g., one or more HRcs). May include pointers to external settlement or credit bundles; no settlement mechanism is required.

[A106] Anti-double-count predicate—A predicate that denies issuance of a TCRc by default unless uniqueness conditions are satisfied, including at least one of: uniqueness of an HRc digest, uniqueness of {handoff_point_id, window_id}, a monotonic meter counter binding, or a current registry inclusion reference.

[A107] Overlapping-window conflict—A condition in which two measurement windows for the same handoff_point_id partially intersect in time such that thermal delivery could be counted more than once without a committed partition rule.

[A108] Credit quantity—A computed quantity derived from HRc thermal_energy_delivered and policy parameters (e.g., conversion factor, eligibility threshold, program class). Computation details are non-limiting.

[A109] Clawback/adjustment record—An evidence object referencing a previously issued TCRc and indicating invalidation, correction, or reversal, optionally including a pointer to an external settlement system.

[A110] Efficiency window/device-profile efficiency window (audit-only)—Expected ranges for one or more observed efficiency metrics for a deterministic inference accelerator for a model identifier and configuration; derived via calibration or functionally equivalent mechanisms.

[A111] efficiency_window_identifier (audit-only)—An identifier referencing a canonical device-profile efficiency window that may be committed by a CEP and recorded by a CRc; unknown or inconsistent identifiers may be denied or held per policy.

[A112] Calibration workload/probe workload (audit-only)—A reference inference workload executed to populate or validate a device-profile efficiency window, optionally under the permit rail with calibration CRcs anchored for audit.

[A113] anomaly flag (audit-only)—An indicator reflecting whether observed efficiency metrics are in_range, marginal, or out_of_range relative to a device-profile efficiency window.

[A114] Protective state—A policy-controlled state in which new CEPs for discretionary inference workloads are denied or held for an affected device/tenant scope until a remediation condition is met.

[A115] Per-tenant anomaly counter—A counter maintained per tenant (e.g., per SR-IOV virtual function or mediated device model) enabling anomaly escalation and protective actions without disabling unrelated tenants.

[A116] Remediation condition—A non-limiting condition that, when satisfied, permits exit from a protective state (e.g., re-attestation, configuration change, clock/power limit enforcement, or operator approval).

[A117] Exception status record (evidence-only)—An evidence object that commits to {handoff_point_id, hoor_id, horr_id, response, reason_code, window_id, timestamps, head_ids} to document decline/conditional acceptance and reduce audit disputes.

[A118] Thermal ZK proof digest (evidence-only)—A digest referencing a zero-knowledge proof transcript that proves eligibility threshold satisfaction and/or freshness/append-only evolution verification without disclosing raw thermal metering samples.

[A119] Food-security tag/food_security_tag (audit-only)—An audit-only label associated with a workload, facility, or Capacity Permit indicating participation in a food-system context (e.g., "cold_chain", "cea", "processing", "distribution"). Used for reporting/prioritization; does not by itself alter admission semantics.

[A120] Food asset identifier/food_asset_id (audit-only)—An audit-only identifier for a food-system asset or facility referenced from CRcs/HRcs/Capacity Permits for traceability.

[A121] Food supply-chain identifier/food_supply_chain_id (audit-only)—An audit-only identifier representing a logical supply-chain (e.g., route/program/network) that may be bound to CRcs or EvidenceBundles; does not alter core gate predicates.

[A122] Accelerator workload/workload—An execution request intended to run on an accelerator, including, without limitation, kernels, graphs, command buffers, or equivalent accelerator-executable work submitted via a driver, firmware, or hypervisor path.

[A123] Compute-admission action—A pre-effect action that enables accelerator work to become executable, including, without limitation, enqueue, doorbell or queue submission, kernel launch, DMA enablement, memory-mapping enablement, mediated device enablement, or virtual-function enablement, and functionally equivalent actions.

[A124] Head vector—A collection of signed heads obtained from one or more append-only verifiable structures for policy and one or more additional domains (e.g., license/entitlements, unlearning status, export class, data residency, and/or energy/carbon), used as inputs to permit issuance and gate-time validation.

[A125] Freshness policy—A configured policy that defines acceptable age/recency for signed heads and, where applicable, stapled statuses or attestations (e.g., a Maximum-Merge-Delay (MMD)-style bound or a functionally equivalent bound), used to determine whether an item is treated as fresh or stale.

[A126] Budget slice—A bounded portion of a budget allocated to a permit, workload, tenant, stage, and/or time window (e.g., kWh_window and/or TFLOP_window over {start, end}) and committed in a permit.

[A127] Policy program—A machine-evaluable policy artifact executed by a deterministic evaluator (e.g., a Policy VM) that computes an allow_mask and, in some embodiments, selects or constrains a budget slice, based at least in part on a head vector and request context.

[A128] Policy predicate—A condition evaluated for admission (e.g., export-class, residency, license/entitlements, unlearning status) whose satisfaction is represented by an allow_mask and/or associated proofs or status committed in a permit.

[A129] Pre-effect admission gate—A gate enforced before effects become visible at an accelerator execution surface (e.g., prior to a doorbell or queue submission or functionally equivalent chokepoint), such that satisfaction of configured gate predicates permits a compute-admission action and absence of satisfaction prevents the compute-admission action, under a fail-closed posture.

[A130] Expiration time/expiry—A time bound committed in a permit after which presentation is treated as invalid (e.g., mapping to PERMIT_EXPIRED).

[A131] Kill-switch—A mechanism that halts running queues and/or prevents further compute-admission actions for a device scope, virtual-function scope, tenant scope, or other configured scope responsive to revocation, policy change, budget exhaustion, or designated risk conditions. In some embodiments, termination evidence (e.g., a termination CRc and/or continuity record) is emitted for audit; evidentiary artifacts are non-dispositive unless expressly claimed.

[A132] Proof transcript digest—A digest/commitment that binds a permit or receipt to a privacy-preserving proof transcript (e.g., a zero-knowledge proof transcript or functionally equivalent evidence) without requiring disclosure of the transcript contents. In some embodiments, the transcript (or a redacted form) is included in or referenced by an EvidenceBundle.

[A133] Audience-bound—A property of a permit indicating it is intended for validation by a specific verifier identity represented by binds_to.audience (e.g., a driver function, firmware function, hypervisor device model, or per-virtual-function identity). In some embodiments, audience mismatch maps to AUDIENCE_MISMATCH (or an equivalent code).

[A134] Queue token/queue_token—A short-lived binder associated with an admission decision that commits to admission context (e.g., binds_to.audience, head identifiers and/or head_commitments, allow_mask, budget slice, expiry, and optionally a timestamp) and is valid only prior to a compute-admission action (e.g., prior to doorbell or queue submission) to deter TOCTOU. In some embodiments, the binder is referenced by a queue_token_id.

[A135] Trusted execution environment (TEE)/TEE-bound—An integrity-protected execution environment and/or isolated boundary capable of supporting attestation of code and state. "TEE-bound" denotes that verification is performed within, or cryptographically bound to, such an environment or equivalent attested boundary; functionally equivalent isolated/attested boundaries are included.

[A136] AMD SMI—AMD System Management Interface telemetry used to obtain accelerator power/energy and related signals for metering and budget evaluation. Functionally equivalent AMD telemetry sources are included.

[A137] Device-truth meter—A meter source obtained from an accelerator device and/or its driver/runtime stack treated as closer to the device boundary than out-of-band facility meters. Examples include NVML/CUPTI, AMD SMI, and ZES; functionally equivalent device-proximate meters are included. In some embodiments, reliance on out-of-band meters is recorded with reduced confidence (e.g., meter_confidence).

[A138] Cryptographic authenticity value A value used to verify integrity and authenticity of committed fields in a permit or receipt, including a digital signature, MAC, or other functionally equivalent authentication mechanism. In some embodiments, it binds to at least committed head identifiers (or head_commitments), allow_mask, budget slice, expiry, and anti-replay data.

[A139] Quorum policy A policy specifying acceptance requirements across multiple signed heads and/or watcher corroborations (e.g., k-of-m) prior to admission. In some embodiments, inability to satisfy the quorum requirement maps to a non-admission outcome such as HOLD with decision_code QUORUM_UNAVAILABLE (or an equivalent code), with optional remediation hints.

[A140] Verifier component—A portion of a verifier implemented at a particular enforcement surface (e.g., kernel-mode driver path, device firmware microcode, hypervisor device model, or SR-IOV virtual-function device model). In some embodiments, verifier components are distributed across multiple surfaces and any failed predicate in any component short-circuits to a non-admission outcome, preventing the compute-admission action.

[A141] Mediated device/mediated device function—A virtualization mechanism in which a device is presented to a guest or tenant via a mediated interface (e.g., a mediated device model) rather than by direct assignment, enabling controlled sharing of a physical device across tenants. A "mediated device function" refers to a mediated presentation instance, endpoint, or function through which accelerator work may be admitted or enabled; functionally equivalent mediated-device mechanisms are included.

[A142] Virtual function (VF)—In SR-IOV and related I/O virtualization contexts, a logically presented function addressable by a guest, tenant, or workload. In some embodiments, a VF is associated with one or more identifiers and/or queues/resources used for admission and accounting. Functionally equivalent virtual-function mechanisms are included.

[A143] Head identifier—An identifier corresponding to a signed head of an append-only verifiable structure (e.g., a digest, checkpoint identifier, or root-hash identifier). A head identifier may appear as a committed value in head_commitments and/or as an element in a head_ids list; naming and representation are non-dispositive.

[A144] Head advance—A transition in which a current signed head for a given append-only verifiable structure changes from a previously observed head to a newer head. In some embodiments, on head advance, append-only evolution (consistency) verification is performed relative to the previously observed head; this description is illustrative and non-limiting.

[A145] Decision (outcome)/decision—The admission outcome emitted by a verifier in a pre-effect admission gate. Non-limiting examples include PASS, HOLD, and DENY; and, in designated tiers, EMERGENCY_STOP.

[A146] Decision code/decision_code—A machine-readable reason code associated with a decision outcome. Non-limiting examples include ENERGY_BUDGET_EXCEEDED, PROOF_REQUIRED, REPLAY_DETECTED, STATUS_STALE, and EVIDENCE_EXPIRED. In some embodiments, a PASS outcome may be accompanied by a decision_code value of PASS (or an equivalent "no additional reason" indicator). Code strings are illustrative; in some embodiments, unknown codes are ignored safely.

[A147] Issuer/external issuer—An entity that mints, provides, or delegates a permit (e.g., CEP/CapP/sub-CEP), including an issuer distinct from the verifying component. Non-limiting examples include a scheduler/orchestrator, a delegated tenant authority under a CapP, or a third-party issuer; functionally equivalent issuance and delegation mechanisms are included.

[A148] Grace interval—A policy-defined interval following a HOLD condition (e.g., missed lease refresh or replay detection) during which remediation may be attempted, after which the verifier may escalate to DENY or EMERGENCY_STOP per policy unless a remediation condition is satisfied.

[A149] PROOF_REQUIRED—A decision_code indicating that additional proof material and/or fresh signed heads are required to proceed (e.g., when an offline/air-gapped bounded staleness window is exceeded). In some embodiments, this maps to decision=HOLD until the requirement is satisfied.

[A150] Verifier boundary—A logical and/or trust boundary through which a compute-admission request is routed such that permit validation and configured gate predicates are enforced prior to a compute-admission action becoming effective. Non-limiting implementations include a kernel-mode driver boundary, device firmware/microcode boundary, hypervisor boundary (including mediated device models), SR-IOV per-VF boundary, and TEE-bound verification boundaries; functionally equivalent enforcement boundaries are included.

Appendix B—Canonical JSON Shapes (ACE v2.x)—Non-Dispositive

Note (illustrative; audit-only; non-dispositive). This Appendix provides example ("canonical") JSON shapes for interoperability and evidence packaging. The shapes are illustrative and do not limit claim scope; functionally equivalent field names, encodings, transports, and schema languages are included. In some embodiments, unknown keys are ignored safely by verifiers/clients. Decision codes are non-limiting examples; see Appendix C. Optional thermal objects are included as continuation-supporting extensions and do not alter core compute-admission semantics unless expressly claimed.

```
{
    "$schema": "https://json-schema.org/draft/2020-12/
        schema",
    "$id": "ace://schemas/v2-concise",
    "$comment": "ACE Canonical JSON Shapes (Con-
        cise). Illustrative/audit-only; non-dispositive. Claims
        control.",
    "$defs": {
        "ISODateTime": {"type": "string", "format": "date-
            time" },
        "ID": {
            "type": "string",
            "description": "Opaque identifier (ASCII-friendly
                in many embodiments). Exact formats are
                implementation-defined."
        },
        "HeadId": {
            "type": "string",
```

```
    "description": "Opaque head identifier (e.g.,
        digest/checkpoint). Exact formats are imple-
        mentation-defined."
},
"DecisionOutcome": {
    "type": "string",
    "description": "Example outcomes: PASS|HOLD-
        |DENY (and optionally EMERGENCY_STOP
        in designated tiers). Non-limiting."
},
"DecisionCode": {
    "type": "string",
    "description": "Reason code for an outcome (non-
        limiting). Example values in Appendix C;
        implementers may extend."
},
"HeadMap": {
    "type": "object",
    "additionalProperties":      {"$ref":      "#/$defs/
        HeadId" },
    "description": "Map of head names to head iden-
        tifiers (e.g., policy/license/unlearning/export/
        residency/energy/heat_reuse/heat_sink). Non-
        limiting."
},
"IdMap": {
    "type": "object",
    "additionalProperties": {"$ref": "#/$defs/ID" },
    "description": "Map of pointer names to IDs (e.g.,
        ulp_id, settlement_receipt_id, etc.). Non-limit-
        ing."
},
"BindsTo": {
    "type": "object",
    "required": ["audience" ],
    "properties": {
        "audience": {"type": "string" },
        "workload_id": {"$ref": "#/$defs/ID" },
        "model_id": {"$ref": "#/$defs/ID" },
        "device_kid": {"type": "string" },
        "handoff_point_id": {"$ref": "#/$defs/ID" },
        "site": {"type": "string" },
        "thermal_loop_id": {"$ref": "#/$defs/ID" }
    },
    "additionalProperties": true
},
"ValidityWindow": {
    "type": "object",
    "properties": {
        "start": {"$ref": "#/$defs/ISODateTime" },
        "end": {"$ref": "#/$defs/ISODateTime" }
    },
    "additionalProperties": true
},
"BudgetSlice": {
    "type": "object",
    "properties": {
        "kWh_window": {"type": "number" },
        "TFLOP_window": {"type": "number" },
        "start": {"$ref": "#/$defs/ISODateTime" },
        "end": {"$ref": "#/$defs/ISODateTime" }
    },
    "additionalProperties": true
},
"AntiReplay": {
    "type": "object",
    "properties": {
```

```
        "nonce": {"type": "string" },
        "monotonic_counter": {"type": "integer" },
        "window_id": {"type": "string" }
    },
    "additionalProperties": true
},
"Timestamps": {
    "type": "object",
    "properties": {
        "started_at": {"$ref": "#/$defs/ISODateTime"
        }
        "ended_at": {"$ref": "#/$defs/ISODateTime"
        },
        "issued_at": {"$ref": "#/$defs/ISODateTime" }
    },
    "additionalProperties": true
},
"Anchors": {
    "type": "object",
    "properties": {
        "primary": {"type": "string" },
        "secondary": {"type": "string" }
    },
    "additionalProperties": true
},
"SigInfo": {
    "type": "object",
    "properties": {
        "alg": {"type": "string" },
        "key_id": {"type": "string" }
    },
    "additionalProperties": true
},
"Attestations": {
    "type": "object",
    "properties": {
        "attestation_ids":  {"type":  "array",  "items":
        {"$ref": "#/$defs/ID" }}
        "eat_jwt": {"type": "string" },
        "spdm_corim": {"type": "string" },
        "zk_digest": {"type": "string" },
        "status_staple": {"type": "object", "additional-
        Properties": true},
        "mab_id": {"$ref": "#/$defs/ID" },
        "hmab_id": {"$ref": "#/$defs/ID" }
    },
    "additionalProperties": true
},
"ComputeExecutionPermit": {
    "type": "object",
    "required": ["type","cep_id","binds_to","expiry"
        ],
    "properties": {
        "type": {"type": "string", "const": "Compute-
        ExecutionPermit" }
        "version": {"type": "string" },
        "cep_id": {"$ref": "#/$defs/ID" },
        "binds_to": {"$ref": "#/$defs/BindsTo" },
        "head_commitments": {"$ref": "#/$defs/Head-
        Map" },
        "allow_mask": {"type": "object", "additional-
        Properties": true},
        "budget": {"$ref": "#/$defs/BudgetSlice" },
        "expiry": {"$ref": "#/$defs/ISODateTime" },
        "anti_replay": {"$ref": "#/$defs/AntiReplay" },
        "sig_info": {"$ref": "#/$defs/SigInfo" },
```

```
        "attestations": {"$ref": "#/$defs/Attestations"
        },
        "profile": {"type": "string" },
        "alg_suites": {"type": "array", "items":
        {"type": "string" }},
        "pq_cutover_date": {"$ref": "#/$defs/ISODate-
        Time" },
        "pointers": {"$ref": "#/$defs/IdMap" }
    },
    "additionalProperties": true
},
"CapacityPermit": {
    "type": "object",
    "required": ["type","cap_id" ],
    "properties": {
        "type": {"type": "string", "const": "CapacityP-
        ermit" },
        "version": {"type": "string" },
        "cap_id": {"$ref": "#/$defs/ID" },
        "budget cap": {"type": "object", "additional-
        Properties": true},
        "classes": {"type": "array", "items": {"type":
        "string" }},
        "ttl": {"$ref": "#/$defs/ISODateTime" },
        "k_of n": {"type": "object", "additionalProper-
        ties": true},
        "sig_info": {"$ref": "#/$defs/SigInfo" },
        "pointers": {"$ref": "#/$defs/IdMap" }
    },
    "additionalProperties": true
},
"ComputeReceipt": {
    "type": "object",
    "required": ["type","cr_id","cep_id","site","deci-
    sion_code","energy_used","tflops used" ]
    "properties": {
        "type": {"type": "string", "const": "ComputeR-
        eceipt" },
        "version": {"type": "string" },
        "cr_id": {"$ref": "#/$defs/ID" },
        "cep_id": {"$ref": "#/$defs/ID" },
        "workload id": {"$ref": "#/$defs/ID" },
        "model_id": {"$ref": "#/$defs/ID" },
        "decision": {"$ref": "#/$defs/DecisionOut-
        come" },
        "decision_code": {"$ref": "#/$defs/Decision-
        Code" },
        "energy_used": {"type": "number" },
        "tflops used": {"type": "number" },
        "kgCO2e": {"type": "number" },
        "energy_source_mix": {"type": "string" },
        "site": {"type": "string" },
        "head_ids": {"type": "array", "items": {"$ref":
        "#/$defs/HeadId" }},
        "head_commitments": {"$ref": "#/$defs/Head-
        Map" },
        "attestation_ids": {"type": "array", "items":
        {"$ref": "#/$defs/ID" }}
        "timestamps": {"$ref": "#/$defs/
        Timestamps" },
        "registry_anchor": {"type": "string" },
        "anchors": {"$ref": "#/$defs/Anchors" },
        "continuity_record_id": {"type": "string" },
        "meter_confidence": {"type": "string" },
        "thermal_pointers": {"$ref": "#/$defs/
        IdMap" },
        "pointers": {"$ref": "#/$defs/IdMap" },
```

```
        "audit_only": {"type": "object", "additional-
        Properties": true}
    },
    "additionalProperties": true
},
"WasteHeatExportPermit": {
    "type": "object",
    "required": ["type","whep_id","binds to","ex-
    piry" ],
    "properties": {
        "type": {"type": "string", "const": "WasteHeat-
        ExportPermit" }
        "version": {"type": "string" },
        "whep_id": {"$ref": "#/$defs/ID" },
        "binds_to": {"$ref": "#/$defs/BindsTo" },
        "head_commitments": {"$ref": "#/$defs/Head-
        Map" },
        "recipient scope": {"type": "object", "addition-
        alProperties": true},
        "validity": {"$ref": "#/$defs/Validity
        Window" },
        "thermal_scope": {"type": "object", "addition-
        alProperties": true},
        "expiry": {"$ref": "#/$defs/ISODateTime" },
        "anti_replay": {"$ref": "#/$defs/AntiReplay" },
        "sig_info": {"$ref": "#/$defs/SigInfo" },
        "attestations": {"$ref": "#/$defs/
        Attestations" },
        "hmab_ref": {"type": "object", "additional-
        Properties": true},
        "profile": {"type": "string" },
        "pointers": {"$ref": "#/$defs/IdMap" }
    },
    "additionalProperties": true
},
"HeatReceipt": {
    "type": "object",
    "required": ["type","hr_id","whep_id","handoff
    point_id","decision_code" ],
    "properties": {
        "type": {"type": "string", "const":
        "HeatReceipt" },
        "version": {"type": "string" },
        "hr_id": {"$ref": "#/$defs/ID" },
        "whep_id": {"$ref": "#/$defs/ID" },
        "handoff_point_id": {"$ref": "#/$defs/ID" },
        "recipient id": {"$ref": "#/$defs/ID" },
        "site": {"type": "string" },
        "thermal_energy_delivered_kWh_th": {"type":
        "number" },
        "temperature_at_handoff_C": {"type": "num-
        ber" },
        "deltaT_C": {"type": "number" },
        "flow_rate": {"type": "number" },
        "decision": {"$ref": "#/$defs/DecisionOut-
        come" },
        "decision_code": {"$ref": "#/$defs/Decision-
        Code" },
        "head_ids": {"type": "array", "items": {"$ref":
        "#/$defs/HeadId" }},
        "attestation_ids": {"type": "array", "items":
        {"$ref": "#/$defs/ID" }}
        "anti_replay": {"$ref": "#/$defs/AntiReplay" },
        "timestamps": {"$ref": "#/$defs/
        Timestamps" },
        "registry_anchor": {"type": "string" },
        "anchors": {"$ref": "#/$defs/Anchors" },
```

43

```
      "pointers": {"$ref": "#/$defs/IdMap" },
      "audit only": {"type": "object", "additional-
        Properties": true}
    },
    "additionalProperties": true
  },
  "HeatOfftakeOfferReceipt": {
    "type": "object",
    "required": ["type","hoor_id","handoff_point_id-
      ","offered_window" ],
    "properties": {
      "type": {"type": "string", "const": "Heat-
        OfftakeOfferReceipt" },
      "version": {"type": "string" },
      "hoor_id": {"$ref": "#/$defs/ID" },
      "handoff_point_id": {"$ref": "#/$defs/ID" },
      "recipient scope": {"type": "object", "addition-
        alProperties": true}
      "offered_capacity": {"type": "number" },
      "offered_window": {"$ref": "#/$defs/Validity-
        Window" },
      "reason_code": {"type": "string" },
      "anti_replay": {"$ref": "#/$defs/AntiReplay" },
      "sig_info": {"$ref": "#/$defs/SigInfo" },
      "timestamps": {"$ref": "#/$defs/
        Timestamps" },
      "pointers": {"$ref": "#/$defs/IdMap" }
    },
    "additionalProperties": true
  },
  "HeatOfftakeResponseReceipt": {
    "type": "object",
    "required": ["type","horr_id","hoor_id","re-
      sponse" ],
    "properties": {
      "type": {"type": "string", "const": "HeatOfftak-
        eResponseReceipt" }
      "version": {"type": "string" },
      "horr_id": {"$ref": "#/$defs/ID" },
      "hoor_id": {"$ref": "#/$defs/ID" },
      "response": {"type": "string" },
      "accepted_capacity": {"type": "number" },
      "accepted_window": {"$ref": "#/$defs/Valid-
        ityWindow" },
      "reason_code": {"type": "string" },
      "anti_replay": {"$ref": "#/$defs/AntiReplay" },
      "sig_info": {"$ref": "#/$defs/SigInfo" },
      "timestamps": {"$ref": "#/$defs/
        Timestamps" },
      "pointers": {"$ref": "#/$defs/IdMap" }
    },
    "additionalProperties": true
  },
  "HeatMeterAttestationBundle": {
    "type": "object",
    "required": ["type","hmab_id","meter_ids" ],
    "properties": {
      "type": {"type": "string", "const": "HeatMeter-
        AttestationBundle" }
      "version": {"type": "string" },
      "hmab_id": {"$ref": "#/$defs/ID" },
      "meter_ids": {"type": "array", "items":
        {"$ref": "#/$defs/ID" }},
      "posture": {"type": "object", "additionalProp-
        erties": true},
      "attestations": {"$ref": "#/$defs/
        Attestations" },
```

44

```
      "sig_info": {"$ref": "#/$defs/SigInfo" },
      "issued_at":      {"$ref":      "#/$defs/ISODate
        Time" },
      "expires_at":      {"$ref":      "#/$defs/ISODate
        Time" },
      "pointers": {"$ref": "#/$defs/IdMap" }
    },
    "additionalProperties": true
  }
},
"oneOf": [
  {"$ref": "#/$defs/ComputeExecutionPermit" },
  {"$ref": "#/$defs/CapacityPermit" },
  {"$ref": "#/$defs/ComputeReceipt" },
  {"$ref": "#/$defs/WasteHeatExportPermit" },
  {"$ref": "#/$defs/HeatReceipt" },
  {"$ref": "#/$defs/HeatOfftakeOfferReceipt" },
  {"$ref": "#/$defs/HeatOfftakeResponseReceipt" },
  {"$ref": "#/$defs/HeatMeterAttestationBundle" }
]
}
```

Appendix B.X—Minimal Object Skeletons (Evidence-Only)

Note (illustrative; evidence-only; non-dispositive). Minimal examples for field-naming sanity only; functionally equivalent variants included.

```
{"type":"ComputeExecutionPermit","version":"2.x",
  "cep_id":"cep.1",
  "binds_to":{"audience":"vf:0001","workload_id":
    "w.1","model_id":"m.1" },
  "head_commitments":{"policy":"hP","energy":
    "hE" },
  "allow_mask":{"region":"eu-west-1" },
  "budget":{"kWh_window":1.2,"TFLOP_window":
    750.0,"start":"2025-09-22T12:00:00Z","end":
    "2025-09-22T12:00:05Z" },
  "anti_replay":{"nonce":"n1","window_id":"win.1" }
  "expiry": "2025-09-22T12:00:05Z"
}
{"type":"ComputeReceipt","version":"2.x",
  "cr_id":"crc.1","cep_id":"cep.1",
  "site":"eu-west-1:dc-7",
  "decision":"PASS","decision_code": "PASS",
  "energy_used":0.23,"tflops_used":120.5,
  "head_ids":["hP","hE" ],
  "timestamps":{"issued at":"2025-09-22T12:00:05Z" }
}
{"type":"WasteHeatExportPermit","version":"2.x",
  "whep_id":"whep.1",
  "binds_to":{"audience":"thermal-boundary:01",
    "handoff_point_id":"handoff.1","site":"eu-west-1:
    dc-7" },
  "head_commitments":{"policy":"hP","energy":"hE",
    "heat_reuse":"hHr","heat_sink":"hHs" },
  "validity":{"start":"2025-09-22T12:00:00Z","end":
    "2025-09-22T12:15:00Z" },
  "anti_replay":{"nonce":"n2","window_id":"win.1" }
  "expiry":"2025-09-22T12:15:05Z"
}
{"type":"HeatReceipt","version":"2.x",
  "hr_id":"hrc.1","whep_id":"whep.1","hand-
    off_point_id":"handoff.1",
  "decision":"PASS","decision_code":"PASS",
  "thermal_energy_delivered_kWh_th":18.6,
  "head_ids":["hP","hE","hHr","hHs" ],
```

"timestamps":{"started_at":"2025-09-22T12:00:
   OOZ","ended at":"2025-09-22T12:15:00Z","issue-
   d_at":"2025-09-22T12:15:02Z" }
}
{"type":"ContinuityRecord","version":"1.0",
   "continuity_record_id":"cont.1",
   "issued_at":"2025-09-22T12:00:03Z",
   "decision":"HOLD","decision_code":"DUAL_AN-
      CHOR_CONFLICT",
   "heads":{"primary":"hP.primary","secondary":"hP-
      .secondary" },
   "reason":"dual_anchor_disagreement",
   "proof     refs":{"linking_consistency_proof":"uri:ex-
      ample:consistency-proof"},
   "anchors":{"primary":"regA:  . . .  ","secondary":
      "relgB: . . . " },
   "prev_continuity_record_id":"cont.0",
   "signature":"b64u: . . . "
}

Note (illustrative; evidence-only; non-dispositive). This
example illustrates one continuity record shape. Field names
and encodings are non-limiting; functionally equivalent
shapes are included.
Appendix   C—Structured   Codes   (ACE   v2.x)—
Decision=Outcome, Decision_Code=Reason
   Note (illustrative; audit-only; non-dispositive). This
Appendix provides example decision-envelope shapes and a
non-limiting code taxonomy for interoperability. Code
strings are illustrative; implementers may extend. In some
embodiments, unknown codes are ignored safely by clients/
verifiers. These examples do not alter fail-closed admission
semantics unless expressly claimed; the claims control.
C.1 Decision Envelope—Canonical Shape (Illustrative)
   {
      "$schema":      "https://json-schema.org/draft/2020-12/
         schema",
      "$id": "ace://schemas/v2/decision-envelope",
      "$comment": "Illustrative/audit-only; non-dispositive.
         Claims control.",
      "type": "object",
      "required": ["decision", "decision_code" ],
      "properties": {
         "type": {"type": "string", "const": "ACE-Decision-
            Envelope" },
         "version": {"type": "string" },
         "decision": {"type": "string", "description": "Out-
            come   (e.g.,   PASS|HOLD|DENY).   Non-
            limiting." },
         "decision_code": {"type": "string", "description":
            "Reason   code   (non-limiting).   See   C.2
            examples." },
         "code_id":   {"type":   "string",   "description":
            "Optional alias for decision_code (for compatibil-
            ity). Non-limiting." },
         "class": {"type": "string" },
         "severity": {"type": "string" },
         "gate_scope": {"type": "array", "items": {"type":
            "string" }},
         "retry_after_ms": {"type": "integer", "minimum":
            0},
         "remediation_hints":   {"type":   "array",   "items":
            {"type": "string" }},
         "evidence_flags":   {"type":   "object",   "additional-
            Properties": true},
         "context": {"type": "object", "additionalProperties":
            true},
         "decision_id": {"type": "string" }, "deny_signature": {"type": "string" },
         "ext":   {"type":   "object",   "additionalProperties":
            true}
      },
      "additionalProperties": true
   }
Envelope Semantics (Illustrative; Non-Limiting).
   ] In some embodiments, PASS is emitted only when
      configured predicates evaluate to PASS for the relevant
      permit/context.
   ] In some embodiments, HOLD includes retry_after_ms
      and remediation_hints.
   ] In some embodiments, DENY includes decision_id
      and/or deny_signature for tamper-evident audit trails.
C.2 Code Taxonomy (Non-Limiting Examples; Implement-
ers May Extend)
   ]   Freshness/proof/continuity:   PROOF_REQUIRED,
      STALE_HEAD,      QUORUM_UNAVAILABLE,
      DUAL_ANCHOR_CONFLICT, INCONSISTENCY_
      DETECTED
   | Binding/replay/time: AUDIENCE_MISMATCH, PER-
      MIT_EXPIRED,   REPLAY_DETECTED,   TIME_
      SYNC_ERROR, LEASE_MISSED_REFRESH
   ]   Attestation/evidence   recency:   ATTESTATION_
      FAILED, STATUS_STALE, EVIDENCE_EXPIRED
   ] Policy predicates: POLICY_DENIED, EXPORT_
      CLASS_DENIED, RESIDENCY_DENIED, LICEN-
      SE_MISSING, ULP STALE
   ] Budget & meter integrity: ENERGY_BUDGET_EX-
      CEEDED,      CARBON_BUDGET_EXCEEDED,
      METER_TAMPER_SUSPECTED,   METER_SUP-
      PRESSION_DETECTED,   ANOMALOUS_EFFI-
      CIENCY
   ] Thermal (optional): THERMAL_REUSE_REQUIRED,
      HEAT_EXPORT_PERMIT         REQUIRED,
      HEAT_SINK_UNAVAILABLE,   THERMAL_EVI-
      DENCE_EXPIRED,            THERMAL_
      CREDIT_DOUBLE_COUNT
   | Emergency/stop: EMERGENCY_STOP
Appendix D—Conformance Profiles & Negotiation (Audit-
Only; Non-Dispositive)
   Note (illustrative; audit-only; non-dispositive). Profiles
are optional deployment declarations for procurement/in-
teroperability and do not limit claim scope. Thermal profiles
are optional extensions and do not define a separate inven-
tion; they reuse the same permit/receipt primitives.
D.1 Core Profiles (C0-C4) (Illustrative)
   ] C0—Minimum (ACE-Core): fail-closed gate; freshness-
      bounded head validation; permit-before-action at a
      pre-effect chokepoint.
   ] C1—Quorum (ACE-Quorum): k-of-m heads and/or
      watcher corroboration; optional dual-anchor HOLD on
      disagreement until linking proof.
   ] C2—Privacy (ACE-Privacy): privacy-preserving predi-
      cates (e.g., zk_digest/redacted evidence) while main-
      taining verifiability.
   ]   C3—Delegation/Bundle   (ACE-Delegation):   CapP+
      bounded sub-CEPs; strict subset scope/TTL; cascade
      revocation; bundle stages.
   ] C4—Streaming (ACE-Streaming): sliding lease; missed
      refresh maps to HOLD→DENY per policy; replay
      resistance.
D.1A Thermal Extensions (T0-T2) (Illustrative)
   ] T0 Thermal evidence optional: thermal artifacts may be
      recorded when present.

] T1—Thermal evidence required for declared windows/ classes: missing evidence maps to a thermal requirement code (HOLD or DENY per policy).

| T2—Thermal head-bound gating: use heat_reuse/ heat_sink heads as additional predicates (profile-selectable).

D.2 Negotiation Object Canonical Shape (Illustrative; Audit-Only)

```
{
    "$schema":    "https://json-schema.org/draft/2020-12/
        schema",
    "$id": "ace://schemas/v2/profile-negotiation",
    "$comment": "Illustrative/audit-only; non-dispositive.
        Claims control.",
    "type": "object",
    "properties": {
        "type": {"type": "string", "const": "ACE-ProfileNe-
            gotiation" },
        "version": {"type": "string" },
        "profile":    {"type":    "string",    "description":
            "C0|C1|C2|C3|C4 (illustrative)" },
        "thermal_profile": {"type": "string", "description":
            "T0|T1|T2 (illustrative)" },
        "freshness_policy": {"type": "object", "additional-
            Properties": true},
        "quorum": {"type": "object", "additionalProper-
            ties": true},
        "alg_suites": {"type": "array", "items": {"type":
            "string" }},
        "pq_cutover_date": {"type": "string" },
        "meters": {"type": "object", "additionalProperties":
            true},
        "thermal": {"type": "object", "additionalProperties":
            true},
        "ext":    {"type":    "object",    "additionalProperties":
            true}
    },
    "additionalProperties": true
}
```

D.3 Verifier Minimums (Illustrative; Non-Dispositive)

| A deployment may require profile≥C1 in production.

| A deployment may require thermal_profile≥T1 for declared reuse windows/classes.

] Unknown profile/alg suites may map to HOLD with remediation hints.

] Dual-anchor conflict may map to HOLD until a linking proof (or equivalent) is available.

D.4 Safe-Ignore Rule (Illustrative)

In some embodiments, unknown keys are ignored safely, and absence of optional fields means "not asserted," not failure.

Appendix E—Driver/Firmware Pseudocode (Illustrative; Audit-Only)—Decision_Code Aligned

```
// Illustrative; non-limiting. Admission is fail-closed by
    default at an admission chokepoint.
function admit compute(admission_ctx, cep):
    // 0) Permit presence/integrity/basic binding (fail-
        closed)
    if cep==null:
        return FAIIL("DENY", "PROOF_REQUIRED")
    if !verify_sig(cep):
        return FAIL("DENY", "POLICY_DENIED")
    if is_expired(cep.expiry):
        return FAIL("DENY", "PERMIT_EXPIRED")
    if cep.binds_to.audience !=THIS_FUNCTION:
        return    FAIL("DENY",    "AUDIENCE_MIS-
            MATCH")
```

```
    // 1) Attestation/stapled status recency (illustrative
        mapping)
    att=attestation_check(cep.attestations,    recency
        bound=MMD)
    if att.code=="STATUS_STALE":
        return    FAIL("HOLD",    "STATUS_STALE",
            retry_after_ms=250,
remediation_hints=["refetch_status" ])
    if att.code !="OK":
        return FAIL("DENY", "ATTESTATION_FAILED")
    // 2) Heads: freshness+append-only evolution/inclusion
        (dual-anchor optional)
    heads=fetch_current_heads( ) // may include {primary,
        secondary} in dual-anchor mode
    if !fresh(heads, bound=MMD):
        return FAIL("HOLD", "STALE_HEAD", retry_af-
            ter_ms=250,
remediation_hints=["refresh_head" ])
    if is_dual_anchor(heads) and disagree(heads.primary,
        heads.secondary):
        emit_continuity    record(heads.primary,    heads.sec-
            ondary) // evidence-only
        return FAIL("HOLD", "DUAL_ANCHOR_CON-
            FLICT", retry_after_ms=250,
remediation_hints=["consistency_proof_required" ])
    if    !validate_commitments(cep.head_commitments,
        heads):
        return FAIL("DENY", "INCONSISTENCY_DE-
            TECTED")
    // 3) Budget enforcement (device-truth preferred; fall-
        back allowed)
    meters=meters_select(prefer=["NVML","CUPTI",
        "SMI","ZES" ],
fallback=["BMC","Redfish","PDU" ])
    bud=budget_check(cep.budget, meters)
    if bud.code=="CARBON_BUDGET_EXCEEDED":
        return FAIL("DENY", "CARBON_BUDGET_EX-
            CEEDED")
    if bud.code=="ENERGY_BUDGET_EXCEEDED":
        return FAIL("DENY", "ENERGY_BUDGET_EX-
            CEEDED")
    // 4) Policy predicates
    pol=policy_ok(cep.allow_mask,
        context=cep.binds_to)
    if pol.code !="OK":
        return FAIL("DENY", pol.code)
    // 5) Optional anti-replay/lease enforcement (illustra-
        tive)
    if has_lease(cep) and lease_missed_refresh(cep.lease):
        return    FAIL("HOLD",    "LEASE_MISSE-
            D_REFRESH", retry_after_ms=250,
remediation_hints=["renew_lease" ])
    if anti_replay_violation(cep):
        return FAIL("HOLD", "REPLAY_DETECTED",
            retry_after_ms=250,
remediation_hints=["rotate key","renew_lease" ])
    // 6) Record evidence (receipt+optional anchoring; evi-
        dence-only)
    cr=write_compute_receipt(
        cep_id=cep.cep_id,
        binds_to =cep.binds_to,
        head_commitments=cep.head_commitments, // map
            form
        head_ids=values(cep.head_commitments),    //    list
            form (optional)
        decision="PASS",
        decision code="PASS",
```

```
energy used=bud.energy_used_kWh,
tflops_used=bud.tflops_used,
meter_confidence=bud.meter_confidence
)
if evidence_registry_enabledo:
    anchor_digest(cr) // evidence-only
return {"decision":"PASS", "decision_code":"PASS" }
// Helper constructor (illustrative; non-limiting)
function      FAIL(decision,      decision_code,
    retry_after_ms=null, remediation_hints=[ ]):
    out={"decision": decision, "decision_code": deci-
        sion_code}
    if          retry_after_ms          !=null:
        out.retry_after_ms=retry_after_ms
    if remediation_hints !=null and len(remediation-
        _hints)>0:
        out.remediation_hints=remediation_hints
    return out
```

Appendix F—Attestation & Proof Profiles (Audit-Only; Non-Dispositive)

Note (illustrative; audit-only; non-dispositive). This Appendix describes optional attestation and proof patterns that may be used as inputs to permit-before-action gating. Formats/transports are non-limiting and functionally equivalent mechanisms are included. Nothing herein alters fail-closed admission semantics unless expressly claimed; the claims control.

F0. Scope. Attestation evidence may be used to demonstrate that a relevant boundary (e.g., device/driver/accelerator, and optionally a host boundary) is in an expected posture within a configured recency bound (e.g., ≤a freshness policy such as an MMD-style bound).

F1. Evidence formats (non-limiting).
] Token-based: signed JWT/EAT-style tokens.
] Transcript/manifest-based: protocol transcripts, measurement manifests (e.g., SPDM/CoRIM).
] Privacy-preserving: proof digests/verdict proofs for sensitive predicates.

F2. Evidence transport (non-dispositive).
] Stapled/embedded in a permit,
] Referenced by identifier/URI for verifier retrieval, or
] Bound to a channel/session (e.g., channel binding).

In some embodiments (optional), a permit is proof-of-possession (PoP) bound to a presenter key and/or an attestation session such that the presenter proves possession during validation (e.g., by signing a verifier nonce or via channel binding).

In some embodiments, failure to demonstrate possession maps to a non-admission outcome (e.g., decision=DENY with decision_code indicating ATTESTATION_FAILED or POLICY_DENIED), without altering fail-closed admission semantics.

F3. Recency, replay, and time (illustrative).
] Stale evidence may map to STATUS_STALE or EVIDENCE_EXPIRED.
] Replay or concurrent reuse may map to REPLAY_DETECTED or ATTESTATION_FAILED.
] Clock-skew/time sanity checks may map to TIME_SYNC_ERROR (or an equivalent code).

F4. Composition (optional). Composed attestations (e.g., host boundary+device/GPU) may be accepted when component attestations share a compatible recency bound and are bound to the same admission context and head vector.

F5. Binding (illustrative).
] Audience binding: permit binds to intended verifier identity; mismatch may map to AUDIENCE_MISMATCH.

] Device binding: permit binds to a device identity (e.g., device kid) and/or an attestation session binding.

F6. Verification & failure mapping (illustrative).
Invalid evidence→ATTESTATION_FAILED
Stale evidence→STATUS_STALE/EVIDENCE_EXPIRED
Binding mismatch→AUDIENCE_MISMATCH
(See Appendix C for non-limiting code examples.)

F7. Meter Attestation Bundle (MAB) (optional; audit-only). A MAB may bind meter identities and meter-source posture to a boundary. A MAB identifier may be recorded (e.g., attestations.mab_id or an equivalent field) for audit.

F8. Conformance hints (optional; audit-only). Profiles may declare minimum attestation posture (e.g., token or transcript evidence, optional composition, optional proof digests). Declarations are advisory only.

Appendix G—Metering Counters (Illustrative; Non-Dispositive)

Note (illustrative; non-dispositive). This Appendix lists example meter sources and example normalization patterns. Equivalent meter sources/counters are included.

G1. Example device-truth meters.
] NVIDIA: NVML (power/energy), CUPTI (FLOP/tensor counters).
] AMD: AMD SMI (power/energy telemetry).
] Intel: Level Zero Sysman (ZES) power/energy counters.

G2. Out-of-band meters (fallback). BMC/Redfish/PDU streams may be used when device meters are unavailable; deployments may mark reduced confidence (e.g., meter_confidence="LOW").

G3. Normalization (illustrative).
| energy used (kWh): from an energy counter where available, or by integrating power over a window.
] tflops_used: from hardware/driver counters aggregated over the window.
| Optional kgCO2e: derived from energy_used×emissions_factor, with a named factor source recorded for audit traceability.

G4. Gate-time mapping (illustrative). In some embodiments, if remaining kWh or TFLOP budget evaluated at the pre-effect gate is negative, the outcome maps to ENERGY_BUDGET_EXCEEDED and/or CARBON_BUDGET_EXCEEDED, independent of scheduler state.

G5. Deterministic inference accelerators (optional; evidence-only). Some accelerators expose token/sequence counters. Such counters may be used for optional evidence (e.g., efficiency-window anomaly signals) without altering core kWh/TFLOP budget enforcement unless explicitly configured.

G6. Thermal metering (optional extension; continuation support).
] Thermal energy may be derived from flow and temperature differential (or direct thermal meters), expressed for example in kWh_th.
] Thermal receipts may include anti-replay/uniqueness bindings (e.g., window_id, nonce, monotonic counters).
] Linkage between CRcs and HRcs may be recorded via audit-only pointers; does not alter compute admission unless expressly configured.

Appendix H—Regulatory/Procurement Alignment & Evidence Map (Illustrative)

Note (illustrative; non-dispositive). External frameworks and dates may change. This Appendix is an evidence mapping aid only and does not alter admission semantics; claims control.

Purpose. Show that ACE evidence objects (CEP/CRc+ optional registry anchoring) can provide common "audit questions" answers: what ran, where/when, under what policy heads, with what energy/work usage, and with what verification outcome.

H1. Typical evidence fields (illustrative mapping).

] Where/when: site, timestamps.*

] What: workload_id, model_id

] Under what policy: head_commitments and/or head_ids

] Verification result: decision, decision_code

| Energy/work: energy used, tflops used

] Boundary posture: attestation_ids and/or attestations.*

| Tamper-evidence (optional): registry_anchor, anchors.*, inclusion/consistency proofs (evidence-only)

H2. Rollups (illustrative). Per-workload CRcs may be aggregated to site/time-window summaries for reporting (e.g., energy totals, utilization proxies, region mapping). Optional carbon/energy-source fields are audit-only unless expressly configured.

Appendix I—Symbols & Field Names (Canonical)—Non-Dispositive

Conventions (illustrative; non-limiting). This Appendix provides convenience mappings between figure symbols and example ("canonical") field names used in example artifacts. Field names, encodings, and object layouts are non-dispositive; functionally equivalent names and structures are included. This Appendix is evidence/interoperability oriented and does not alter admission semantics; the claims control.

I.1 Symbols→Example Canonical Names (Figures/Prose)
Heads (FIG. 2)

| $H_p$→head_commitments.policy

] $H_l$→head_commitments.license

] $H_u$→head_commitments.unlearning

] $H_x$→head_commitments.export

] $H_r$→head_commitments.residency

] $H_e$→head_commitments.energy

Orchestrator (FIG. 1)

] HF(102) Head Fetchers; PV(104) Proof Verifiers; PVM (106) Policy VM; BM(108) Budget Meter; CEPI(110) CEP Issuer; EB(112) Evidence Bus; SR(114) Status Responder Verifier Checks (FIG. 4)

] signature/expiry/audience(402)→attestation recency (404)→heads→current(406)→budget meters (408)→policy verdict(410)→codes(412) (pre-doorbell/ queue; example ordering only)

Receipts & Registry (FIG. 5)

] CRc fields(502); registry_anchor(510)

Virtualization (FIG. 7)

] VF=per-VF SR-IOV binding; THIS_FUNCTION=current driver/hypervisor device function (example alias)

1.2 Example Canonical Field Names—Objects & Keys (Non-Limiting)

ComputeExecutionPermit (CEP) (example)

| cep_id

] binds_to {audience, workload_id?, model_id?, device_kid?}

| head_commitments {policy, license?, unlearning?, export?, residency?, energy?}

| allow_mask { . . . }

] budget {kWh window?, TFLOP_window?, start?, end?}

] expiry; anti replay {nonce?, monotonic_counter?, window_id?}

] sig_info {alg?, key_id?}

] attestations {eat_jwt?, spdm_corim?, zk_digest?, status_staple?}

] optional {lease?, delegation?, bundle?, profile?, alg_suites?, pq_cutover_date?, pointers?}

CapacityPermit (CapP) (example)

cap_id; budget cap?; classes?[ ]; ttl?; k_of_n?{k, n}; sig_info?; pointers?

ComputeReceipt (CRc) (example)

] cr_id; cep_id; decision_code; site

] energy_used?; tflops_used?; timestamps?

] head_ids?[ ]; attestation_ids?[ ]

] registry_anchor?; anchors?{primary?, secondary?}

] optional audit fields {kgCO2e?, energy_source_mix?, continuity record_id?, meter_confidence?, . . . }

Status staple (example)

] head_vector[ ]; issued_at?; expires_at?; ext?

Note: The presence/absence of optional fields is non-dispositive; "not present" means "not asserted," not failure.

I.3 Enumerations & Constants (Examples; See Appendix C for Taxonomy)

Decision outcomes (example): PASS| HOLD| DENY (and optionally EMERGENCY_STOP in designated tiers)

Decision codes (non-limiting examples): PROOF_REQUIRED, STALE_HEAD, QUORUM_UNAVAILABLE, POLICY_DENIED, EXPORT_CLASS_DENIED, RESIDENCY_DENIED, LICENSE_MISSING, ULP_STALE, ENERGY_BUDGET_EXCEEDED, CARBON_BUDGET_EXCEEDED, REPLAY_DETECTED, AUDIENCE_MISMATCH, PERMIT_EXPIRED, STATUS_STALE, ATTESTATION_FAILED, EVIDENCE_EXPIRED, INCONSISTENCY_DETECTED, DUAL ANCHOR CONFLICT, LEASE_MISSED_REFRESH Profiles (Example): C0-C4 (See Appendix D)

I.4 Formats, Units, Patterns (Illustrative; Non-Limiting)

| Time: ISO 8601 (UTC commonly used)

] Energy: kWh; Work: TFLOPs; Carbon: kgCO2e (optional/audit)

] Identifiers: opaque strings (ASCII-friendly in many embodiments); exact formats are implementation-defined.

I.5 Namespace & Versioning (Illustrative)

Example schema namespace: ace://schemas/v2 (or functionally equivalent)

Example negotiation fields may appear in CEP/CapP/ manifest/evidence; their location and naming are non-dispositive.

I.6 Compatibility & Safe-Ignore (Non-Limiting)

Implementations may ignore unknown keys safely and treat absent optional fields as "not asserted," while preserving fail-closed admission based on configured predicates.

I.7 Figure Numerals (Cross-Index; Optional Convenience)

| 100-114 orchestrator; 202-220 heads/proofs/MMD/quorum; 302-322 CEP/CapP fields; 402-412 verifier checks; 502-510 CRc/anchor; 602-612 metering; 702-710 SR-IOV; 802-806 privacy; 902-906 delegation/bundle; 1002-1008 revocation/kill.

I.8 Minimal Object Skeletons (Implementation Sanity; Evidence-Only)

CEP (minimal example)

```
{
    "cep_id":"cep.1",
    "binds_to":{"audience":"vf:0001" },
    "head_commitments":{"policy":"hP","energy":
        "hE" },
    "allow_mask":{"region":"eu-west-1" },
```

```
"budget":{"kWh_window":1.2,"TFLOP_window":
   750.0,"start":"2025-09-22T12:00:00Z","end":
   "2025-09-22T12:00:05Z" },
"anti_replay":{"nonce":"n1","window_id":"win.1" }
"expiry":"2025-09-22T12:00:05Z"
}
```

CRc (minimal example)

```
{
"cr_id":"crc.1",
"cep_id":"cep.1",
"site":"eu-west-1/dc-7",
"decision_code":"PASS",
"energy_used":0.23,
"tflops_used":120.5,
"head_ids": ["hP","hE" ],
"timestamps":      {"issued_at":"2025-09-22T12:00:
   05Z" }
}
```

Appendix J—Interop Test Vectors (P0-P4; Audit-Only)

Note (audit-only; non-dispositive). Minimal example vectors for procurement/conformance testing.

| J.1 P0—Minimal single-root (PASS). Fresh heads; valid CEP bound to audience; device-truth meters OK→decision=PASS.

] J.2 P0—Stale head (HOLD). head_age exceeds freshness bound→decision=HOLD, decision_code=STALE_HEAD (optionally with retry hints).

] J.3 P1—Quorum (PASS). k-of-m satisfied and/or watcher corroboration present→decision=PASS.

] J.4 P3—Delegation overreach (DENY). Sub-CEP exceeds CapP scope→decision=DENY, decision_code=POLICY_DENIED.

] J.5 P4—Lease missed refresh (HOLD→DENY). Lease refresh missed→HOLD(LEASE_MISSED_REFRESH) then DENY after grace/expiry per policy.

] J.6 Dual-anchor conflict (HOLD). Primary/secondary disagreement→HOLD(DUAL_ANCHOR_CONFLICT)+continuity evidence (audit-only).

Appendix K—Threat Model & Mitigations (Informative)

] Replay/concurrent use: anti replay+single-use policy→REPLAY_DETECTED.

] Stale/forged status: recency-bounded staples→STATUS_STALE /EVIDENCE_EXPIRED.

] Meter spoof/downgrade: prefer device-truth meters; optional meter attestations; audit via CRc.

] VF mis-binding: per-VF audience/device binding→AUDIENCE_MISMATCH.

] Head rollback/split view: consistency proofs+dual-anchor HOLD until linked→INCONSISTENCY_DETECTED/DUAL_ANCHOR_CONFLICT.

| Privacy leakage: proof digests+redacted evidence bundles (optional).

Appendix L—Equivalent Compute Surfaces (Informative)

Non-limiting scope expansion: DPUs/SmartNICs (queue admission), FPGAs (bitstream/admission gates), CPU enclaves/TEEs (admission before enclave start), inference ASICs/LPUs, cloud ML ASICs, managed inference services exposing enqueue/graph submission. Same permit-before-admission semantics apply.

Appendix M—References (Informative; Non-Dispositive)

Examples only (non-limiting):

Transparency logs: Certificate Transparency concepts; append-only log patterns.

Attestation: EAT/JWT concepts; SPDM transcripts; CoRIM measurement manifests.

Meters: NVML/CUPTI; AMD SMI; Intel ZES; BMC/Redfish/PDU telemetry.

Governance/reporting: generic AI governance and energy reporting frameworks (illustrative).

Appendix N—Example JSON Instances (Evidence-Only)

```
{
"type":"ComputeExecutionPermit",
"version":"2.x",
"cep_id":"cep.pass.1",
"binds_to":{"audience":"vf:0001","workload_id":
   "w.1","model_id":"m.1" }
"head_commitments":{"policy":"hP","energy":
   "hE" },
"allow_mask":{"region":"eu-west-1" },
"budget":{"kWh_window":1.2,"TFLOP_window":
   500,"start":"2025-09-22T12:00:00Z","end":"2025-
   09-22T12:00:05Z" },
"anti_replay":{"nonce":"n1","window_id":"win.1" }
"expiry":"2025-09-22T12:00:05Z"
}
{

"type":"ACE-DecisionEnvelope",
"version":"2.x",
"decision": "HOLD",
"decision_code":"STALE_HEAD",
"retry_after_ms":250,
"remediation_hints":["refresh_head" ]
}
{
"type":"ComputeReceipt",
"version":"2.x",
"cr_id":"crc.1",
"cep_id":"cep.pass.1",
"site":"eu-west-1/dc-7",
"decision":"PASS",
"decision_code":"PASS",
"energy_used":0.23,
"tflops_used":120.5,
"head_ids":["hP","hE" ],
"timestamps":{"issued_at":"2025-09-22T12:00:
   05Z" }
}
{
"head_vector":["hP","hE" ],
"issued_at":"2025-09-22T12:00:00Z",
"expires_at":"2025-09-22T12:01:00Z"
}
```

Appendix O—Energy Stewardship Profiles (Audit-Only; Non-Dispositive)

Purpose (audit-only). Provide optional evidence fields for sustainability/public-interest reporting without changing compute admission unless expressly configured.

```
{
"stewardship_profile":"E1|E2|E3|E1+E2",
"ci_factor_source":"example-factor-source",
"rec_id":"optional",
"dr_event_id":"optional",
"public_interest_tag":"health|relief|education|re-
   search|food_security",
"food_security_tag":"optional"
}
{
"kgCO2e":0.042,
"energy_source_mix":"wind:60%,solar:25%,grid:
   15%",
"curtailed_kWh":1.8,
```

```
"anchors":{"primary" "regA . . . ","secondary":
    "regB . . . " }
}
```

Appendix P—Vendor Licensing Interop (Audit-Only)

Some stacks enforce licensing via soft degradation or EULA-only modes. ACE admission is independent. Optional CRc audit keys: vendor_license_mode, vendor_license_event, vendor_product (evidence-only).

Appendix Q—ComputeGateHealthReceipt (Audit-Only)

```
{
    "type":"ComputeGateHealthReceipt",
    "version":"1.0",
    "gate_id":"did:ace:gate:example",
    "profile":"C0|C1|C2|C3|C4",
    "policy":{"mmd_s":600,"decision_interval_ms":5},
    "posture":{
        "window s":300,
        "pass_rate":0.985,
        "hold rate":0.012,
        "deny_rate":0.003,
    "decision_code_breakdown":{"STALE_HEAD":7,"EN-
        ERGY_BUDGET_EXCEEDED":3,"INC    ONSIS-
        TENCY_DETECTED":1},
    "mean_decision_latency_ms":4.2,
    "p99_decision_latency_ms":40.0
    },
    "head_cache":{
        "last_head_ids":["hP","hE" ],
        "head_cache_age_ms":420,
        "quorum":{"k":2,"m":3}
    },
    "issued_at":"2025-09-22T12:00:00Z",
    "signature":"b64u: . . . "
}
```

Appendix R—ACE Conformance Manifest (Audit-Only; Non-Dispositive)

```
{
    "type":"ACE-ConformanceManifest",
    "version":"1.0",
    "conformance id":"ace-core:2025-09:abcd1234",
    "issued_at":"2025-09-22T12:00:00Z",
    "issuer":"did:ace:org:example",
    "profile":"ACE-Core|ACE-Quorum|ACE-Privacy|-
        ACE-Streaming",
    "capabilities":[
        "pre-effect-gate",
        "status_stapling",
        "ct_compatible_heads",
        "quorum",
        "energy_budget",
        "carbon_budget",
        "delegation_bundle",
        "doorbell token",
        "dual_anchor" ],
    "freshness_policy":{"mmd_s":600,"staple_recen-
        cy_s":60},
    "proof_suites":["merkle-tree","accumulator","skiplist-
        forward-links" ],
    "quorum":{"enabled":true,"k":2,"m":3,"diversity":
        ["org","geo","impl" ]},
    "attestation":{"stapling_supported":true,"suites":["EAT/
        JWT","SPDM/CoRIM" ],"recency_s":60},
    "time_sync":{"max_skew_ms":2000,"on_violation":
        "HOLD(TIME_SYNC_ERROR)" },
    "meters":["NVML","CUPTI","SMI","ZES","BMC/
        Redfish/PDU" ],
```

```
    "meter_policy":{"prefer_device_truth":true,
        "mab_supported":true},
    "taxonomy_refs":{"decision_envelope":"Appendix
        C","test_vectors":"Appendix J" },
    "evidence_registry":{"ct    style":true,"mmd_s":600,
        "log_id":"ctlog:example" },
    "privacy":{"zk_supported":true,"redacted_evidence":
        true},
    "delegation bundle":{"k_of_n_supported":true,"casca-
        de_revocation":true},
    "lease":{"supported":true},
    "dual_anchor":{"supported":true,"policy":"HOLD
        (DUAL_ANCHOR_CONFLICT) until consistency_
        proof"},
    "deployment signaling":{
        "fair access" true,
        "non_discrimination":true,
        "contact":"https://example.org/contact",
        "notes":"Audit-only; informational; no offer/com-
            mitment."
    },
    "signature":"b64u:manifest-signature",
    "notes":"Audit-only; non-dispositive; claims control."
}
```

Appendix R-1—Manifest Explainer (Audit-Only)

Purpose (informative only). Field guide for audit discovery; does not alter gate semantics.

| Identity: type/version/conformance_id/issuer/issued_at
] Declared features: profile/capabilities
] Freshness & proofs: freshness_policy/proof suites/evidence_registry
| Reliability knobs: quorum/attestation/time_sync/meters/meter_policy
] Optional modules: privacy/delegation/lease/dual_anchor/deployment signaling
] Non-dispositive: absence of fields="not asserted," not failure.

Appendix S—Audit & Retention Policy (Audit-Only)

```
{
    "type":"ACE-AuditRetention",
    "version":"1.0",
    "retention_days":365,
    "pii_redaction": true,
    "timezone_policy":"UTC",
    "evidence_scope":{"includes":["CRc","Evi-
        denceBundle","continuity record","badge" ],"exclude
        s":["raw_user_content" ]},
    "tamper_protection":{"registry_anchoring":true,"wit-
        nessing":"optional" },
    "notes":"Audit-only; non-dispositive; claims control."
}
```

Appendix T—SIEM/SOAR Field Map (Audit-Only)

```
{
    "type":"ACE-SIEM-Map",
    "version":"1.0",
    "fields":{
        "cr_id":"event.id",
        "decision":"event.outcome",
        "decision_code":"event.reason",
        "timestamps.issued_at":"event.created",
        "site":"cloud.region",
        "energy_used":"cloud.compute.kwh",
        "tflops used":"cloud.compute.tflops",
        "head_ids":"event.policy.head_ids",
        "attestation_ids":"event.device.attestations",
        "anchors.primary":"event.chain.primary",
        "continuity record_id":"event.chain.continuity",
```

"meter_confidence":"event.meter.confidence"
},
"notes":"Audit-only; non-dispositive."
}

Appendix U—PQ & Algorithm Agility Policy (Audit-Only)
{
  "type":"ACE-AlgAgility",
  "version":"1.0",
  "alg_suites_supported":["EdDSA","ECDSA","ML-DSA","SLH-DSA" ],
  "pq_cutover_policy":{
    "pq_cutover_date":"2026-01-01T00:00:00Z",
    "fallback_allowed_until":"2026-06-30T00:00:00Z",
    "grace_behavior":"HOLD with remediation_hint: refresh_alg_suites"
  },
  "signature_policy":{"key_rotation_supported":true, "overlap_days":30}
  "staple_recency_s":60,
  "notes":"Audit-only; non-dispositive; admission semantics remain as defined in claims/spec."
}

Appendix V—Interop Pointers (Audit-Only; Non-Dispositive)
{
  "type":"ACE-InteropPointers",
  "version":"2.1",
  "purpose":"Audit-only pointer index for evidentiary linkage; non-dispositive.",
  "groups":{
    "ace":["cep_id","cr_id" ],
    "thermal":["whep_id","hr_id", "tcrc_id" ],
    "food_security":["food_asset_id","food_supply_chain_id","food_region" ],
  "external":["externalpermit id","external_receipt_id", "external_policy_id","external_bundle_id","adjustment_id","clawback_id" ]
  },
  "aliases":{
    "heat_receipt_id":"hr_id",
    "external_receipt_ref":"external_receipt_id"
  },
  "notes":"Pointers are evidentiary linkages and do not alter gate predicates unless expressly configured elsewhere; claims control."
}

The invention claimed is:

1. A system, comprising one or more processors and memory storing instructions that, when executed by the one or more processors, cause the system, prior to admitting an accelerator workload, to:

(a) obtain, from one or more append-only verifiable structures, a head vector comprising signed heads for (i) policy and at least one of: (ii) license or entitlements, (iii) unlearning status, (iv) export class, (v) data residency, or (vi) energy and/or carbon budgets;

(b) for each signed head in the head vector, verify freshness relative to a freshness policy and, responsive to a head advance, verify append-only evolution (consistency) relative to a previously observed head for a corresponding append-only verifiable structure that produced the signed head;

(c) cause evaluation of a policy program to compute, or obtain output of a policy program comprising, an allow mask and a budget slice for a requested accelerator workload and a requested model based at least in part on the head vector;

(d) issue, or accept from an external issuer, a short-lived, audience-bound Compute Execution Permit (CEP) that cryptographically commits to identifiers of the signed heads used, the allow mask, the budget slice, an expiry, and an anti-replay tuple; and (e) cause a verifier integrated in at least one of: (i) a kernel-mode driver path prior to doorbell or queue submission, (ii) device firmware microcode, or (iii) a hypervisor or SR-IOV virtual-function device model, to deny, by default, a compute-admission action that would enable accelerator work to become executable, the compute-admission action comprising at least one of enqueue, kernel launch, DMA enablement, memory-mapping enablement, or mediated device or virtual-function enablement, unless the CEP validates under current signed heads and trusted budget meters, including (i) validating the committed head identifiers against the current signed heads, (ii) validating the allow mask under configured policy predicates for an admission context, and (iii) validating the budget slice against the trusted budget meters, including verifying a cryptographic authenticity value binding at least the committed head identifiers, the allow mask, the budget slice, the expiry, and the anti-replay tuple, with any failed predicate in a bounded pre-effect decision slice short-circuiting to denial and preventing the compute-admission action.

2. The system of claim 1, further comprising an accelerator gate apparatus including an accelerator function exposing a doorbell or queue-submission interface or a functionally equivalent pre-effect admission interface and the verifier, wherein the verifier denies the compute-admission action absent a presented CEP that validates against current signed heads and trusted budget meters, and wherein the accelerator gate apparatus is configured such that each of a plurality of software and virtualization paths capable of causing accelerator work to become executable is intercepted at, or routed through, the verifier boundary to prevent bypass of CEP validation via alternate submission routes.

3. The system of claim 1, wherein the verifier is enforced in a hypervisor or SR-IOV context and performs CEP validation per virtual function or per mediated device function.

4. The system of claim 1, wherein the verifier is implemented in firmware microcode or a TEE-bound driver path and rejects CEPs whose attestation artifacts presented with, or referenced by, the CEP fail validity or recency checks, and wherein the verifier outputs a decision_code selected from ATTESTATION_FAILED, STATUS_STALE, or EVIDENCE_EXPIRED.

5. The system of claim 1, wherein trusted budget meters comprise at least one of: NVML power and energy telemetry, CUPTI floating-point and Tensor operation counters, AMD SMI telemetry, Intel Level-Zero Sysman telemetry, or functionally equivalent meters.

6. The system of claim 1, wherein the verifier prefers device-truth meters and, when falling back to at least one of BMC, Redfish, or power-distribution-unit meters, records a meter_confidence indicator of LOW, and maps negative remaining kilowatt-hour or TFLOP budget at gate time to ENERGY_BUDGET_EXCEEDED or CARBON_BUDGET_EXCEEDED regardless of scheduler admission state.

7. The system of claim 1, wherein at least one of export-class, data-residency, or unlearning predicates is satisfied using privacy-preserving proofs and the CEP commits to a proof transcript digest.

8. The system of claim 1, wherein, upon a PASS outcome or a termination event, the system emits a Compute Receipt (CRc) that commits to at least: a CEP identifier, energy_used in kilowatt-hours, tflops_used, a site or region identifier, one or more head identifiers, a decision_code, and timestamps, and anchors or registers a digest of the CRc into an append-only Evidence Registry that provides inclusion and append-only evolution (consistency) proofs, and wherein the CRc further comprises at least one of kgCO2e, an energy_source_mix, and a meter_confidence indicator.

9. The system of claim 1, wherein the CEP is a streaming lease requiring refresh within a sliding window, failure of which causes the verifier to output HOLD and, upon lapse of a grace interval or expiry of the CEP, to output DENY.

10. The system of claim 1, wherein the system supports delegation by issuing a Capacity Permit (CapP) that authorizes tenants to mint sub-CEPs within a bounded scope and time-to-live.

11. The system of claim 10, wherein the Capacity Permit includes a k-of-n signer policy for sub-CEP minting and attempts to exceed delegated scope cause the verifier to output POLICY_DENIED.

12. The system of claim 1, wherein the verifier enforces a status-stapling recency bound not exceeding the freshness policy for each head referenced by the CEP, and stale status causes the verifier to output STATUS_STALE or EVIDENCE_EXPIRED.

13. The system of claim 1, wherein, upon receipt of a Revocation Receipt for any head used to issue the CEP, the system invalidates the CEP at the gate, halts running queues via a kill-switch, and emits a termination Compute Receipt that is anchored together with a continuity record linking the revocation and halt event to one or more prior CEPs and CRcs.

14. The system of claim 1, wherein, in an offline or air-gapped deployment, the system is configured to accept, only within a bounded staleness window defined by the freshness policy, an EvidenceBundle carrying previously issued head identifiers and proof references, and to map admission outcomes to HOLD with decision_code of PROOF_REQUIRED when the bounded staleness window is exceeded until fresh signed heads are obtained.

15. The system of claim 1, wherein the one or more append-only verifiable structures comprise at least two independent append-only verifiable structures maintained under distinct trust anchors, a quorum policy requires a k-of-m set of heads or watcher corroborations before admitting the workload, and disagreement maps to HOLD with a signed continuity record until a cryptographic consistency proof links the heads.

16. The system of claim 1, wherein the Evidence Registry publishes signed heads subject to a maximum-merge-delay freshness bound and supports inclusion and append-only evolution (consistency) proofs for digests of CEPs and CRcs, and wherein the system validates, before treating a permit or receipt digest as registered, that the digest is included under a current signed head satisfying freshness and append-only evolution (consistency) requirements.

17. The system of claim 1, wherein the CEP includes the anti-replay tuple, is single-use and time-to-live limited, and reuse or concurrent reuse of the CEP causes the verifier to detect a replay and to output REPLAY_DETECTED and a HOLD outcome, and, upon lapse of a grace interval or per policy, to output DENY or EMERGENCY_STOP.

18. The system of claim 1, wherein (i) the CEP cryptographically binds to at least one of a device fingerprint, a virtual-function identifier, a workload identifier, or a model identifier, (ii) the cryptographic authenticity value further binds an audience identifier corresponding to the audience to which the CEP is bound, and (iii) the driver, firmware, or hypervisor refuses the compute-admission action if the binding mismatches.

19. The system of claim 1, wherein the verifier binds an admission decision to a queue_token that is valid only prior to the compute-admission action and that cryptographically commits to a subset comprising an audience identifier corresponding to the audience to which the CEP is bound, the committed head identifiers, the allow mask, the budget slice, and the expiry, wherein the queue token is invalid after doorbell or queue submission (or a functionally equivalent pre-effect admission action), and any mismatch between the committed subset and at least one of (i) a presented CEP or (ii) an admission context causes denial of the compute-admission action.

20. The system of claim 1, wherein the verifier performs admission checks within a bounded pre-effect decision slice, and an order, grouping, and placement of the admission checks is non-dispositive such that the checks may be reordered, parallelized, and/or split across verifier components including across at least two of: the kernel-mode driver path, device firmware microcode, and the hypervisor or SR-IOV virtual-function device model, while remaining fail-closed on any deficit.

21. A computer-implemented method, comprising:
(a) obtaining, from one or more append-only verifiable structures, a head vector comprising signed heads for (i) policy and at least one of: (ii) license or entitlements, (iii) unlearning status, (iv) export class, (v) data residency, or (vi) energy and/or carbon budgets;
(b) verifying freshness of each signed head relative to a freshness policy and, responsive to a head advance, verifying append-only evolution (consistency) relative to a previously observed head for a corresponding append-only verifiable structure that produced the signed head;
(c) causing evaluation of a policy program to compute, or obtaining output of a policy program comprising, an allow mask and a budget slice for a requested accelerator workload and a requested model based at least in part on the head vector;
(d) issuing, or accepting from an external issuer, a short-lived, audience-bound CEP that cryptographically commits to identifiers of the signed heads used, the allow mask, the budget slice, an expiry, and an anti-replay tuple; and
(e) enforcing, at an accelerator driver, device firmware, or hypervisor, a bounded pre-effect admission decision that denies, by default, a compute-admission action that would enable accelerator work to become executable, the compute-admission action comprising at least one of enqueue, kernel launch, DMA enablement, memory-mapping enablement, or mediated device or virtual-function enablement, unless the CEP validates under current signed heads and trusted budget meters, including (i) validating the committed head identifiers against the current signed heads, (ii) validating the allow mask under configured policy predicates for an admission context, and (iii) validating the budget slice against the trusted budget meters, including verifying a cryptographic authenticity value binding at least the committed head identifiers, the allow mask, the budget slice, the expiry, and the anti-replay tuple, with any failed predicate in a bounded pre-effect decision slice short-circuiting to denial and preventing the compute-admission action.

22. The method of claim 21, further comprising, upon a PASS outcome or a termination event, emitting a CRc and anchoring or registering a digest of the CRc into an append-only Evidence Registry implemented as an append-only verifiable structure.

23. The method of claim 21, further comprising permitting offline or air-gapped operation only within a bounded staleness window defined by the freshness policy and otherwise outputting HOLD with decision_code of PROOF_REQUIRED until fresh signed heads are obtained.

24. The method of claim 21, further comprising rejecting CEPs when status staples fail a recency bound not exceeding the freshness policy, and outputting STATUS_STALE or EVIDENCE_EXPIRED.

25. The method of claim 21, further comprising detecting reuse or concurrent reuse of a single-use CEP and outputting REPLAY_DETECTED and a HOLD outcome, and, upon lapse of a grace interval or per policy, outputting DENY or EMERGENCY_STOP.

26. The method of claim 21, further comprising enforcing algorithm agility for CEP verification such that, after a declared pq_cutover_date, presentation of a CEP signed under a non-approved signature suite causes output of a HOLD outcome with a remediation hint to refresh algorithm suites, without altering fail-closed admission semantics.

27. A non-transitory computer-readable medium storing instructions that, when executed by one or more processors, cause the one or more processors to perform the method of claim 21.

28. The non-transitory computer-readable medium of claim 27, wherein the instructions further cause enforcement of CEP validation per SR-IOV virtual function or per mediated device function.

29. The non-transitory computer-readable medium of claim 27, wherein the instructions further cause, upon a PASS outcome or a termination event, emission of CRcs that commit to at least: a CEP identifier, energy_used in kilowatt-hours, tflops_used, a site or region identifier, a decision_code, and one or more head identifiers, and optionally anchoring a digest of at least one of the CRcs in an Evidence Registry that supports inclusion proofs and append-only evolution (consistency) proofs.

30. The non-transitory computer-readable medium of claim 27, wherein the instructions further cause use of at least two independent append-only verifiable structures under distinct trust anchors with a k-of-m quorum requirement and, upon disagreement, a HOLD outcome with a signed continuity record until a cryptographic consistency proof links the heads.

* * * * *